US012605664B2

(12) United States Patent
Collin et al.

(10) Patent No.: US 12,605,664 B2
(45) Date of Patent: Apr. 21, 2026

(54) FOLDABLE FILTER BAGS, FILTER BAG SUPPORT ASSEMBLIES, AND FILTER BAG ASSEMBLIES

(71) Applicant: Donaldson Company, Inc., Bloomington, MN (US)

(72) Inventors: Eric W. E. Collin, Bilzen (BE); David V. Gutman, Brussels (BE); Steven A. Johnson, Williams, MN (US); Benny J. B. Mombaerts, Boortmeerbeek (BE); Gabriel J. Safarian, Deephaven, MN (US); David L. Van Eylen, Heverlee (BE); Iman Vezvaei, Brussels (BE)

(73) Assignee: Donaldson Company, Inc., Bloomington, MN (US)

( * ) Notice: Subject to any disclaimer, the term of this patent is extended or adjusted under 35 U.S.C. 154(b) by 58 days.

(21) Appl. No.: 17/694,471

(22) Filed: Mar. 14, 2022

(65) Prior Publication Data
US 2022/0297046 A1 Sep. 22, 2022

Related U.S. Application Data

(60) Provisional application No. 63/161,591, filed on Mar. 16, 2021.

(51) Int. Cl.
*B01D 46/00* (2022.01)
*B01D 46/02* (2006.01)
*B01D 46/24* (2006.01)

(52) U.S. Cl.
CPC ......... *B01D 46/02* (2013.01); *B01D 46/2403* (2013.01); *B01D 2201/34* (2013.01)

(58) Field of Classification Search
CPC ........................... B01D 46/02; B01D 46/2403; B01D 2201/34; B01D 2275/207; B01D 46/0005; B01D 46/07
(Continued)

(56) References Cited

U.S. PATENT DOCUMENTS 2,576,310 A * 11/1951 Ruemelin .............. B01D 46/02
55/377
2,853,154 A 9/1958 Rivers
(Continued)

FOREIGN PATENT DOCUMENTS

BE 571580 10/1958
CN 1468134 A 1/2004
(Continued)

OTHER PUBLICATIONS

Donaldson® Torit® Installation and Operation Manual, "Dalamatic® Cased: DLMC Jan. 2, 2015, Jan. 3, 2015, Jan. 4, 2015, Jan. 5, 2015, Jan. 7, 2015, Feb. 2, 2015, Feb. 3, 2015, Feb. 4, 2015, Feb. 5, 2015, Feb. 6, 2015, Feb. 8, 2015, Mar. 3, 2015, Mar. 5, 2015, Mar. 6, 2015, Mar. 7, 2015, Mar. 8, 2015, Apr. 5, 2015 and Apr. 8, 2015—Collectors Built After Jul. 2006", Revision 5, Feb. 2023, originally published 2006, Donaldson Company, Inc., Minneapolis, Minnesota, 40 pages.
(Continued)

*Primary Examiner* — T. Bennett Mckenzie
(74) *Attorney, Agent, or Firm* — Mueting Raasch Group

(57) ABSTRACT

Foldable filter bags, filter bag support assemblies, and filter bag assemblies are described herein. The foldable filter bags, filter bag support assemblies, and filter bag assemblies may be used in air filter systems to remove particulate matter from air or other gases. Methods of using the air filter systems and methods of assembling the filter bag assemblies are also described.

18 Claims, 33 Drawing Sheets

(58) Field of Classification Search
USPC ................................................... 55/361–382
See application file for complete search history.

(56) References Cited

U.S. PATENT DOCUMENTS

| | | | |
|---|---|---|---|
| 3,803,814 | A | 4/1974 | Parsons |
| 3,942,962 | A | 3/1976 | Duyckinck |
| 4,072,484 | A | 2/1978 | Carre et al. |
| 4,080,185 | A | 3/1978 | Richter et al. |
| 4,123,239 | A | 10/1978 | Andersson et al. |
| 4,218,227 | A | 8/1980 | Frey |
| 4,244,718 | A * | 1/1981 | Noddin .................. B01D 46/06 |
| | | | 55/377 |
| 4,298,360 | A | 11/1981 | Poll |
| 4,306,896 | A | 12/1981 | O'Dell |
| 4,390,425 | A * | 6/1983 | Tafara .................. B01D 29/902 |
| | | | 210/232 |
| 4,395,269 | A | 7/1983 | Schuler |
| 4,424,070 | A | 1/1984 | Robinson |
| 4,436,536 | A | 3/1984 | Robinson |
| 4,443,237 | A | 4/1984 | Ulvestad |
| 4,445,915 | A | 5/1984 | Robinson |
| 4,490,253 | A * | 12/1984 | Tafara .................... B01D 29/27 |
| | | | 29/451 |
| 4,539,025 | A | 9/1985 | Ciliberti et al. |
| 4,578,092 | A | 3/1986 | Klimczak |
| 4,613,438 | A | 9/1986 | DeGraffenreid |
| 4,632,681 | A | 12/1986 | Brunner |
| 4,661,131 | A | 4/1987 | Howeth |
| 4,954,255 | A | 9/1990 | Müller et al. |
| 5,096,476 | A | 3/1992 | Hunsberger |
| 5,207,812 | A | 5/1993 | Tronto et al. |
| 5,211,846 | A | 5/1993 | Kott et al. |
| 5,222,488 | A | 6/1993 | Forsgren |
| 5,277,704 | A * | 1/1994 | Miller .................... B01D 46/10 |
| | | | 55/DIG. 12 |
| 5,409,515 | A | 4/1995 | Yamamoto et al. |
| 5,484,529 | A | 1/1996 | Malugade et al. |
| 5,562,746 | A | 10/1996 | Raether |
| 5,730,766 | A | 3/1998 | Clements |
| 6,090,173 | A | 7/2000 | Johnson et al. |
| 6,179,890 | B1 | 1/2001 | Ramos et al. |
| 6,183,530 | B1 | 2/2001 | Herding et al. |
| 6,203,591 | B1 | 3/2001 | Clements et al. |
| 6,331,197 | B1 | 12/2001 | Herding et al. |
| 6,902,592 | B2 | 6/2005 | Green et al. |
| 7,182,799 | B2 | 2/2007 | Dries |
| 7,396,376 | B2 | 7/2008 | Schrage et al. |
| 7,641,708 | B2 | 1/2010 | Kosmider et al. |
| 7,901,476 | B2 | 3/2011 | Kao |
| 8,029,585 | B2 | 10/2011 | Sundvik et al. |
| 8,075,648 | B2 | 12/2011 | Raether |
| 8,409,316 | B2 | 4/2013 | Nelson et al. |
| 8,636,820 | B2 | 1/2014 | Reichter et al. |
| 8,709,119 | B2 | 4/2014 | Reichter et al. |
| 9,623,355 | B2 | 4/2017 | Caesar et al. |
| 9,707,503 | B2 | 7/2017 | Gieseke et al. |
| 10,105,628 | B2 | 10/2018 | Jan |
| 10,124,285 | B2 | 11/2018 | Baseotto et al. |
| 10,137,396 | B2 | 11/2018 | Raether et al. |
| 10,421,034 | B2 | 9/2019 | Reichter et al. |
| 11,529,576 | B2 | 12/2022 | Herding et al. |
| 2004/0163370 | A1 | 8/2004 | Haufe et al. |
| 2006/0112667 | A1 | 6/2006 | Sporre et al. |
| 2007/0218833 | A1 | 9/2007 | Andersson |
| 2009/0183473 | A1 | 7/2009 | Hui |
| 2009/0255225 | A1 * | 10/2009 | Dralle .................... B01D 46/06 |
| | | | 55/379 |
| 2014/0260138 | A1 | 9/2014 | Edwards et al. |
| 2015/0128540 | A1 | 5/2015 | Eyers et al. |
| 2015/0182899 | A1 | 7/2015 | Bansal et al. |
| 2015/0314225 | A1 | 11/2015 | Parsons et al. |
| 2016/0016103 | A1 | 1/2016 | Raether |
| 2019/0308126 | A1 | 10/2019 | Fritzsching et al. |
| 2021/0077934 | A1 | 3/2021 | Johnson et al. |
| 2022/0297041 | A1 | 9/2022 | Gutman et al. |
| 2023/0191303 | A1 | 6/2023 | Graham et al. |

FOREIGN PATENT DOCUMENTS

| | | |
|---|---|---|
| CN | 103082950 A | 5/2013 |
| CN | 103089714 | 5/2013 |
| CN | 105749638 | 7/2016 |
| CN | 206404468 | 8/2017 |
| CN | 107321078 | 11/2017 |
| CN | 107349711 | 11/2017 |
| CN | 107530610 A | 1/2018 |
| CN | 211189424 U | 8/2020 |
| DE | 202020105243 | 12/2020 |
| EP | 3 150 269 | 4/2017 |
| EP | 3 680 002 | 7/2020 |
| FR | 2 561 535 | 9/1985 |
| FR | 2 561 536 | 9/1985 |
| GB | 1113154 | 5/1968 |
| GB | 1324299 A | 7/1973 |
| JP | H073712 A1 | 1/1995 |
| NL | 1013824 | 6/2001 |
| WO | 2012018837 A2 | 2/2012 |
| WO | 2013/038757 | 3/2013 |
| WO | 2016/141097 | 9/2016 |
| WO | 2021/006927 | 1/2021 |
| WO | 2021/050817 | 3/2021 |
| WO | 2021/074139 | 4/2021 |
| WO | 2021/074143 | 4/2021 |
| WO | 2022/063470 | 3/2022 |
| WO | 2022/197631 | 9/2022 |
| WO | 2022/197632 | 9/2022 |
| WO | 2023/122106 | 6/2023 |

OTHER PUBLICATIONS

Donaldson® Torit® Installation and Operation Manual, "Dalamatic® Insertable: DLMV 4/7, 7/7, 8/7, 14/7, 21/7, 6/10, 10/10, 12/10, 20/10, 30/10, 9/15, 15/15, 18/15, 30/15, 45/15, 60/15", Revision 7, Mar. 2016, originally published 2002, Donaldson Company, Inc., Minneapolis, Minnesota, 36 pages.

International Application No. PCT/US2022/053540, filed Dec. 20, 2022, PCT International Search Report and Written Opinion mailed Mar. 31, 2023, 10 pages.

Donaldson® Torit® Product Information Brochure, "Dalamatic® Dust Collectors", 2011-2018, Donaldson Company, Inc., Minneapolis, Minnesota, 12 pages.

Donaldson® Torit® Product Information, "Dalamatic®: Reliable Performance for the Most Challenging Applications", Donaldson Company, Inc., Minneapolis, Minnesota. Believed available as early as Feb. 26, 2019. Obtained from the internet Jun. 18, 2021, 14 pages. Available online at https://www.donaldson.com/en-ua/industrial-dust-fume-mist/equipment/dust-collectors/baghouse/dalamatic/.

International Patent Application No. PCT/US2020/050315, filed Sep. 11, 2020; International Preliminary Report on Patentability issued Mar. 15, 2022, 12 pages.

International Patent Application No. PCT/US2020/050315, filed Sep. 11, 2020; International Search Report and Written Opinion, mailed Feb. 4, 2021, 18 pages.

International Patent Application No. PCT/US2020/050315, filed Sep. 11, 2020; Invitation to Pay Additional Fees and Partial International Search Report, mailed Nov. 20, 2020; 11 pages.

International Application No. PCT/US2022/020237 filed Mar. 14, 2022, PCT International Search Report and Written Opinion mailed May 6, 2022, 10 pages.

International Application No. PCT/US2022/020237, filed Mar. 14, 2022, PCT International Preliminary Report on Patentability, dated Sep. 12, 2023, 7 pages.

* cited by examiner

FOLDABLE FILTER BAGS, FILTER BAG SUPPORT ASSEMBLIES, AND FILTER BAG ASSEMBLIES

RELATED APPLICATION

This application claims the benefit under 35 U.S.C. Section 119 of U.S. Provisional Application No. 63/161,591, filed Mar. 16, 2021, the disclosure of which is incorporated by reference herein in its entirety.

Foldable filter bags, filter bag support assemblies, filter bag assemblies, and filter systems, as well as corresponding methods, are described herein.

Many industries encounter particulate matter suspended in the atmosphere. In some industries, this particulate matter is a valuable product (for example, starch), and it would be beneficial if the suspended particulate matter could be recovered and reintroduced into the process. For other industries (for example, metal or wood working), it may be desirable to remove the particulate matter from the air in order to provide a clear working environment.

Some systems for cleaning an air or other gas streams laden with particulate matter include filter bags (sometimes referred to as socks) located in a housing. The filter bags are typically constructed of filter media, for example, fabric, pleated paper, etc. The gas stream contaminated with particulate matter is typically passed through the housing so that the particulate matter is captured and retained by one or more filter bags.

Air filter systems typically include a clean air chamber and a dirty air chamber. The two chambers are separated by a structure that is commonly referred to as a tubesheet. The tubesheet has a number of openings so that air can pass between the clean and dirty air chambers. The filter bags are positioned over the openings so that particulate-laden air (dirty air) introduced into the dirty air chamber must pass through a filter bag to move into the clean air chamber. The particulate matter in the dirty air collects on the filter bags as the air moves through the filter bags.

From the clean air chamber, the cleaned air is exhausted into the environment, or recirculated for other uses. See, for example, U.S. Pat. No. 3,942,962 (Duyckinck), U.S. Pat. No. 4,218,227 (Frey), U.S. Pat. No. 4,424,070 (Robinson), U.S. Pat. No. 4,436,536 (Robinson), U.S. Pat. No. 4,443,237 (Ulvestad), U.S. Pat. No. 4,445,915 (Robinson), U.S. Pat. No. 4,661,131 (Howeth), U.S. Pat. No. 5,207,812 (Tronto et al.), U.S. Pat. No. 4,954,255 (Muller et al.), U.S. Pat. No. 5,222,488 (Forsgren), U.S. Pat. No. 5,211,846 (Kott et al.), U.S. Pat. No. 5,730,766 (Clements), U.S. Pat. No. 6,090,173 (Johnson et al.), U.S. Pat. No. 6,902,592 (Green et al.), and U.S. Pat. No. 7,641,708 (Kosmider et al.).

As the filter bags capture particulate matter, flow through the system is inhibited and periodic cleaning of the filter bags can be performed to increase air flow through the system. Cleaning can be accomplished by periodically pulsing a brief jet of pressurized air into the interior of the filter bag to reverse the air flow through the filter bag, causing the collected particulate matter to be driven off of the filter bag. The pressurized air may be directed into pulse collectors as described in, for example, U.S. Pat. No. 3,942,962 (Duyckinck), U.S. Pat. No. 4,218,227 (Frey), U.S. Pat. No. 6,090,173 (Johnson et al.), U.S. Pat. Nos. 4,395,269, 6,902,592 (Green et al.), U.S. Pat. No. 7,641,708 (Kosmider et al.), and US Patent Application Publication US 2006/0112667 A1.

SUMMARY

Foldable filter bags, filter bag support assemblies, and filter bag assemblies are described herein. The foldable filter bags, filter bag support assemblies, and filter bag assemblies may be used in air filter systems to remove particulate matter from air or other gases. Methods of using the air filter systems and methods of assembling the filter bag assemblies are also described.

In one or more embodiments, the foldable filter bags described herein include a sealing cuff and a fitting cuff. Before the opening of the filter bag is folded back on itself, the fitting cuff is positioned on, optionally attached to, an exterior surface of the filter media forming the body of the filter bag and the sealing cuff is attached to the interior surface of the filter media forming the body of the filter bag. When the opening of the filter bag is folded back on itself as described herein, the fitting cuff is located within a fitting pocket formed by the folded portion of the filter bag and can be used to advance the bag opening and the body of the filter bag onto a bag support (for example, a cage), while the sealing cuff is exposed on the exterior of the folded portion where it is available to form a seal prevent unwanted passage of air and particulate matter when the filter bag is in use.

This relatively simple arrangement of the fitting and sealing cuffs results in a filter bag that is relatively easy to manufacture, simplifies installation of the filter bag on a cage, and provides a relatively robust seal around the bag opening when installed in a collector.

In one or more embodiments, the filter bag support assemblies described herein include a flange assembly that includes a base and a clamp, with a cage attached to the base. The base includes a channel surrounding a base aperture and the clamp includes one or more guide fins that extend into the channel when the base and the clamp are assembled together. The channel and one or more guide fins can, in one or more embodiments, cooperate to assist in properly placing a filter bag on the filter bag support assembly.

In one or more embodiments, the filter bag assemblies described herein may include a folded filter bag in combination with a filter bag support assembly. When the folded filter bag and filter bag support assembly are used in combination, the one or more guide fins on the clamp can be used to advance the bag opening along the cage of the filter bag support assembly, with the one or more guide fins used to properly place the fitting cuff and folded portion of the filter bag into the channel provided in the base while also properly placing the sealing cuff between the clamp and base to form a robust seal at the interface of the base and the clamp of the flange assembly.

The folded filter bags, filter bag support assemblies, and filter bag assemblies described herein may be particularly useful in filter systems designed for use in industrial air filter applications in which particulate matter must be removed from relatively large volumes of dirty air. As such, the folded filter bags and filter bag assemblies must be sized to handle those air volumes and the particulate matter associated with the volumes. Generally, the filter bags described herein may have a bag length measured from the bag opening to the closed end of the bag that is 0.3 meters or more, 0.5 meters or more, or even 1 meter or more. The associated bag height (measured transverse to the length of the bag) may be 0.2 meters or more, 0.3 meters or more, 0.4 meters or more, or 0.5 meters or more.

In one or more embodiments, the filter bag assemblies include a flange assembly, a cage attached to the flange assembly, and a folded filter bag installed over the cage with an opening at the flange assembly. When installed in the dirty air chamber of a filter system, a seal between the flange assembly and the tubesheet defining the dirty air chamber is provided by applying a seal force on the end of the filter bag assembly located proximate the access panel on the side of the dirty air chamber opposite the tubesheet. That seal force is transmitted to the flange assembly through the cage.

Providing the seal force at the end of the filter bag assembly and transmitting that force through the cage to the flange assembly allows for removal and replacement of the filter bags (and the filter bag assemblies) through access ports on an access panel located across the dirty air chamber. As a result, the used filter bags (and the particulate matter collected on them) do not pass through, and potentially contaminate, the clean air chamber of the filter system.

Another potential advantage of providing and transmitting a seal force at the end of the filter bag assembly and transmitting that force through the cage to the flange assembly is that other components such as, for example, pulse generators, etc. need not be removed or even partially disassembled to accommodate removal and replacement of filter bags.

Forming a seal when using a filter bag by transmitting a seal force through a cage located in the interior of the filter bag may also improve pulse cleaning of at least some types of particulate matter because the rapid acceleration associated with pulse cleaning of some filter bags (sometimes referred to as "bag snap") can be retained (as compared to, for example, the pulse cleaning of rigid filter cartridges).

In one or more embodiments, pulse cleaning of the filter bags results in rapid outward acceleration of the side surfaces of the filter bags. That rapid outward acceleration may result in dislodgment of particulate matter collected on those side surfaces, with the dislodged particulate matter also falling into a hopper of the filter system under the force of gravity.

The forces exerted on the filter bags and, in particular, on the seals formed between the clamp and base of the flange assemblies holding the filter bags during pulse cleaning can be significant. One or more embodiments of the folded filter bags including both a fitting cuff and a sealing cuff as described herein may be particularly useful in ensuring proper placement of the filter bag opening within the flange assembly. That proper placement may help to control the forces experienced at the junction between the folded filter bag opening and the flange assembly to reduce the likelihood of tearing and/or leakage of unfiltered air through that junction.

In one or more embodiments, the foldable filter bags and filter bag assemblies described herein may include filter bags have any suitable shape, although one or more embodiments of the filter bags may be in the form of triangular filter bags that may be described as having the shape of triangular columns, with a height or length of the column being arranged generally horizontally within the dirty air chamber and a bottom surface of the triangular filter bags facing downward. In one or more embodiments, the bottom surfaces of the filter bags are rapidly accelerated downward during pulse cleaning. As a result, particulate matter dislodged from the bottom surfaces of the filter bags during pulse cleaning is advantageously driven directly into a hopper of the filter system under the force of the filter media movement in addition to the force of gravity.

In one or more embodiments in which the generally horizontally-arranged triangular filter bags have the shape of triangular columns with downward facing bottom surfaces, the width of the bottom surfaces may be smaller than the height of the side surfaces measured from the top vertex of the triangular shaped filter bag (where the width of the bottom surface is measured between the vertices defining the bottom surface in a plane that is generally transverse to the column height/length and the height of the side surfaces being measured between the top vertex and the bottom vertex defining the side surface). In one or more embodiments in which the generally horizontally arranged triangular filter bags have the shape of triangular columns with downward facing bottom surfaces, triangular-shaped bags and/or the cages used to support them may be described with respect to the included angle formed between the side surfaces at the tops of the triangles. In one or more embodiments of triangular filter bags including a triangular end cap attached to a tubular body, the triangular end cap, when projected onto a flat surface along a bag axis extending from the bag opening to the triangular end cap, defines a height between the apex and the bottom edge and also defines a width across the bottom edge between the side edges.

In one or more embodiments, filter systems using generally horizontally arranged filter bags shaped or formed into triangular cross-sections as described herein may exhibit improved particulate loading capacity because the filter media forming the bottom surfaces or bases of the triangles face downward. The downward facing filter media may, in or more embodiments, be less susceptible to particulate loading during use than filter media facing upward (in addition to enhancing pulse cleaning by releasing dislodged particulate matter downward where it may, for example, land directly in a hopper located below the filter bags).

Further, by limiting the width of the bottom surfaces of the triangular-shaped filter bags, the side surfaces of the triangular-shaped filter bag assemblies form relatively steep vertical angles having generally vertical side surfaces. Those generally vertical side surfaces may serve to limit particulate loading on the side surfaces (as compared to, for example, side surfaces arranged at shallower angles). The generally vertical side surfaces that are the result of the relatively steep vertical angles also promote release of particulate matter collected on those side surfaces during the pulse cleaning process.

In one or more embodiments of the filter systems described herein including triangular filter bags, the filter bags are supported in a dirty air chamber such that the filter bags and their supporting assemblies (for example, flange assemblies, cages, etc.) can be removed and replaced without passing through the clean air chamber of the filter system. That limits or prevents contamination of the clean air chamber by particulate matter dislodged during removal of used filter bags that is associated with removal of used filter bags through the clean air chamber.

Filter systems that include one or more of the various features and components described herein may offer one or more advantages such as, for example, improved energy efficiency, reduced noise generation, etc. by, in one or more embodiments, reduced pressure drops within the filter systems both during primary flow operation and pulse cleaning of the filter elements (where primary flow operation occurs when the filter system is removing particulate matter from a dirty air stream), reducing frictional losses in the filter systems (both during primary flow operation and pulse cleaning of the filter bags, improving particulate loading characteristics (thus potentially requiring fewer cleaning pulses), etc.

These advantages may, in one or more embodiments be synergistic, i.e., the energy efficiency, reduced noise, etc. may be improved by using two or more of the features and/or components together in the same filter systems.

In a first aspect, one or more embodiments of a filter bag as described herein comprise: a body comprising a bag opening and a closed end, the body extending from the bag opening to the closed end along a bag axis extending between the bag opening to the closed end, wherein the body comprises filter media forming a tubular shape between the bag opening and the closed end; a sealing cuff attached to the filter media forming the tubular shape of the body, the sealing cuff attached to an interior surface of the filter media proximate the bag opening, the sealing cuff extending around an entire perimeter of the bag opening; and a fitting cuff positioned on the filter media forming the tubular shape, the fitting cuff located between the sealing cuff and the closed end, the fitting cuff positioned on an exterior surface of the filter media; wherein the filter media forming the body between the sealing cuff and the fitting cuff is configured to be folded such that a fitting pocket is formed in the filter media between the sealing cuff and the fitting cuff, wherein the fitting cuff is located in the fitting pocket and the sealing cuff is located outside of the fitting pocket, and wherein, when moving along the bag axis away from the closed end, the bag opening is positioned between the fitting cuff and the closed end of the body after the fitting pocket is formed.

In a second aspect, one or more embodiments of a filter bag support assembly as described herein comprises: a flange assembly comprising a base and a clamp, the flange assembly comprising a clean air outlet extending through the base and the clamp; a cage comprising a first cage end attached to the base of the flange assembly, the cage extending over a cage length to a second cage end distal from the base, the cage defining a cage axis extending between the first cage end and the second cage end; wherein the base comprises a base plate facing the clamp and a base aperture containing the clean air outlet of the flange assembly in the base, wherein base comprises a channel surrounding the base aperture, the channel extending away from the clamp; wherein the clamp comprises a clamp plate comprising a clamp aperture containing the clean air outlet of the flange assembly in the clamp, the clamp further comprising a guide fin located along a perimeter of the clamp aperture, wherein the guide fin extends into the channel surrounding the base aperture when the clamp is attached to the base and the cage is located within the clamp aperture.

In a third aspect, one or more embodiments of a filter bag assembly as described herein comprise: a flange assembly comprising a base and a clamp, the flange assembly comprising a clean air outlet extending through the base and the clamp; a cage comprising a first cage end attached to the base, the cage extending over a cage length to a second cage end distal from the base; a filter bag comprising a bag opening attached to the flange assembly and a closed end opposite the bag opening, the filter bag comprising a tubular body surrounding the cage such that the cage is contained within the filter bag, wherein the tubular body is formed of filter media, wherein the filter bag further comprises: a sealing cuff attached to the filter media forming the tubular body, the sealing cuff attached to the filter media proximate the bag opening, the sealing cuff extending around an entire perimeter of the bag opening; and a fitting cuff attached to the filter media forming the tubular shape, the fitting cuff located between the sealing cuff and the closed end; wherein the filter media forming the body between the sealing cuff and the fitting cuff is folded to form a fitting pocket between the sealing cuff and the fitting cuff, wherein the fitting cuff is located in the fitting pocket and the sealing cuff is located outside of the fitting pocket; wherein the base of the flange assembly comprises a base plate and a base aperture defining the clean air outlet of the flange assembly in the base; wherein the clamp of the flange assembly comprises a clamp plate comprising a clamp aperture containing the clean air outlet of the flange assembly in the clamp, the clamp further comprising a guide fin located along a perimeter of the clamp aperture; wherein the fitting cuff is located between the guide fin on the clamp and the base plate; and wherein the sealing cuff is positioned between the base plate and the clamp plate when the clamp is attached to the base and the fitting cuff is located between the guide fin and base plate, wherein the sealing cuff forms a seal between the base and the clamp around the clean air outlet formed by the base aperture and the clamp aperture such that air passing into or out of the filter bag must pass through the clean air outlet or the filter media forming the filter bag.

In a fourth aspect, one or more embodiments of a filter bag assembly as described herein comprise: a flange assembly comprising a base, a clamp, and a transition flange located between the base and the clamp, the flange assembly comprising a clean air outlet extending through the base, the clamp, and the transition flange; a cage comprising a first cage end attached to the base, the cage extending over a cage length to a second cage end distal from the base; a filter bag comprising a bag opening attached to the flange assembly and a closed end opposite the bag opening, the filter bag comprising a tubular body surrounding the cage such that the cage is contained within the filter bag, wherein the tubular body is formed of filter media, wherein the filter bag further comprises a sealing cuff attached to the filter media forming the tubular body, the sealing cuff attached to the filter media proximate the bag opening, the sealing cuff extending around an entire perimeter of the bag opening; wherein the base of the flange assembly comprises a base plate and a base aperture defining the clean air outlet of the flange assembly in the base; wherein the clamp of the flange assembly comprises a clamp plate comprising a clamp aperture containing the clean air outlet of the flange assembly in the clamp, the clamp further comprising a guide fin located along a perimeter of the clamp aperture; wherein the transition flange comprises a flange aperture aligned with the base aperture and the clamp aperture, wherein the clean air outlet is located within the flange aperture, and wherein a portion of the transition flange is located between the sealing cuff and the clamp plate; and wherein the sealing cuff is positioned between the base and the clamp when the clamp is attached to the base, wherein the sealing cuff forms a seal between the base, the transition flange, and the clamp around the clean air outlet formed by the base aperture and the clamp aperture such that air passing into or out of the filter bag must pass through the clean air outlet or the filter media forming the filter bag.

In a fifth aspect, one or more embodiments of an air filter system as described herein comprise: a housing comprising a tubesheet separating an interior volume of the housing into a clean air chamber and a dirty air chamber, a dirty air inlet configured to deliver dirty air into the dirty air chamber, and a clean air outlet configured to remove clean air from the clean air chamber; and a filter bag assembly as described herein located in the dirty air chamber.

In a sixth aspect, one or more embodiments of a method removing particulate matter from dirty air using an air filter system as described herein comprises delivering the dirty air to the dirty air chamber through the dirty air inlet and removing clean air from clean air chamber through the clean air outlet.

In a seventh aspect, one or more embodiments of a method of installing a foldable filter bag on a filter bag support assembly to provide one or more embodiments of a filter bag assembly as described herein comprises: folding a bag opening such that a fitting cuff is located in a fitting pocket; positioning a clamp of a flange assembly of the filter bag support assembly over the filter bag, wherein the clamp comprises a guide fin located in the fitting pocket and a tubular body of the filter bag extends through a clamp aperture in the clamp; advancing the filter bag and the clamp over a cage attached to a base; and attaching the clamp to the base, wherein a sealing cuff on the filter bag forms a seal around the clamp aperture and a base aperture in the base such that air passing into or out of the filter bag must pass through the base aperture or the filter media forming the filter bag.

In an eighth aspect, one or more embodiments of a method of installing a filter bag on a filter bag support assembly to provide one or more embodiments of a filter bag assembly as described herein comprises: positioning a clamp of a flange assembly of the filter bag support assembly over the filter bag, wherein a tubular body of the filter bag extends through a clamp aperture in the clamp; advancing the filter bag and the clamp over a cage attached to a base; positioning a transition flange between the clamp and the base, wherein the transition flange comprises a flange aperture and wherein the clamp comprises a guide fin located in the flange aperture; and attaching the clamp to the base, wherein a sealing cuff on the filter bag forms a seal around a base aperture in the base such that air passing into or out of the filter bag must pass through the base aperture or the filter media forming the filter bag.

Use of any of the filter systems, filter bag assemblies, and foldable filter bags described herein to remove particulate matter from dirty air (or any other gas) is also described herein.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the foldable filter bags, filter bag support assemblies, filter bag assemblies, filter systems, and methods described herein. Rather, a more complete understanding of the invention will become apparent and appreciated by reference to the following Description of Illustrative Embodiments and claims in view of the accompanying figures of the drawing.

BRIEF DESCRIPTIONS OF THE VIEWS OF THE DRAWING

DESCRIPTION OF ILLUSTRATIVE EMBODIMENTS

Figures 1, 2:
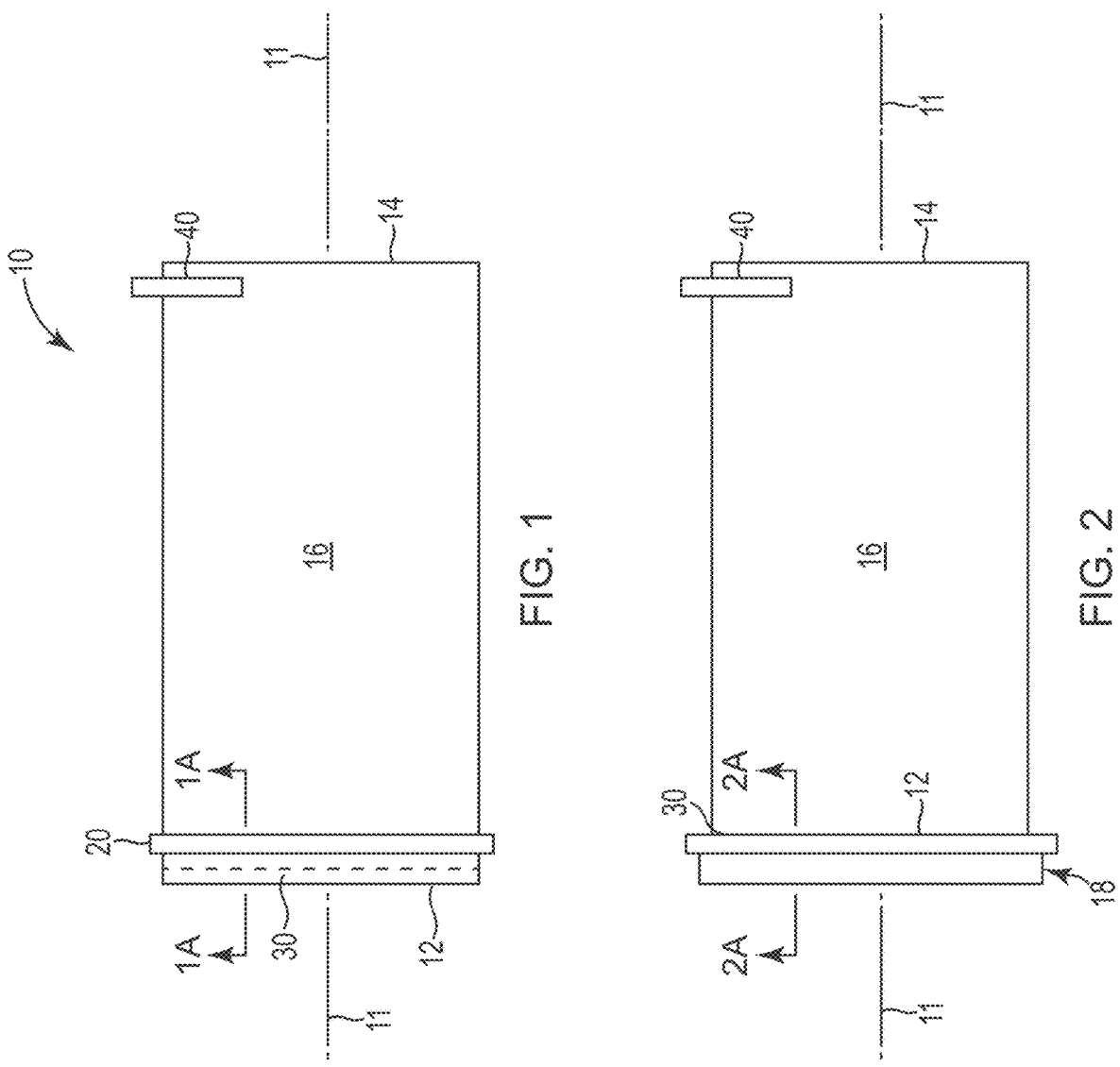
FIG. 1 is a side view of one illustrative embodiment of a filter bag before folding of the filter bag opening as described herein.
FIG. 2 is a side view of the filter bag of FIG. 1 after folding of the filter bag opening as described herein.

In the following description of illustrative embodiments, reference is made to the accompanying figures of the drawing which form a part hereof, and in which are shown, by way of illustration, specific embodiments. It is to be understood that other embodiments may be used and structural changes may be made without departing from the scope of the present invention.

Figure 3:
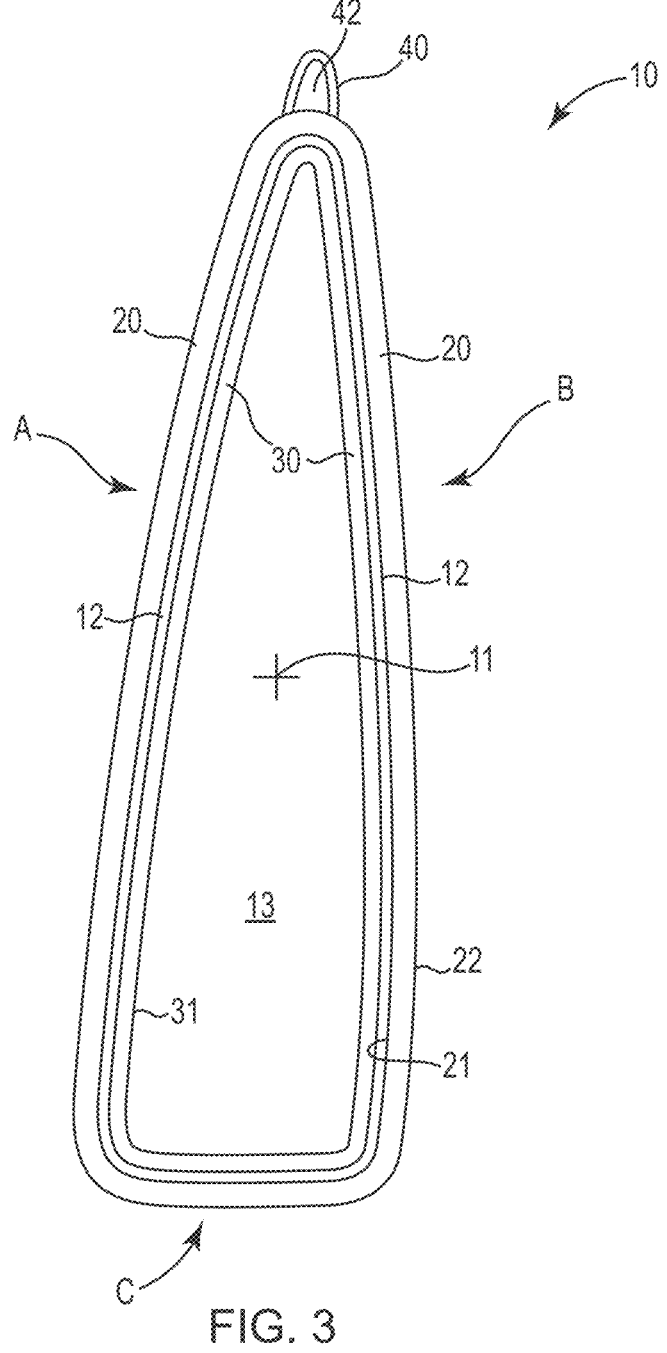
FIG. 3 is an and in view of the filter bag of FIG. 1 taken along the bag axis 11.

FIGS. 1-3 depict various views of one illustrative embodiment of a foldable filter bag as described herein. In FIG. 1, the filter bag 10 is shown before the filter bag opening is folded. The filter bag 10 includes a bag opening 12 and a closed end 14. A body 16 extends from the bag opening 12 to the closed end 14 along a bag axis 11 extending between the bag opening 12 and the closed end 14.

In one or more embodiments, the body 16 of the filter bag 10 may take a tubular shape between the bag opening 12 and the closed end 14. The tubular shape may take many different forms including, for example, an envelope-like shape, a triangular shape in which the body 16 includes two major sides that meet along a top edge and a bottom side connecting the bottom edges of the two major sides, a rectangular shape, etc. With reference to FIG. 3, the filter bag 10 may be in the form of a triangular filter bag having two major sides A and B attached to each other proximate a top edge of the filter bag 10 (where the top edge of the filter bag 10 is the edge along which the optional bag support connector 40 is attached). The filter bag 10 also includes a bottom C connecting the bottom edges of the two major sides A and B of the filter bag 10 to form a generally triangular shaped filter bag 10.

The body 16 of the filter bag 10 is primarily constructed of filter media configured to filter air or any other gas passing through the filter media forming the body 16 with particulate matter entrained in the air or other gas being captured within or on the filter media forming the body 16. In general, the filter media may preferably be flexible enough such that the filter media is capable of being flexed during pulse cleaning as described herein with that flexing or movement of the filter media preferably resulting in removal of at least a portion of the particulate matter captured within or on the filter media forming the filter body 16. The construction of such filter media is well known to those skilled in the art and may, for example, include woven materials, nonwoven materials, paper, etc. selected in view of the particulate matter to be collected, airflow requirements, strength requirements, etc. Suitable filter bags may be constructed of filter media that includes one or more of polyester, polypropylene, aramid, polyester/polytetrafluoroethylene material in both woven and/or nonwoven constructions, etc.

In one or more embodiments, the filter bags described herein may be distinguished from filter cartridges based on their response to compression forces directed between the filter bag opening the closed end of the filter bag, i.e., the end of the bag located opposite the bag opening. In the absence of any extraneous support (such as, for example, the internal cages described herein as part of the filter bag support assemblies and filter bag assemblies), filter bags described herein would, in one or more embodiments, deform under a compressive force of 5 Newtons (approx. 1.1 pound-force) directed along a line extending through the bag opening to the closed end of the filter bag (for example, along the bag axis 11 depicted in FIGS. 1 and 2). In addition to deforming, one or more embodiments of the filter bags used in the filter bag assemblies described herein, transmit essentially none of such a compressive force. A filter cartridge would, in contrast, not significantly deform and would transmit most, if not all, of such a compressive force. The flexibility that is the source of the inability of the filter bags used in the filter bag assemblies and filter systems described herein to transmit compressive forces is, however, the source of the filter bags' ability to rapidly accelerate (sometimes referred to as "snap") outward to remove particulate matter collected on the exterior of the filter media in response to a cleaning pulse.

With reference to FIGS. 1-3, the filter bag 10 depicted in FIG. 1 includes a fitting cuff 20 and a sealing cuff 30, with both the fitting cuff 20 and the sealing cuff 30 attached to the filter media forming the tubular shape of the body 16. The filter media forming the body 16 between the fitting cuff 20 and the sealing cuff 30 is configured to be folded such that a fitting pocket 18 (seen in both FIGS. 2 and 2A) is formed in the filter media between the sealing cuff 30 and the fitting cuff 20. The sealing cuff 30 is located outside of the fitting pocket 18 as seen in both FIGS. 2 and 2A.

When moving along the bag axis 11 away from the closed end 14 of the filter bag 10, the bag opening 12 is positioned between the fitting cuff 20 and the closed end 14 of the body 16 after the fitting pocket 18 is formed. This arrangement is, perhaps, best seen in FIGS. 2 and 2A.

Figures 1A, 2A:
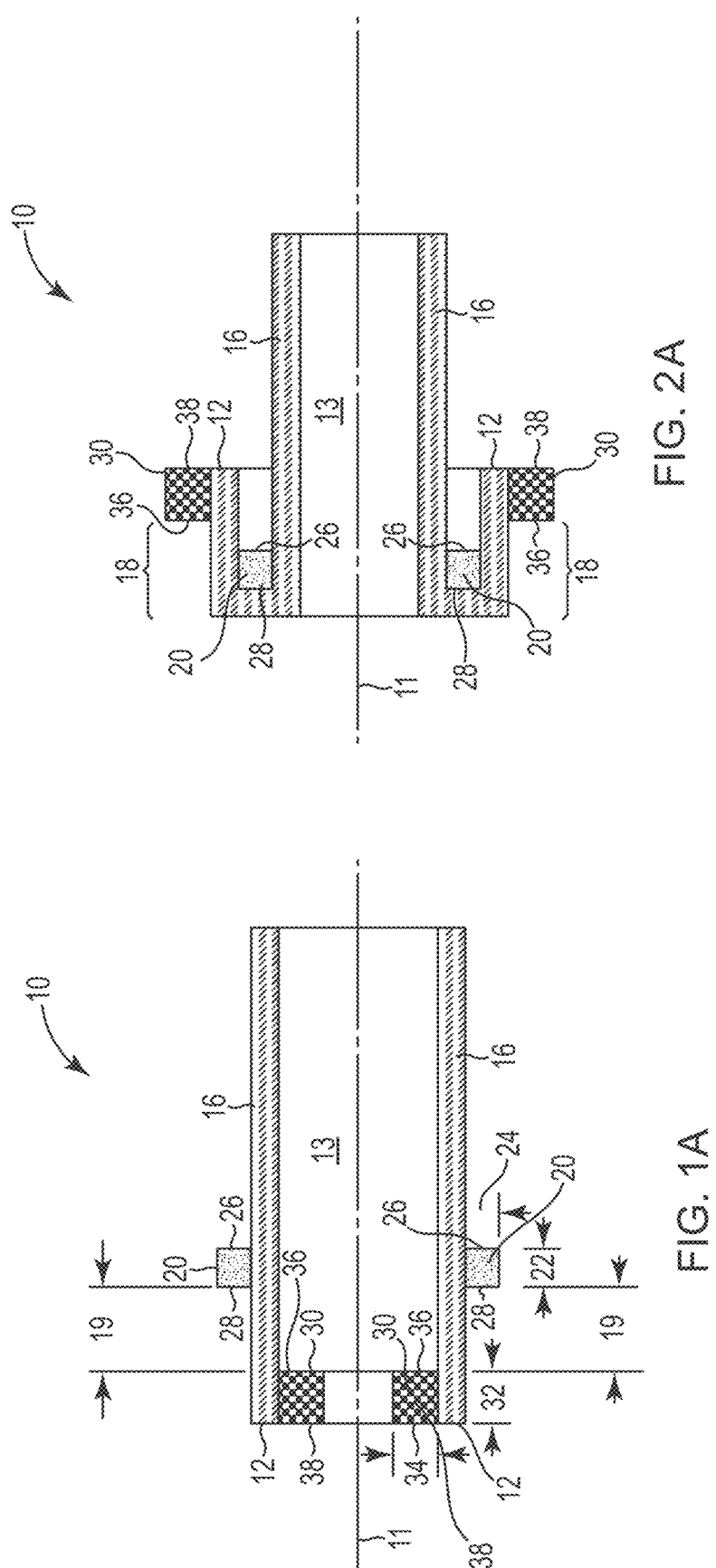
FIG. 1A is a cross-sectional view of the filter bag of FIG. 1 taken along line 1A-1A in FIG. 1.
FIG. 2A is a cross-sectional view of the filter bag of FIG. 2 taken along line 2A-2A in FIG. 2.

Before the filter media of the body 16 is folded to form the fitting pocket 18, the sealing cuff 30 is attached to an interior surface of the filter media forming the body 16, with the sealing cuff 30 being located within the interior volume 13 of the filter bag 10 as seen in, for example, FIGS. 1A and 3. The sealing cuff 30 extends around the entire perimeter of the bag opening 12 as seen in, for example, FIG. 3.

Before the filter media proximate the bag opening 12 of the filter bag 10 is folded to form the fitting pocket 18, the fitting cuff 20 is located between the sealing cuff 30 and the closed end 14 of the filter bag 10, with the fitting cuff 20 positioned on an exterior surface of the filter media forming the body 16 of the filter bag 10. As described herein, after folding of the filter media to form fitting pocket 18, the fitting cuff 20 is located within the fitting pocket 18 but is still positioned on the exterior surface of the body 16 of the filter bag 10 (where the exterior surface of the filter media is the surface of the filter media facing away from the interior volume 13 of the filter bag 10). In one or more embodiments, the fitting cuff 20 may be attached to the exterior surface of the body 16.

In one or more embodiments, the fitting cuff 20 may be provided as a discrete component attached to the exterior surface of the filter media forming the filter body 16 of the filter bag 10. The fitting cuff 20 may, in one or more embodiments, be provided as multiple layers of filter media combined through one or more of stitching, adhesives, thermal welding, chemical welding, etc. The fitting cuff 20 may alternatively be provided as a flexible polymeric component capable of taking the shape of the body 16 of the filter bag 10. The flexible material used to form such a fitting cuff 20 may be in the form of a compressible material, e.g., foam (closed cell, open cell, etc.), etc. In one or more embodiments, the fitting cuff 20 may be formed of a resiliently compressible material capable of returning to its original shape (or nearly its original shape) after compression. In one or more other embodiments, the fitting cuffs may be formed of one or more layers of material that exhibit increased resistance to abrasion and/or tearing. In yet other embodiments, the fitting cuffs use in filter bags as described herein may be formed of two or more components attached to the filter media through any suitable technique or combination of techniques.

In one or more embodiments, the sealing cuff 30 may be provided as a discrete component attached to the interior surface of the filter media forming the body 16 of the filter bag 10. In one or more embodiments, the sealing cuff 30 may be provided as multiple layers of filter media combined through one or more of stitching, adhesives, thermal welding, chemical welding, etc. The sealing cuff 30 may alternatively be provided as a flexible polymeric component capable of taking the shape of the body 16 of the filter bag 10. The sealing cuff 30 may alternatively be provided as a flexible polymeric component capable of taking the shape of the body 16 of the filter bag 10. The flexible polymeric material used to form such a sealing cuff 30 may be in the form of a compressible material, e.g., foam (closed cell, open cell, etc.), etc. In one or more embodiments, the sealing cuff 30 may be formed of a resiliently compressible material capable of returning to its original shape (or nearly its original shape) after compression. In yet other embodiments, the sealing cuffs use in filter bags as described herein may be formed of two or more components attached to the filter media through any suitable technique or combination of techniques.

In one or more embodiments of the filter bags described herein, the sealing cuff 30 may be described as having an internal perimeter 31 smaller than an internal perimeter of the bag opening 12 defined by the filter media before a fitting pocket 18 is formed by folding the filter media as described herein (see, for example, FIG. 3).

In one or more embodiments of the filter bags described herein, the fitting cuff 20 may extend around the entire perimeter of the exterior surface of the tubular body 16 as seen in, for example, FIG. 3. In one or more embodiments, the fitting cuff 20 may be described as defining an internal perimeter 21 that is equal to an external perimeter of the body 16 as defined by the exterior surface of the filter media to which the fitting cuff 20 is attached. In one or more alternative embodiments, the fitting cuffs of filter bags as described herein may not extend around the entire perimeter of the exterior surface of the tubular body 16, in other words, the fitting cuffs of filter bags as described herein may have breaks or gaps when moving around the perimeters of the bodies of the filter bags to which the fitting cuffs are attached.

In one or more embodiments, the sealing cuff 30 may be described as being located between the fitting cuff 20 and the closed end 14 of the filter bag 10 when moving along the bag axis 11 away from the closed end 14 after the fitting pocket 18 is formed as seen in, for example, FIGS. 2 and 2A.

With reference to FIG. 1A, in one or more embodiments of filter bags as described herein, the sealing cuff 30 may have an axial seal length 32 measured along the bag axis 11 and the fitting cuff 20 may have a fitting cuff length 22 measured along the bag axis 11. In one or more embodiments, the axial seal length 32 of the sealing cuff 30 is equal to or greater than the fitting cuff length 22 of the fitting cuff 20. In one or more alternative embodiments, the axial seal length 32 of the sealing cuff 30 is greater than the fitting cuff length 22 of the fitting cuff 20. One advantage of providing a sealing cuff 30 having an axial seal length 32 equal to or greater than the fitting cuff length 22 of the fitting cuff 20 is that compression of the sealing cuff 30 may be more readily obtained when the fitting cuff length 22 is not greater than the axial seal length 32 of the sealing cuff 30. Compression of the sealing cuff 30 may be important in forming a proper seal to prevent unwanted passage of particulate matter when using filter bags as described herein.

Again with reference to FIG. 1A, the fitting cuff 20 may have a fitting cuff thickness 24 measured in a direction transverse to the bag axis 11 and the sealing cuff 30 may have a sealing cuff thickness 34 also measured in a direction transverse to the bag axis 11. In one or more embodiments of filter bags as described herein, the sealing cuff thickness 34 of the sealing cuff 30 may be equal to or greater than the fitting cuff thickness 24 of the fitting cuff 20. In one or more alternative embodiments, the sealing cuff thickness 34 of the sealing cuff 30 is greater than the fitting cuff thickness 24 of the fitting cuff 20. One advantage of providing a sealing cuff 30 having a sealing cuff thickness equal to or greater than the fitting cuff thickness of fitting cuff 20 is that, again, compression of the sealing cuff 30 may be more readily obtained when the fitting cuff thickness 24 is not greater than the sealing cuff thickness 34 of the sealing cuff 30. Compression of the sealing cuff 30 may be important in forming a proper seal to prevent unwanted passage of particulate matter when using filter bags as described herein.

With reference to FIGS. 1A and 2A, the sealing cuff 30 of one or more embodiments of filter bags as described herein may be described as having a proximal end 36 and a distal end 38 when moving along the bag axis 11 away from the closed end 14 of the filter bag 10. In other words, the proximal end 36 is located closer to the closed end 14 of the filter bag 10. In other words, the proximal end 36 of the sealing cuff 30 is closer to the closed end 14 of the filter bag 10 than the distal end 38 of the sealing cuff 30. Put another way, the proximal end 36 of the sealing cuff 30 is located between the closed end 14 of the body 16 and the distal end 38 of the sealing cuff 30.

Similarly, the fitting cuff 20 of one or more embodiments of filter bags as described herein may be described as having a proximal end 26 and a distal end 28 when moving along the bag axis 11 away from the closed end 14 of the filter bag 10. In other words, the proximal end 26 of the fitting cuff 20 is closer to the closed end 14 of the filter bag 10 than the distal end 28 of the fitting cuff 20. Put another way, the proximal end 26 of the fitting cuff 20 is located between the closed end 14 of the body 16 and the distal end 28 of the fitting cuff 20.

After the fitting pocket 18 is formed as seen in, for example, FIG. 2A, the distal end 38 of the sealing cuff 30 is located closer to the closed end 14 of the body 16 than the proximal end 26 of the fitting cuff 20. One advantage of providing a sealing cuff 30 having a distal end 38 located closer to the closed end 14 of the body 16 than the proximal end 26 of the fitting cuff 20 is that compression of the sealing cuff 30 may be more readily obtained when such an arrangement of the sealing cuff 30 and fitting cuff 20 is provided. Again, compression of the sealing cuff 30 may be important in forming a proper seal to prevent unwanted passage of particulate matter when using filter bags as described herein.

Before the fitting pocket 18 is formed as seen in, for example, FIG. 2A, the proximal end 36 of the sealing cuff 30 is separated from the distal end of the fitting cuff 20 by a pocket length 19 that is greater than two times the fitting cuff length 22. In one or more alternative embodiments, the pocket length 19 may be greater than a sum of the fitting cuff thickness 24 and two times the fitting cuff length 22. Such spacing between the fitting cuff 20 and the sealing cuff 30 may allow for proper formation of the fitting pocket 18 as well as proper arrangement between the fitting cuff 20 and sealing cuff 30. One advantage of providing these arrangements or spacing between the sealing cuff 30 and the fitting cuff 20 is that the sealing cuff 30 may be more readily positioned outside of a channel in which the fitting cuff 20 may be located when the filter bag 10 is provided in a filter bag assembly having a channel as described herein. Positioning the sealing cuff 30 outside of the channel in which the fitting cuff 20 is located may ensure that proper compression of the sealing cuff 30 is more readily obtained. As noted herein, compression of the sealing cuff 30 may be important in forming a proper seal to prevent unwanted passage of particulate matter when using filter bags as described herein.

Another optional feature of one or more embodiments of filter bags as described herein is the addition of a bag support connector 40 attached to the body 16 of the filter bag 10 proximate the closed end 14 of the body 16. The bag support 40 may preferably be located outside of the interior volume 13 of the body 16 of the filter back 10. In one or more embodiments, the bag support 40 may preferably include an aperture 42 configured to receive a hook or other structure configured to support the filter bag 10 at its closed end 14. In one or more embodiments, the bag support connector 40 may be as simple as a loop of material attached to opposite sides of the body 16 of the filter bag 10 as seen in, for example, FIG. 3.

Filter Bag Support Assembly

The filter bag support assemblies described herein may be particularly well-suited for use with the folded filter bags described herein. With reference to FIGS. 4-7, one illustrative embodiment of a filter bag support assembly 50 is depicted, with the depicted filter bag support assembly 50 including a flange assembly that includes a base 60 and a clamp 80. The base 60 of the flange assembly includes a tubesheet face 63 that is, in one or more embodiments, configured to seal against a dirty air chamber side of a tubesheet of a filter system as described herein. Although not depicted in FIGS. 4-7, a resilient seal may be provided on the tubesheet face 63 of the base 60.

The flange assembly formed by the combination of the base 60 and clamp 80 defines a clean air outlet extending through the base and the clamp such that air (or any other gas) located within the interior volume of a filter bag installed on the filter bag support assembly passes into or out of the interior volume through the filter media of the filter bag or the clean air outlet. In particular, the clean air outlet in the depicted illustrative embodiment of filter bag support assembly 50 includes a base aperture 64 formed in the base 60 and clamp aperture 84 formed in the clamp 80, with the base aperture 64 and the clamp aperture 84 being aligned with each other when the clamp 80 is assembled on the base 60 as described herein.

In the depicted illustrative embodiment of filter bag support assembly 50, a cage 70 is attached to the base 60, with the cage 70 extending away from the base 60 to support a filter bag as described herein. The cage 70 includes a first cage and attached to the base 60 of the flange assembly, with the cage extending over a cage length to a second cage end 72 located distal from the base 60. The cage 70 defines a cage axis 51 extending between the first cage and attached to the base 60 and the second cage end 72 located distal from the base 60.

Figure 5:
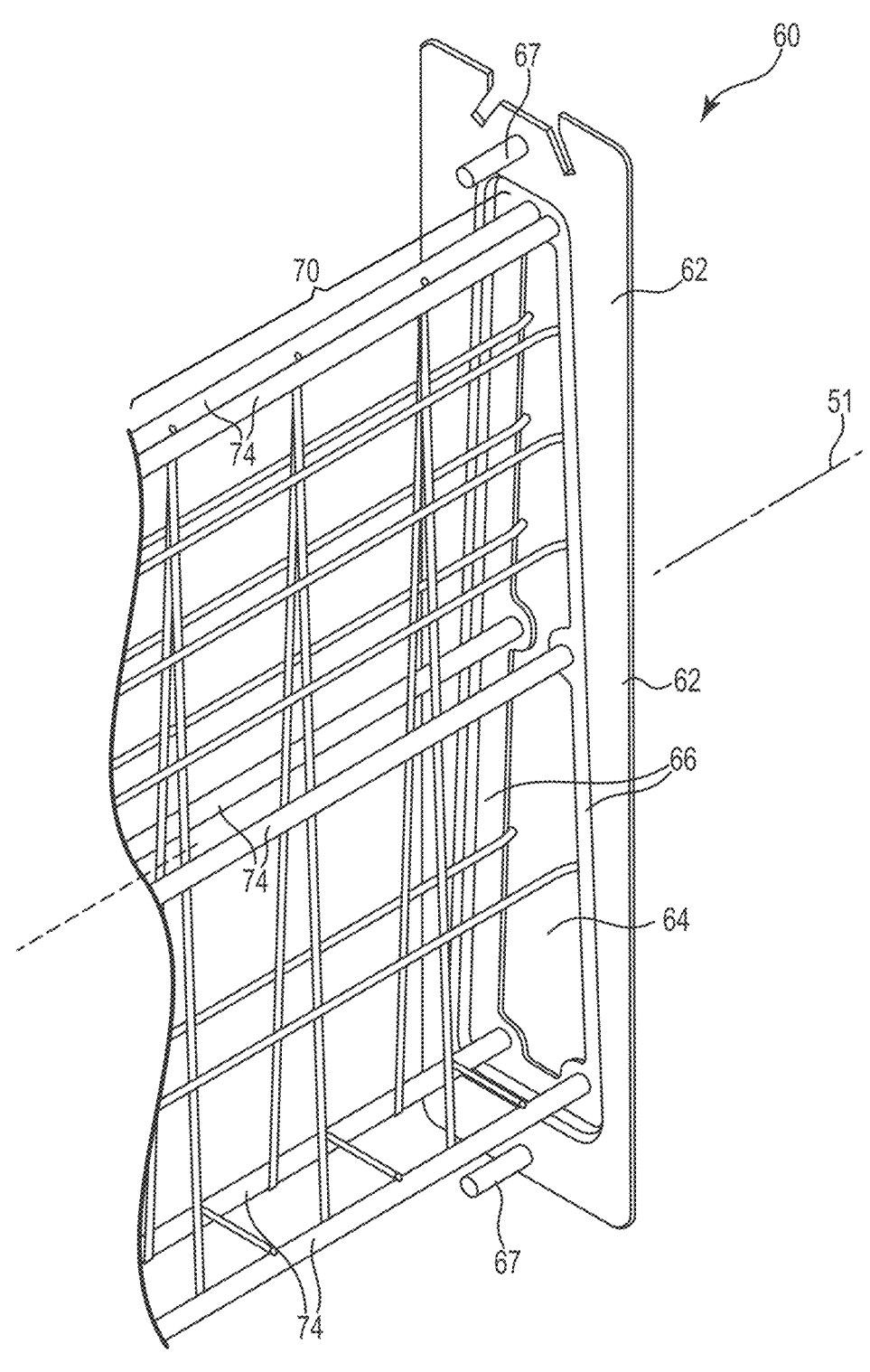
FIG. 5 is an enlarged perspective view of the backside of the base and a portion of the cage of the filter bag support assembly depicted in FIG. 4.
Figure 6:
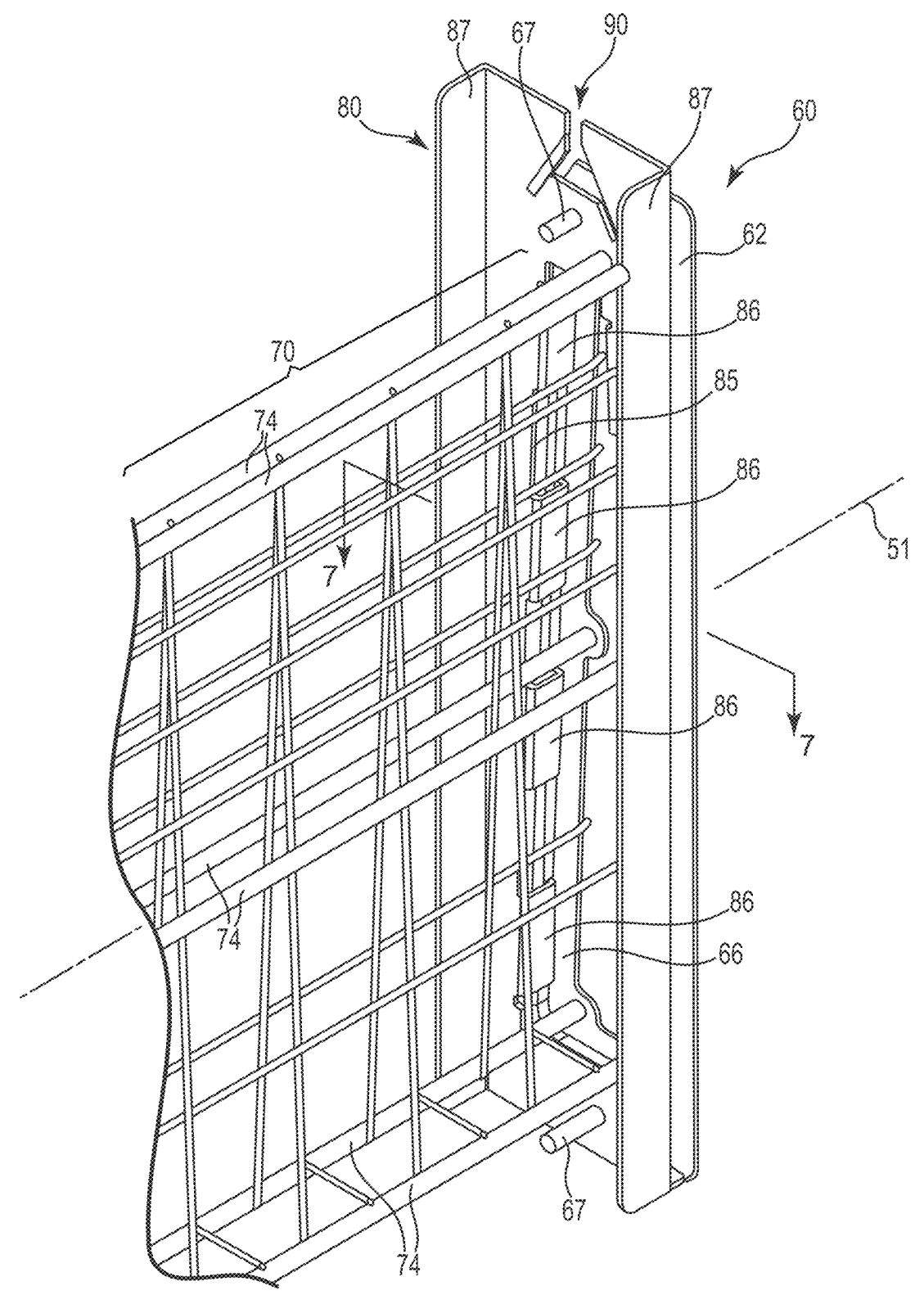
FIG. 6 is an enlarged perspective view of the backside of the base of the filter bag support assembly of FIG. 4 after advancement of the clamp over the cage and towards the base.

The depicted illustrative embodiment of cage 70 includes struts 74 extending away from the base 60 along the cage axis 51, with struts 74 terminating in a set of end struts 73 located distal from the base 60. The cage 70 as depicted in FIGS. 5-6 also includes braces extending between the struts 74 to provide additional support to a filter bag positioned on the cage 70. The depicted arrangements of struts 74 and 73 in cage 70 provide only one example of a cage that may be used to support a filter bag in connection with the filter bag support assemblies described herein.

The base 60 of the filter bag support assembly 50 includes a base plate 62 having a base surface facing the clamp 80 and a base aperture 64 containing the clean air outlet of the flange assembly in the base 60. The base 60 also includes a channel 66 surrounding the base aperture 64, with the channel extending away from the clamp 80 of the flange assembly.

Figure 7:
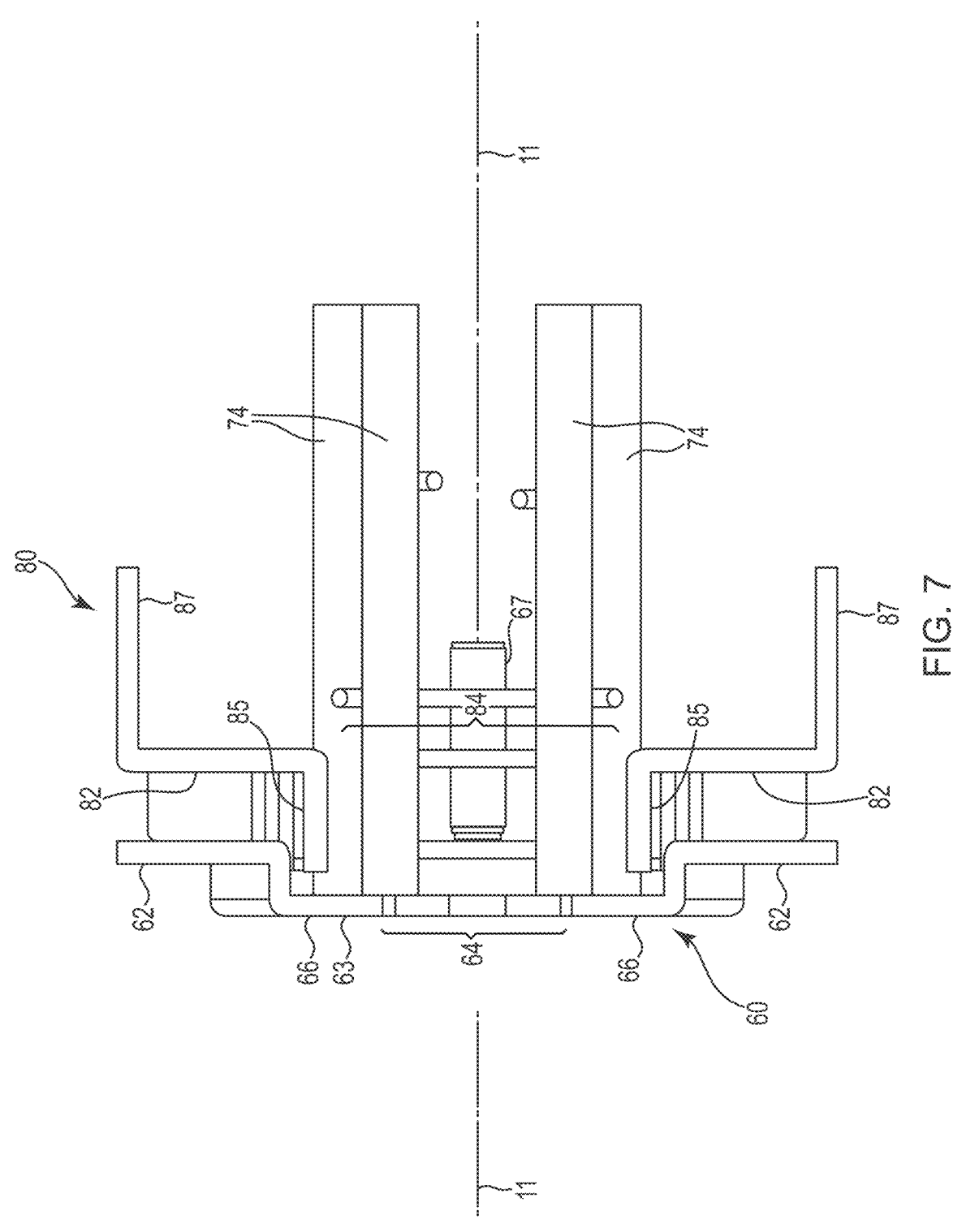
FIG. 7 is an enlarged cross-sectional view of the flange assembly depicted in FIG. 6 taken along line 7-7 in FIG. 6.

The clamp 80 of the filter bag support assembly 50 includes a clamp plate 82 containing the clamp aperture 84 which forms a part of the clean air outlet extending through the base 60 and clamp 80. The depicted illustrative embodiment of clamp 80 further includes one or more guide fins 86 located along a perimeter of the clamp aperture 84. With reference to FIGS. 6 and 7, the one or more guide fins 86 extend into the channel 66 surrounding the base apertures 64 in base 60 when the clamp 80 is attached to the base 60 and the cage 70 is located within the clamp aperture 84.

The depicted illustrative embodiment of clamp 80 includes an optional pair of reinforcing ribs 87 meant to provide structural rigidity to the clamp plate 82 such that the clamp plate 82 resists deformation when attached to the base 60 using, for example, stud bolts 67 on base 60 that extend through apertures located above and below the clamp aperture 84 as seen in, for example, FIG. 4.

The depicted illustrative embodiment of clamp 80 includes a plurality of guide fins 86 positioned about the perimeter of the clamp aperture 84. Adjacent pairs of the guide fins 86 are spaced apart from each other about the perimeter of the clamp aperture 84. Although clamp 80 may be provided with as few as one guide fin 86 that, in one or more embodiments, extends around substantially all of the perimeter of the clamp aperture 84, providing a plurality of guide fins 86 spaced apart from each other may provide advantages over designs including a continuous guide fin. For example, the plurality of guide fins 86 spaced apart from each other may result in a reduced likelihood of binding when the clamp 80 is used to advance a filter bag over the cage 70. In one or more embodiments, the guide fins 86 may, together with the fitting cuff of a folded filter bag, form tortuous path around the bag opening that may assist in sealing.

In one or more embodiments of filter bag support assemblies described herein that include spaced apart guide fins 86, the guide fins 86 may, collectively, occupy, at a lower end, 30% or more, 40% or more, 50% or more, 60% or more, 70% or more, 80% or more or 90% or more of the perimeter of the clamp aperture 84. At an upper end, the guide fins 86 may occupy less than all of the perimeter of the clamp aperture 84.

In one or more embodiments of the filter bag support assemblies described herein, the clean air outlet defined within the flange assembly, that is, defined by the combination of the base aperture 64 and the clamp aperture 84, may be elongated such that the clean air outlet defines a maximum height along a major axis and a maximum width less than the maximum height along a minor axis that is transverse to the major axis. In terms of FIGS. 4-6, the major axis would extend generally vertically from the narrow end of the base aperture 64 and clamp aperture 84 two the opposite end of the base aperture 64 and clamp aperture 84 while the minor axis would be generally transverse to that major axis. Both the major axis and the minor axis would be generally transverse to the cage axis 51. In one or more embodiments, the maximum height of the clean air outlet as defined by the base apertures 64 and clamp aperture 84 may be greater than the maximum width by a factor of two or more, three or more, or four or more to provide an elongated clean air outlet as defined herein.

Another optional feature that may be provided in connection with one or more embodiments of a filter bag support assembly as described herein is a guide aperture 90. The guide aperture 90 may be located outside of the cage 70 attached to the base 60 as well as the clean air outlet as defined by the base aperture 64 and clamp aperture 84. The guide aperture 90 is, in one or more embodiments, configured to receive a guide rail when the clamp 80 is attached to the base 60 and the flange assembly (constituted by the base 60 and clamp 80) is configured for advancement along a guide rail received in the guide aperture 90 when the clamp 80 is attached to the base 60. The guide aperture 90 may provide an opportunity to hang the tubesheet and of the filter bag support assembly 50 (that is, the end of the filter bag support assembly 50 including base 60 and clamp 80) to advance the filter bag support assembly along a guide rail towards a tubesheet as described herein. The depicted illustrative embodiment of guide aperture 90 is only one example of many different guide apertures that may be used to support a filter bag support assembly described herein on a guide rail as described herein.

The guide aperture 90 may, in one or more embodiments, be formed in only one of the base 60 and the clamp 80. In one or more alternative embodiments, the guide aperture 90 may be formed in the clamp 80 of a flange assembly formed by clamp 80 and base 60.

Filter Bag Assembly

Figure 4:
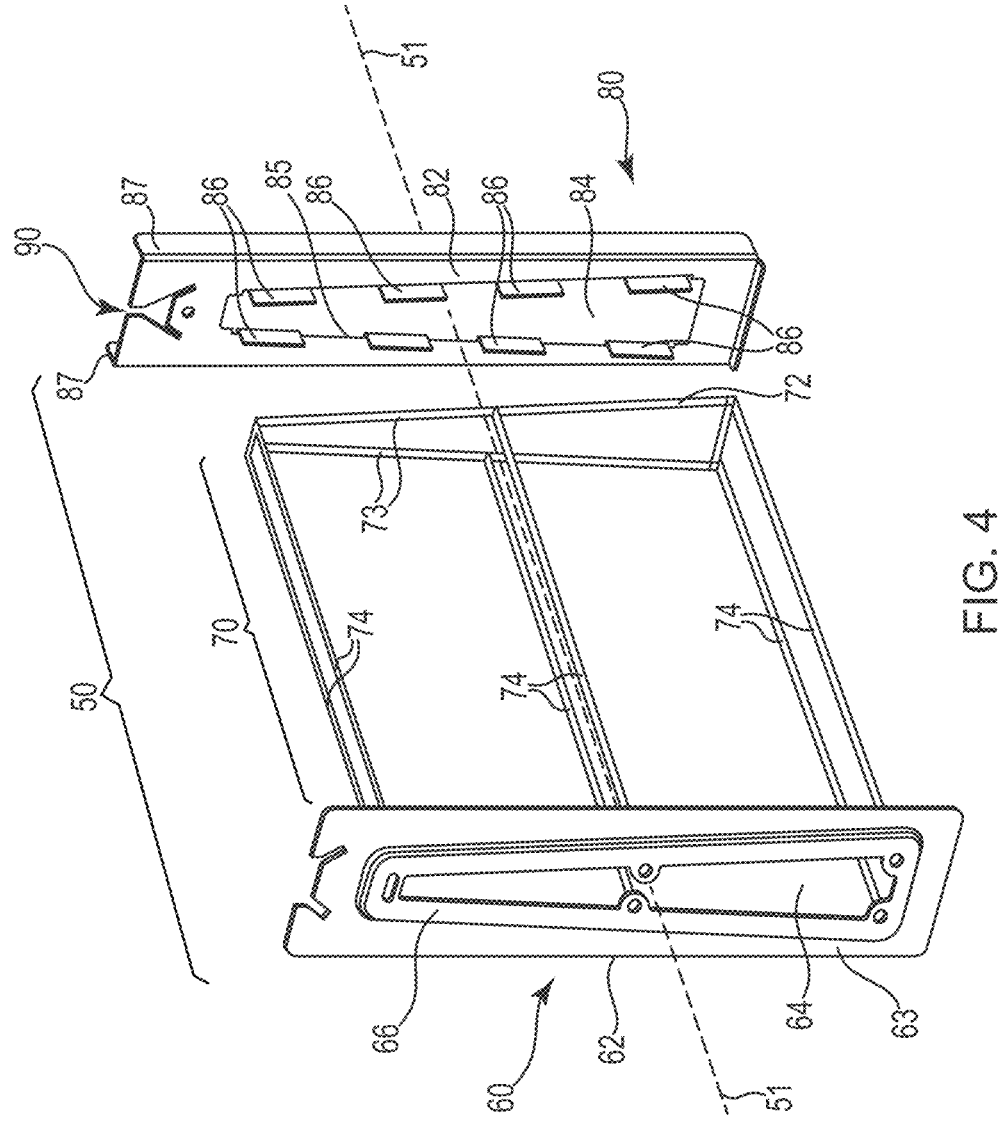
FIG. 4 is an exploded perspective view of one illustrative embodiment of a filter bag support assembly as described herein including a base having a cage extending therefrom and a clamp positioned for advancement over the cage towards the base.
Figure 8:
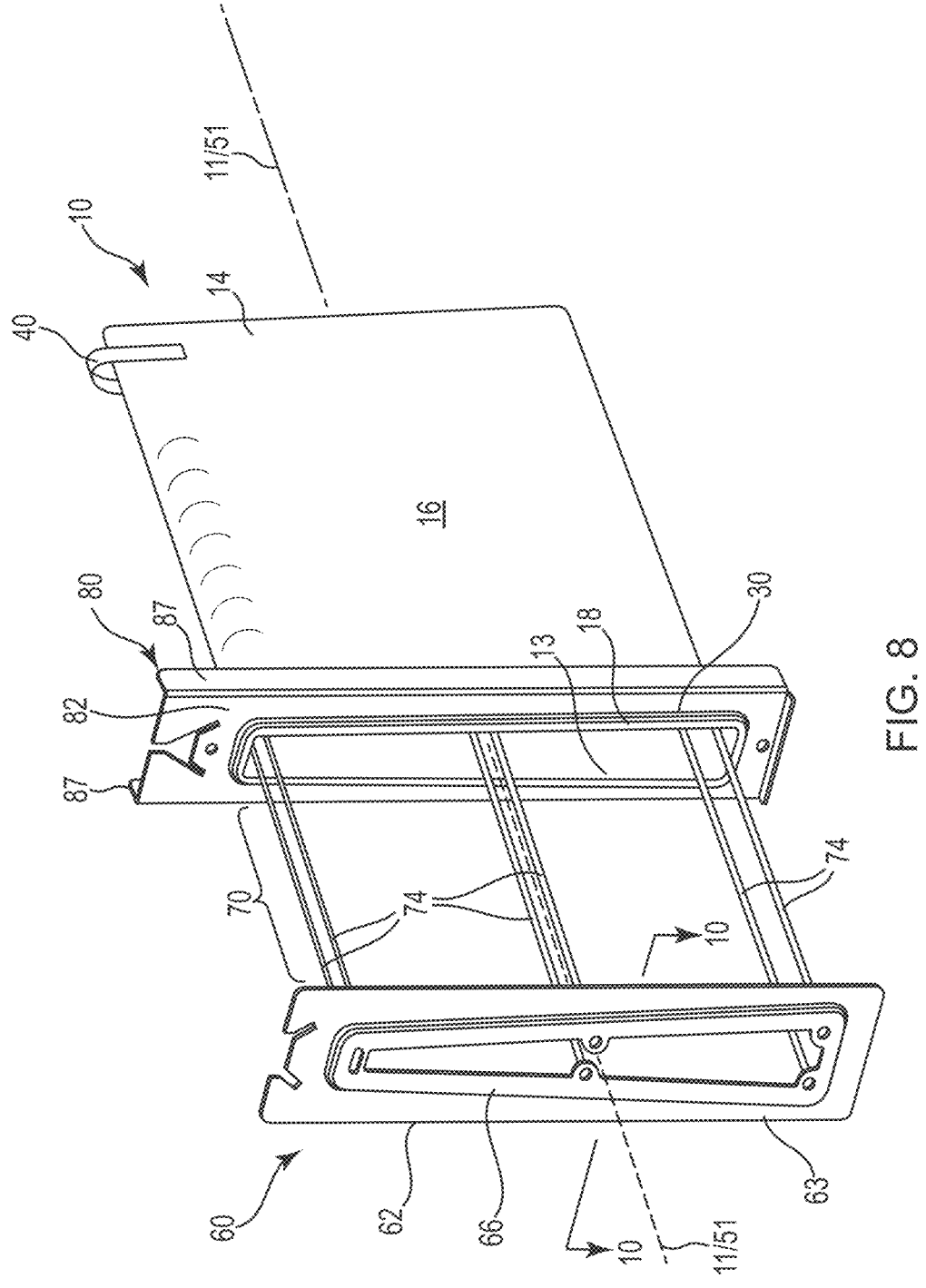
FIG. 8 is an exploded perspective view of the filter bag support assembly of FIG. 4 with one illustrative embodiment of a folded filter bag fitted onto the clamp and partially advanced over the cage extending from the base of the flange assembly.

FIG. 8 is an exploded perspective view of one illustrative embodiment of a filter bag assembly including the filter bag support assembly of FIG. 4 with one illustrative embodiment of a folded filter bag 10 of FIGS. 1-3 fitted onto the clamp 80 and partially advanced over the cage 70 extending from the base 60 of the flange assembly. As seen in FIG. 8, the struts 74 of the cage 70 attached to the base 60 extend into the interior volume 13 of the filter bag 10.

To complete the process of mounting the filter bag 10 on the filter bag support assembly, the clamp 80 is advanced over the cage 70 until the clamp 80 is located adjacent the base 60. When the clamp 80 is located adjacent the base 60 and attached thereto, the tubular body 16 of the filter bag 10 surrounds the cage 70 such that the cage 70 is contained within the filter bag 10.

Figure 9:
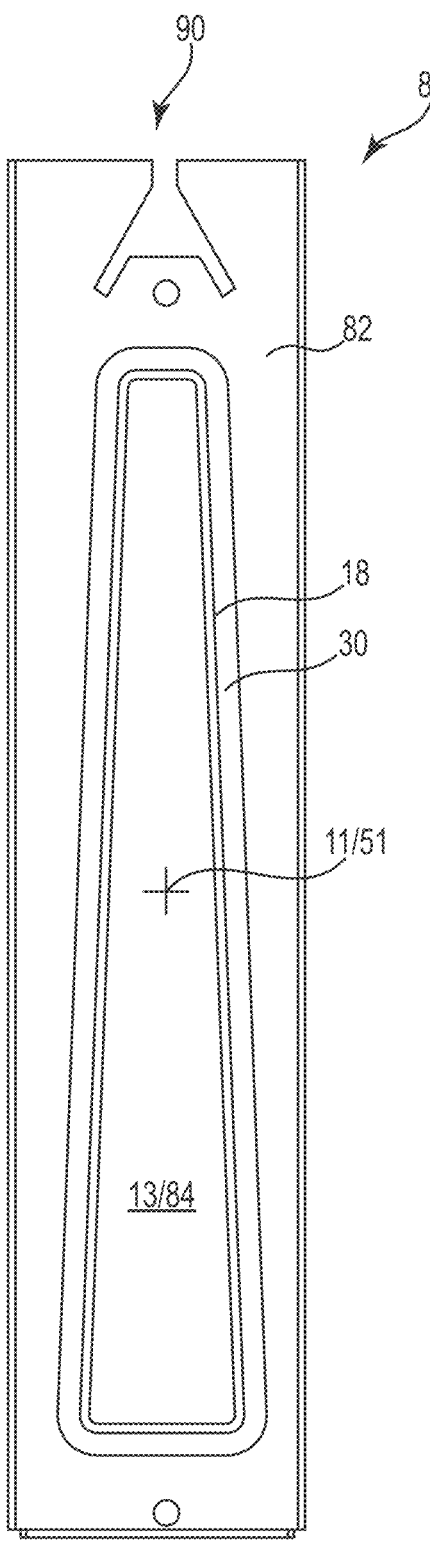
FIG. 9 is an end view of the clamp of the filter bag support assembly of FIG. 8 with a folded filter bag positioned thereon taken along the bag axis 11/cage axis 51 as seen in FIG. 8.

With reference to, for example, FIGS. 2A and 9, the clamp 80 can be used to hold the filter bag 10 open to first insert the cage 70 into the filter bag 10 and then advance the filter bag 10 over the cage 70 after the guide fins 86 on the clamp 80 are positioned in the fitting pocket 18 (see, for example, FIG. 2A) of the filter bag 10. In the view of FIG. 9, the interior volume 13 of the filter bag 10 is aligned with the clamp aperture 84 in clamp 80 while the sealing cuff 30 of the filter bag 10 is located outside of the perimeter of the clamp aperture 84. When so positioned, the sealing cuff 30 is in position to form a seal between the clamp 80 and the base 60 when the clamp 80 is fully advanced to the base 60. Although not visible in the view of FIG. 9, the guide fins 86 on clamp 80 are positioned within the fitting pocket 18 formed just inside of the sealing cuff 30 and in contact with the fitting cuff located within the fitting pocket 18 (as seen in, for example, FIG. 2A).

Figure 10:
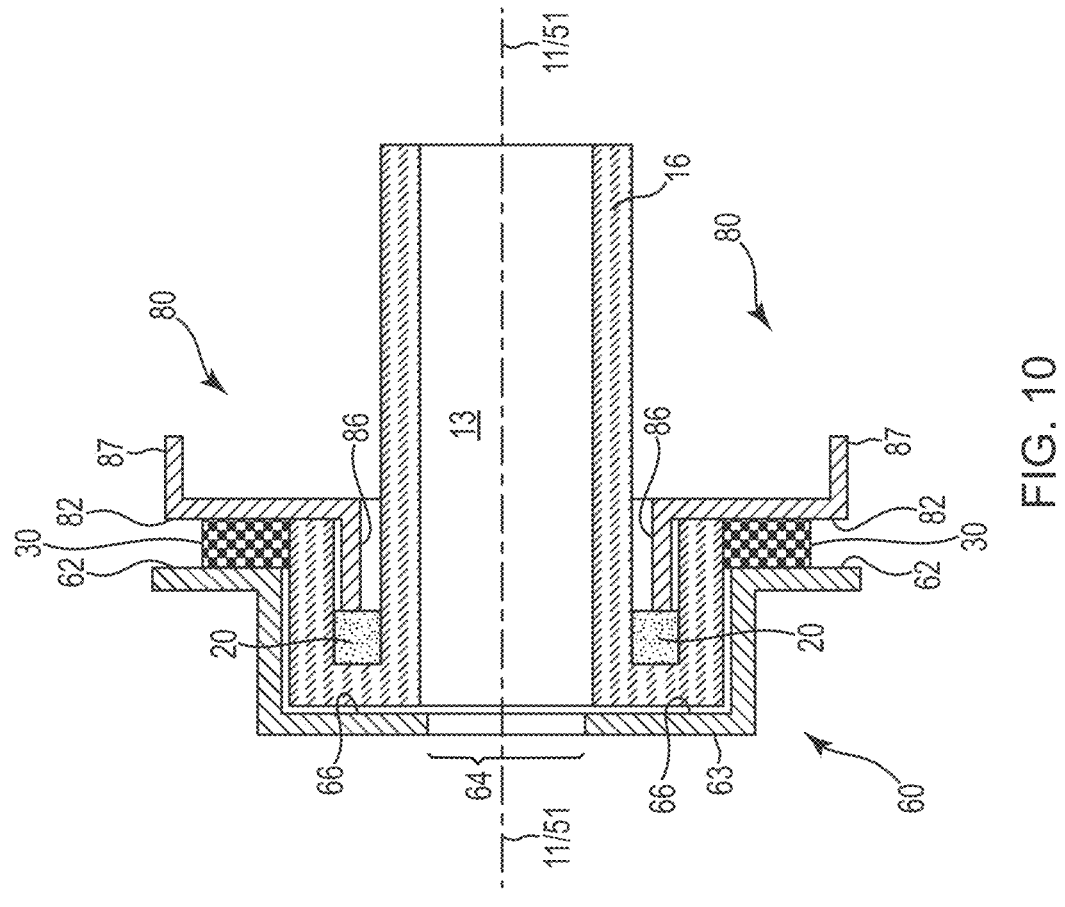
FIG. 10 is a cross-sectional view of the filter bag assembly of FIG. 8 taken along line 10-10 in FIG. 8 after assembly of the clamp and folded filter bag with the base of the flange assembly (with features of the cage removed for clarity).

FIG. 10 is a cross-sectional view of the flange assembly after advancement of the clamp 80 to the base 60 such that the sealing cuff 30 is located between the base 60 and clamp 80, while fitting cuff 20 is located within the channel 66 of base 60. As seen in FIG. 10, the sealing cuff 30 is positioned between the base plate 62 and the clamp plate 82. The fitting cuff 20 is located between the guide fin 86 of clamp 80 and the base plate 62.

The sealing cuff 30 forms a seal between the base 60 and the clamp 80 around the clean air outlet formed by the base apertures 64 and the clamp aperture 84 (which, in the view of FIG. 10, is located between the opposing guide fins 86). With the seal formed by sealing cuff 30 between base 60 and clamp 80, air (or any other gas) passing into or out of the interior volume 13 of the filter bag must pass through the clean air outlet or the filter media forming the body 16 of the filter bag 10. In one or more embodiments, the sealing cuff 30 is preferably compressed between the base plate and the clamp. As used herein, the term "compressed" means that the sealing cuff 30 has been at least partially deformed between the base plate 62 and the clamp 80.

In the depicted illustrative embodiment, the base 60 includes a channel 66 surrounding the base aperture 64 as described in connection with the filter bag support assembly of FIGS. 4-7. The channel 66 is surrounded by the base plate 62 and extends away from the clamp 80. The fitting cuff 20 of the filter bag 10 is located in the channel 66 formed in the base 60.

While the sealing cuff 30 is typically compressed sufficiently to form a seal between the base 60 and clamp 80, in one or more embodiments, the guide fins 86 on clamp 80 may also slightly compress the fitting cuff 20 of the filter bag 10 and the channel 66 when the sealing cuff 30 is compressed to form a seal between the base 60 and the clamp 80 around the clean air outlet defined by the base aperture 64 and clamp aperture 84. At least some compression of the fitting cuff 20 by the guide fins 86 may be helpful in securing the filter media 16 in place between the base 60 and the clamp 80 in a manner that prevents or limits movement of the filter media 16 that could result in undesirable abrasion and/or tearing of the filter media 16 proximate the location of the guide fins 86. In addition, compression of the fitting cuff 20 may also assist in sealing the filter bag 10 around the clean air outlet defined by the base aperture 64 and clamp aperture 84.

In one or more embodiments, the sealing cuff 30 may be described as surrounding the channel 66 between the base plate 62 and the clamp plate 82. With the channel 66 surrounded by the sealing cuff 30, the seal formed by the sealing cuff 30 between the base 60 and clamp 80 also extends continuously around the channel and the base aperture 64/clamp aperture 84 when the base 60 and the clamp are assembled with the fitting cuff 20 and sealing cuff 30 captured therebetween.

Other features of the filter bag 10 and filter bag support assembly 50 may also be incorporated into the filter bag assembly depicted in FIGS. 8-10, with those optional features including, but not limited to, a bag support connector 40, a plurality of guide fins 86 positioned about the perimeter of the clamp aperture 84, a guide aperture 90, and an elongated clean air outlet.

Alternative Embodiments

Figure 11A:
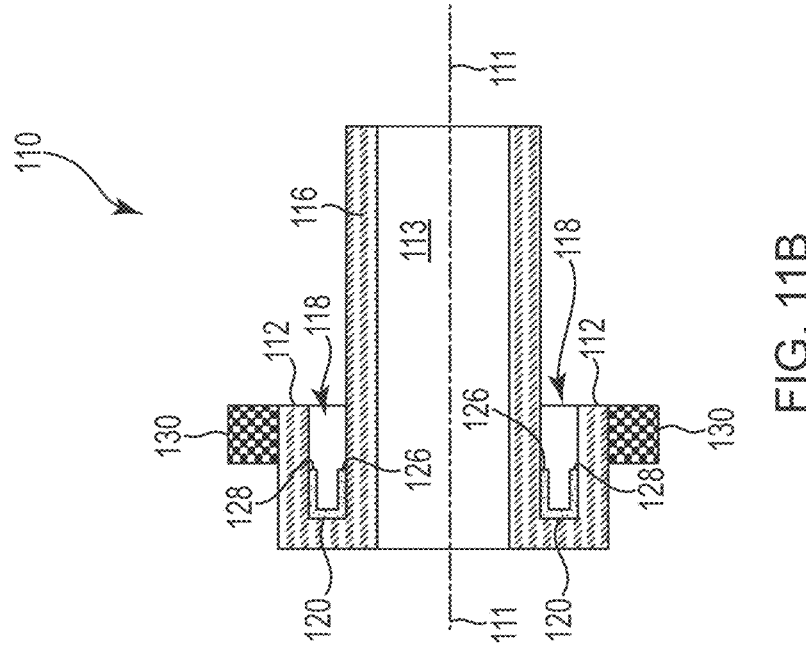
FIG. 11A is a partial cross-sectional view of another illustrative embodiment of a filter bag before folding of the filter bag opening as described herein, with the view being similar to that of FIG. 1A.
Figure 11B:
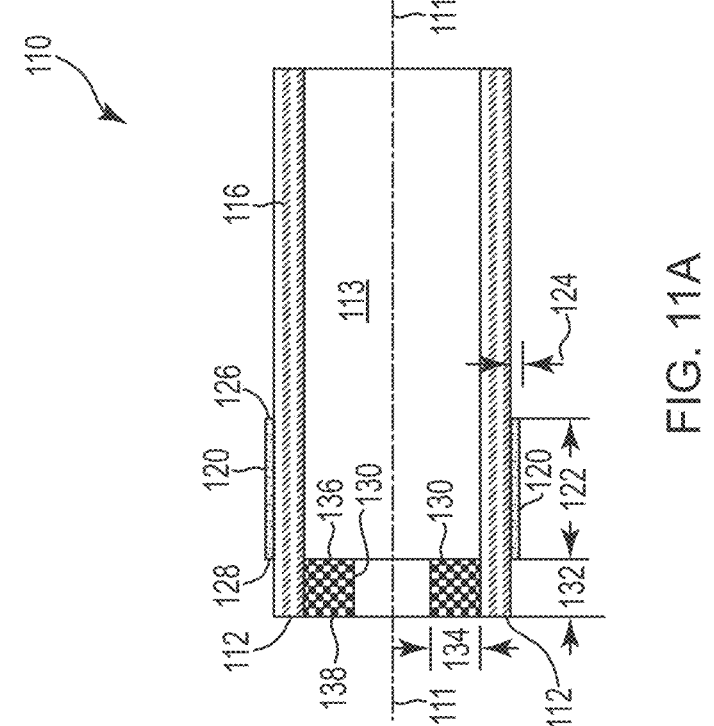
FIG. 11B is a partial cross-sectional view of the filter bag of FIG. 11A after folding of the filter bag opening as described herein (with the view being similar to that of FIG. 2A).
Figure 11C:
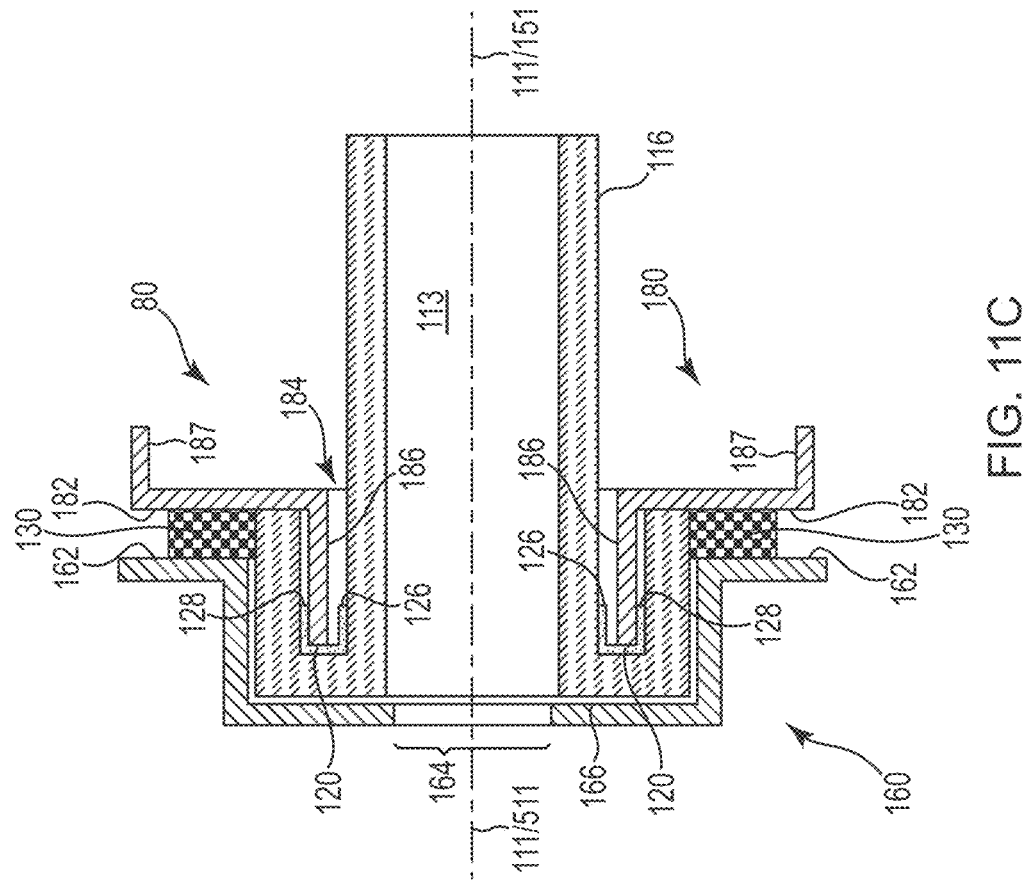
FIG. 11C is a cross-sectional view of the folded filter bag of FIG. 11B after assembly of the filter bag with the clamp and base of an illustrative embodiment of a flange assembly as described herein (with the view being similar to that seen in FIG. 10).

FIGS. 11A-11B depict one alternative embodiment of a filter bag 110 and FIG. 11C depicts the filter bag 110 in a flange assembly of an alternative embodiment of a filter bag assembly incorporating the filter bag 110.

FIGS. 11A-11B depict only the portion of the filter bag 110 proximate the filter bag opening 112, where a fitting cuff 120 and a sealing cuff 130 attached to the filter media forming the tubular shape of the body 116. The filter media forming the body 116 proximal from the sealing cuff 130 is configured to be folded such that a fitting pocket 118 (seen in FIG. 11B) is formed in the filter media proximal from the sealing cuff 130 before being folded to form the fitting pocket 118 as depicted in FIG. 11B. The fitting cuff 120 is located within the fitting pocket 118 and the sealing cuff 130 is located outside of the fitting pocket 118 as seen in FIG. 11B.

When moving along the bag axis 111 away from the closed end (not shown) of the filter bag 110, the bag opening 112 is positioned between the fitting pocket 118 and the closed end of the body 116 of the filter bag 110 after the fitting pocket 118 is formed. In one or more embodiments, the bag opening 112 may be positioned between the fitting cuff 120 and the closed end of the body 116 after the fitting pocket 18 is formed because it may be preferred that the fitting cuff 120 does not occupy the portion of the exterior surface of the body 116 outside of the fitting pocket 118 to avoid limiting the amount of filter media surface area available for use during filtering.

One difference between the illustrative embodiment of fitting cuff 120 as compared to the illustrative embodiment of fitting cuff 20 depicted in, e.g., FIGS. 1-3 and 10, is that fitting cuff 120 may be constructed of materials that are selected for their abilities to resist abrasion and/or tearing due to contact with the guide fins 86 of the clamps 80 used to assembly the filter bag assemblies and secure the filter bags during use in a collector. For example, in one or more embodiments, the filter cuff 120 may be manufactured of one or more of the following materials: leather, fabrics (woven/nonwoven), polymeric films, coatings (e.g., latex, etc.). While they may be compressible, these materials may be distinguished from the fitting cuffs made of compressible materials as described above in connection with the filter bag depicted in FIGS. 1-3 by their ability to be folded within the fitting pocket 118 such that they form a reinforced pocket within the fitting pocket 118.

FIG. 11C depicts, in a cross-sectional view (similar to that seen in FIG. 10) taken transverse to the bag axis 111/cage axis 151, the illustrative embodiment of fitting bag 110 in a flange assembly including a base 160 and a clamp 180. In FIG. 11C, the sealing cuff 130 is located between the base 160 and clamp 180, while fitting cuff 120 is located within the channel 166 of base 160. In particular, the sealing cuff 130 is positioned between the base plate 162 and the clamp plate 182. The fitting cuff 120 is located between the guide fin 186 of clamp 180 and the channel 166 in base plate 62. The clamp 180 also includes reinforcing ribs 187 to increase the rigidity of the clamp 180.

The sealing cuff 130 forms a seal between the base 160 and the clamp 180 around the clean air outlet formed by the base apertures 164 and the clamp aperture 184 (which, in the view of FIG. 11C, is located between the opposing guide fins 186). With the seal formed by sealing cuff 130 between base 160 and clamp 180, air (or any other gas) passing into or out of the interior volume 113 of the filter bag 110 must pass through the clean air outlet or the filter media forming the body 116 of the filter bag 110. In one or more embodiments, the sealing cuff 130 is preferably compressed between the base 160 and the clamp 180. Also seen in FIG. 11C is the positioning of the edges of the guide fins 186 in the reinforced pocket formed within the fitting pocket 118 by the fitting cuff 120.

Figure 12:
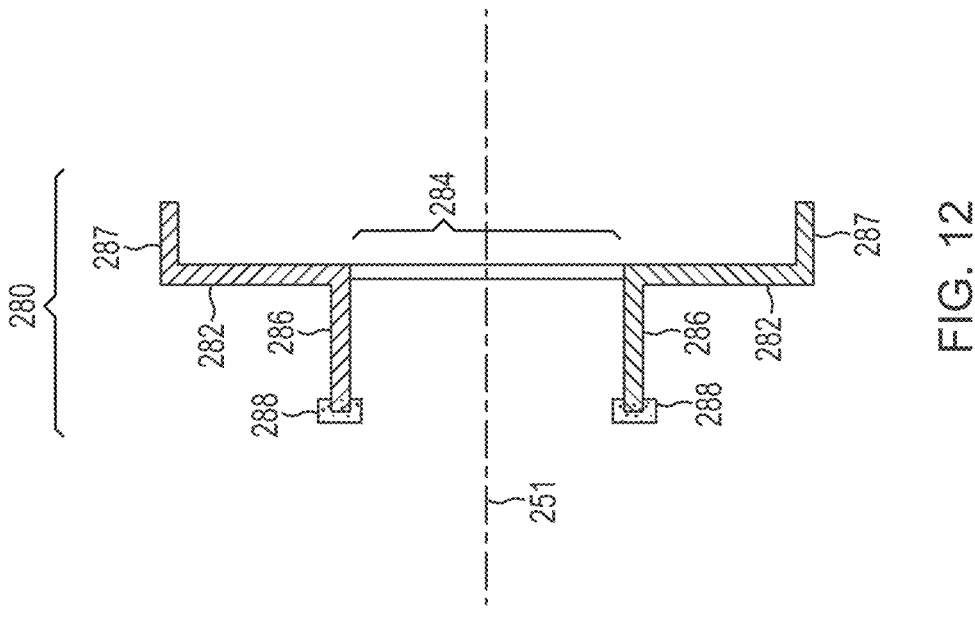
FIG. 12 is a cross-sectional view of one alternative clamp that may be used with one or more embodiments of the flange assemblies described herein.

FIG. 12 depicts, in a cross-sectional view taken in a plane transverse to the cage axis 251 (similar to that seen in FIGS. 7, 10, and 11C), another alternative embodiment of a clamp 280 that may be used in one or more embodiments of the filter bag support assemblies and filter bag assemblies described herein. The depicted clamp 280 includes a clamp plate 282, guide fins 286, and reinforcing ribs 287.

The depicted clamp 280 further includes sleeves 288 on the leading edges of the guide fins 286. In one or more embodiments, the sleeves 288 may serve to reduce the likelihood of the guide fins 286 abrading and/or tearing the filter media of a filter bag during assembly of a filter bag assembly and/or during use regardless of the form of the fitting cuff provided on a fitting bag with which the clamp 280 is used. These advantages may be achieved by, in addition to increasing surface are at the leading edges of the guide fins 286 and/or eliminating sharp edges, providing one or more of the following properties: elastic compressibility, reduced friction, etc.

Figure 13:
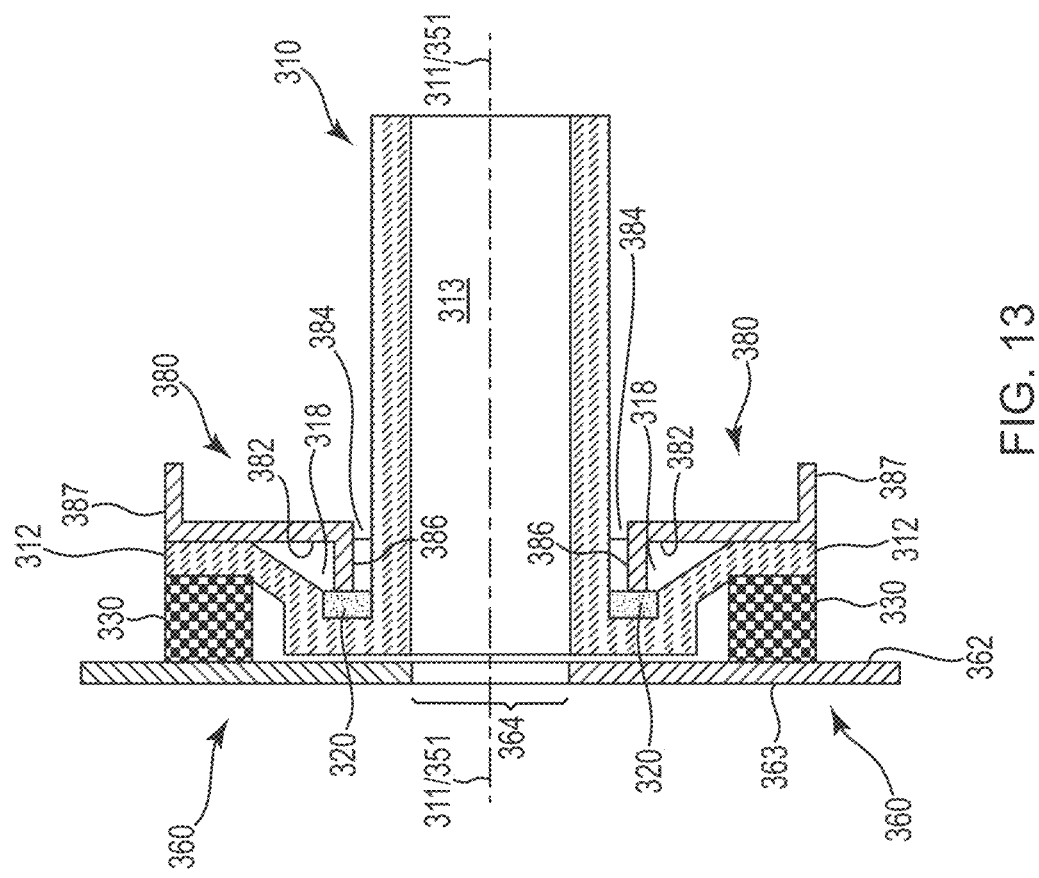
FIG. 13 is a cross-sectional view of the folded filter bag of FIG. 11B after assembly of the filter bag with the clamp and base of another illustrative embodiment of a flange assembly as described herein (with the view being similar to that seen in FIGS. 10 and 11C except that the base of the flange assembly does not include a channel in which the fitting cuff is received).

FIG. 13 depicts, in a cross-sectional view taken in plane transverse to the bag axis 311 and cage axis 351, another alternative embodiment of a filter bag assembly incorporating a folded filter bag 310 assembled in a flange assembly that includes a base 360 and a clamp 380. As in other illustrative embodiments of filter bag assemblies described herein, the filter bag 310 includes a fitting cuff 320 and a sealing cuff 320, with the sealing cuff 320 being located in a fitting pocket 318 formed by folding the bag opening 312 back towards the closed end (not shown) of the filter bag 310.

The clamp 380 includes a clamp plate 382, along with guide fins 386 and reinforcing ribs 387 as described herein in connection with the other illustrative embodiments of clamps, with the sealing cuff 330 being compressed between the clamp 380 and the base 360 to form a seal around the clean air outlet defined by the base opening 364 and the clamp opening 384.

One difference between the assembly depicted in FIG. 13 and other illustrative embodiments of the assemblies described herein is that the base 360 does not include a channel configured to receive the fitting cuff 320 and/or fitting pocket 318 of the filter bag 310. In the depicted embodiment, the base 360 includes a flat base plate 362 in which both the tubesheet face 363 and the opposite side of the base plate 362 (that is, the side of the base plate 362 facing the clamp 380) are essentially flat. Such a construction may simplify manufacturing of the base 360 as compared to versions of the base including a channel as described herein.

Although the filter bag assemblies and the filter bag support assemblies used in the filter bag assemblies are adapted for use with folded filter bags as described herein, the assemblies can, in one or more embodiments, be adapted for use with conventional filter bags that are not folded using a transition flange as described herein. One potential advantage of providing and using a transition flange as described herein is that, if filter bags configured for folding (offering all of the advantages associate with foldable filter bags as described herein) are not available, the transition flange can allow for operation of the filter systems.

Figure 14:
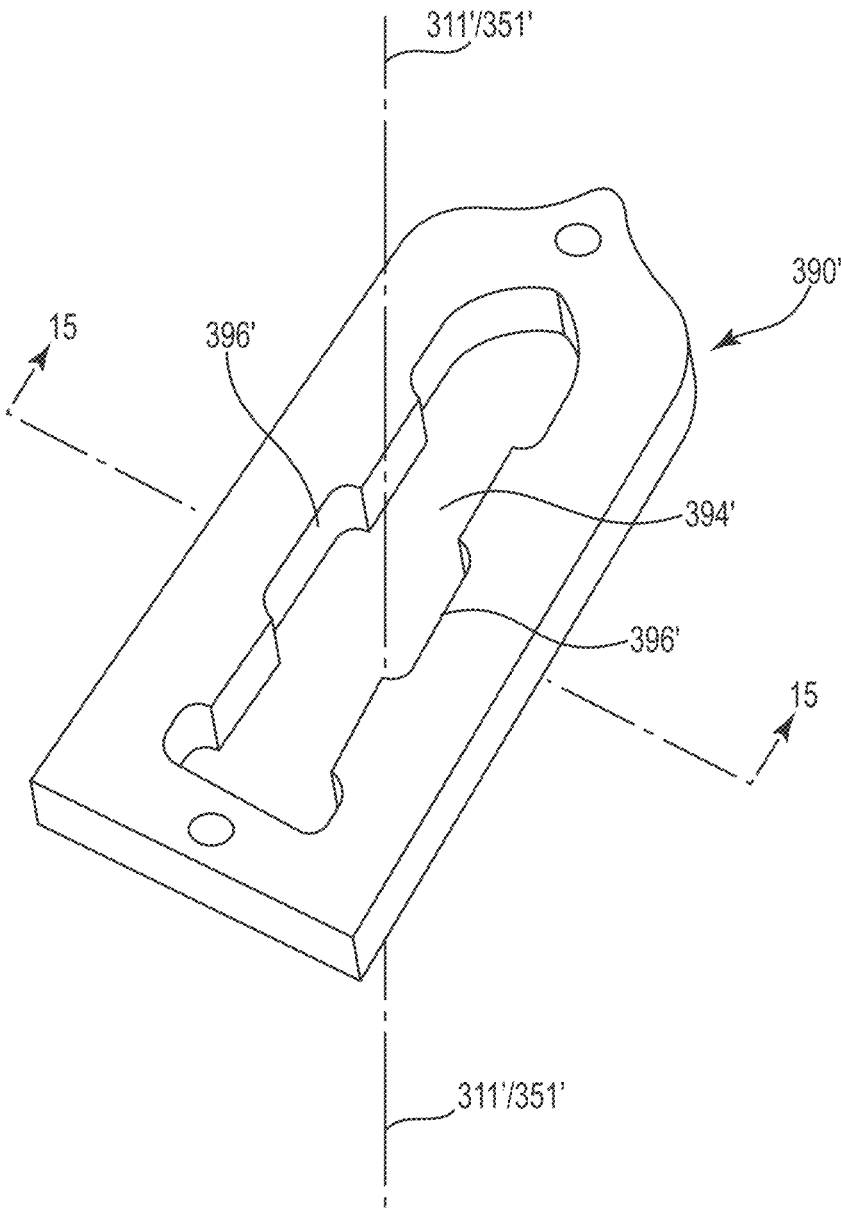
FIG. 14 is a perspective view of one illustrative embodiment of a transition flange that may be used in one or more embodiments of the filter bag support assemblies and filter bag assemblies to adapt the assemblies for conventional, non-folded filter bags.
Figure 15:
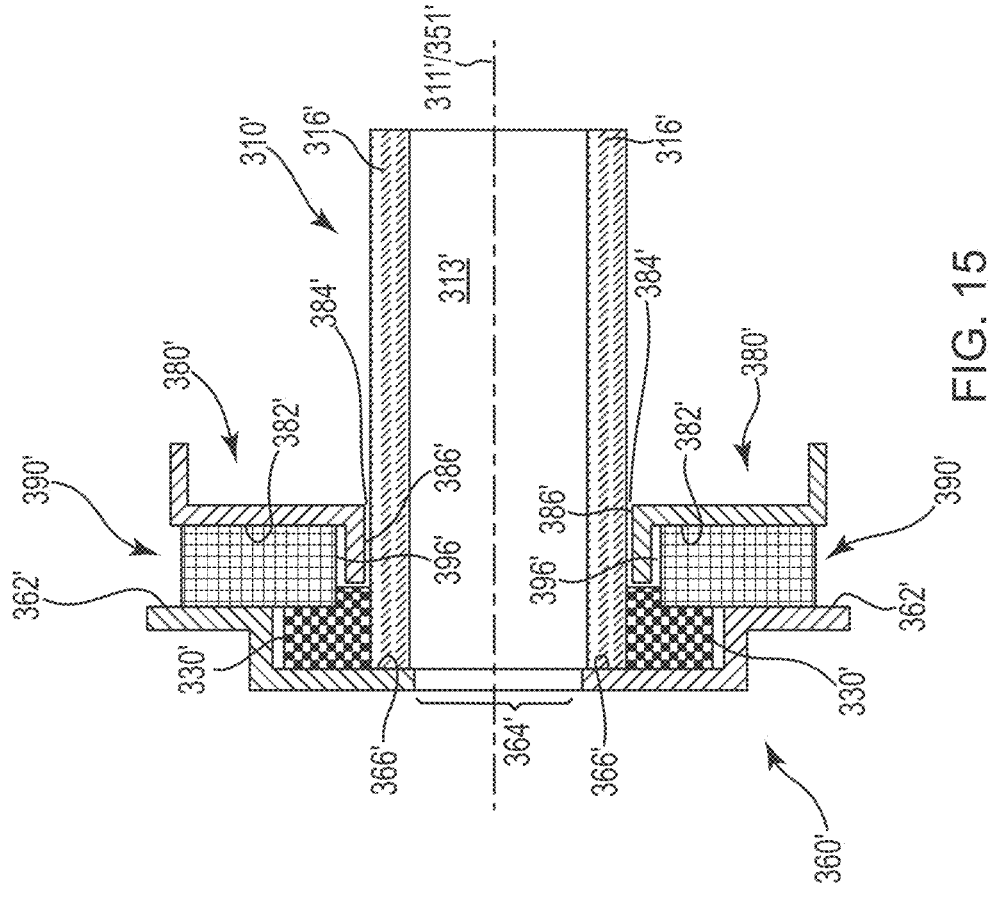
FIG. 15 is a cross-sectional view of the transition flange of FIG. 14 in one illustrative embodiment of a filter bag assembly including a flange assembly having a base and a clamp as described herein (with the view being similar to that seen in FIGS. 10 and 11C).

With reference to FIGS. 14-15, the depicted illustrative embodiment of a transition flange 390' includes a flange aperture 394' that, in use, is aligned with the base aperture 364' in the base 360' and the clamp aperture 384' in the clamp 380'. As a result, the clean air outlet formed through the flange assemblies as described herein is located (at least partially) within the flange aperture 394' as depicted in FIG. 15. The transition flanges used in one or more embodiments of the assemblies described herein may be formed of one or more materials that are compressible and/ort incompressible under the forces used in the assemblies described herein. It may be preferred that the transition flanges are impermeable to air or other gases under that conditions in which they are used in the assemblies described herein. Suitable materials for the transition flanges include, but are not limited to, metals, polymers, etc.)

When assembled, the sealing cuff 330' of the filter bag 310' (attached to the tubular body 316') is located between the base 360' and the clamp 380' when the clamp 380' is attached to the base 360'. In one or more embodiments, the sealing cuff 330' forms a seal between the base 360' and the transition flange 390' around the clean air outlet as described herein. The transition flange 390' may also, in one or more embodiments, form a seal with the surface 382' of the clamp 380'. In forming that seal, the sealing cuff 330' may be compressed between the base 360' and the transition flange 390'. As depicted in FIG. 15, a portion of the transition flange 390' is located between the sealing cuff 330' and the clamp plate 382' of the clamp 380'.

In one or more embodiments of the transition flanges described herein, the flange aperture 394' (see FIG. 14) may include one or more guide fin notches 396' in the perimeter of the flange aperture 394'. The guide fin notches 396' are provided to receive or provide clearance for guide fins on one or more embodiments of clamps as described herein (see, e.g., guide fins 86 on clamp 80 in FIG. 4). In FIG. 15, the clamp 380' includes guide fins 386' in notches 396' of transition flange 390'.

In embodiments of assemblies that include channels in the bases as described herein (see, e.g., FIG. 4), a portion of the transition flange 390' may be located between the channel 366' surrounding the base aperture 364' and the clamp plate 382' of the clamp 380'.

Filter Systems

The foldable filter bags, filter bag support assemblies, and filter bag assemblies described herein can all be used in any suitable filter system (sometimes referred to as a collector) to remove particulate matter from a gas stream (e.g., air) in which particulate matter is entrained. One illustrative embodiment of a filter system is depicted generally at 410 in FIG. 16 and is generally in the shape of a box and includes an upper wall panel 416, and two pairs of opposite side wall panels 417 (one of which is visible in FIG. 16). The filter system 410 includes a dirty air conduit 411 for receiving dirty or contaminated gas (e.g., air with particulate matter entrained therein) into the filter system 410. A clean gas (e.g., air) conduit 413 (see, e.g., FIG. 18) may be provided for removing clean or filtered air from the filter system 410. The filter system 410 includes covers 470 closing access ports in the access panel 419 of the filter system 410.

The filter system may also include a hopper 418 to collect particulate matter separated from the dirty air stream as described herein. The hopper 418 may include sloped walls to facilitate collection of the particulate matter and may, in some embodiments, include a driven auger or other mechanism for removing the collected particulate matter.

Figure 16:
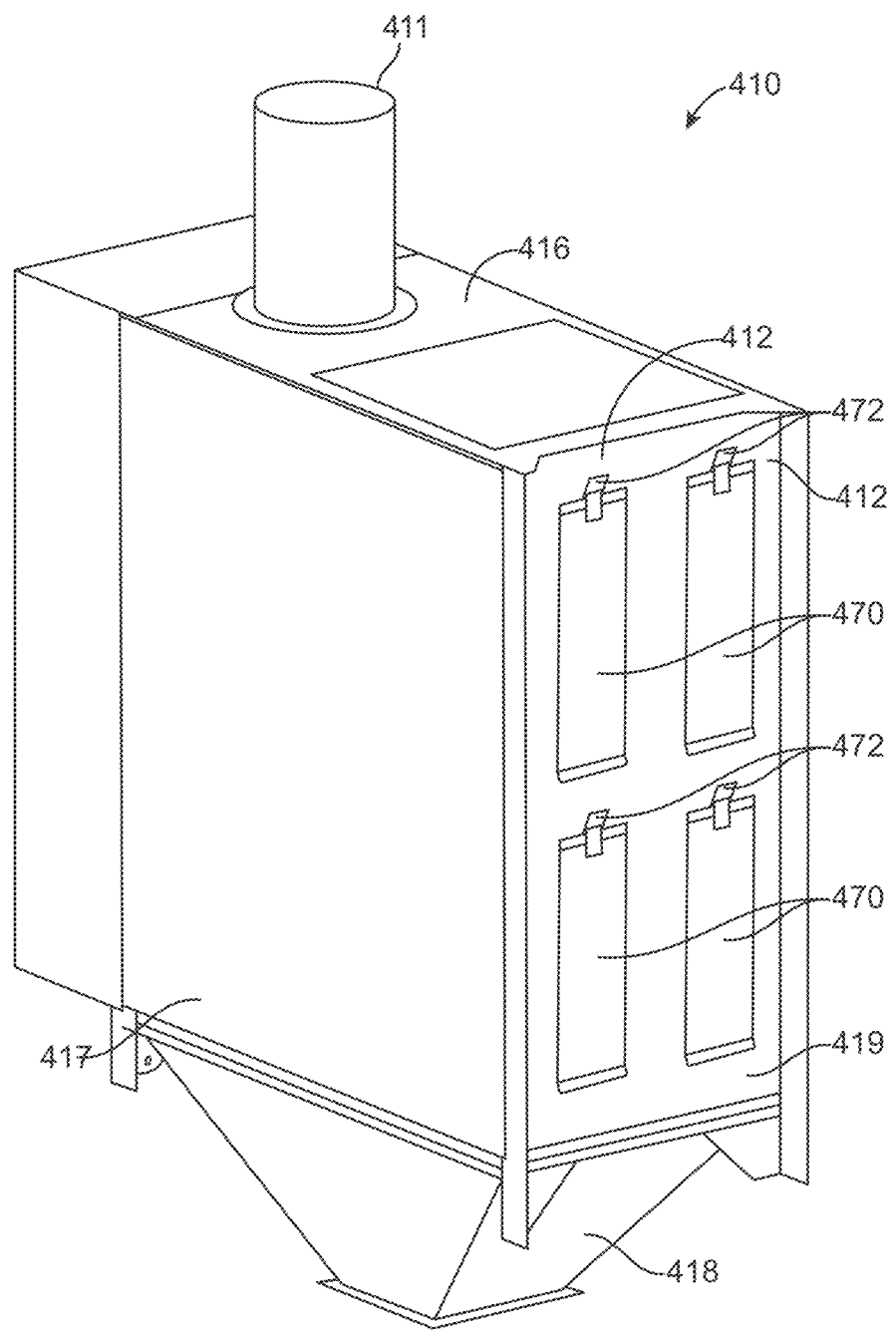
FIG. 16 is a perspective view of one illustrative embodiment of a filter system as described herein.
Figure 17:
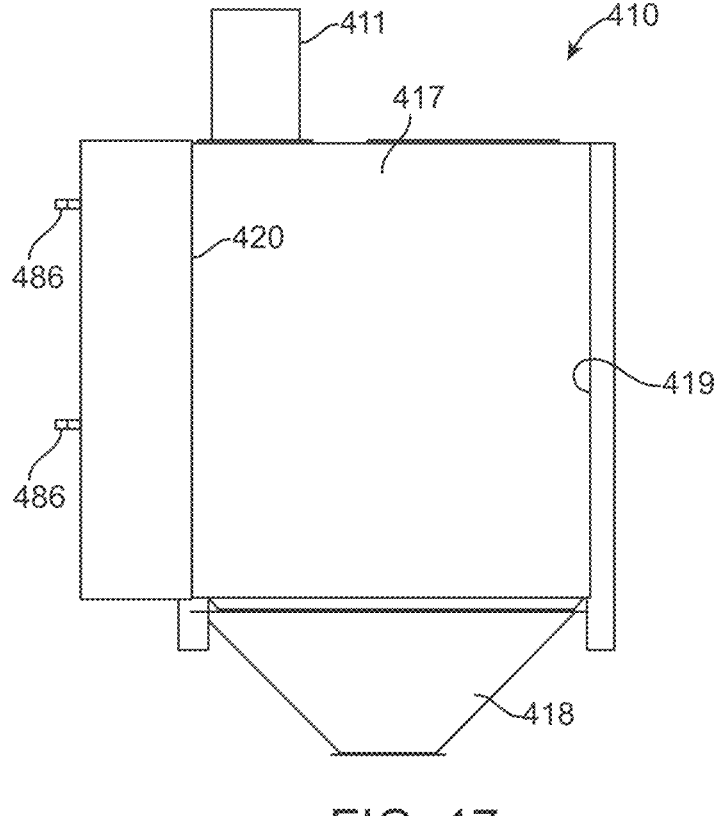
FIG. 17 is a side view of the filter system depicted in FIG. 16.
Figure 18:
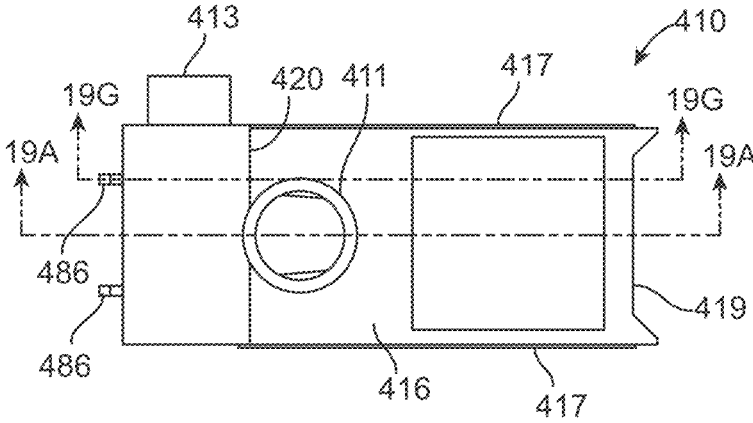
FIG. 18 is a top view of the filter system depicted in FIGS. 16 and 17.

The filter system of FIG. 16 is depicted in a side elevation in FIG. 17 and a top plan view in FIG. 18. The filter system 410, as seen in FIGS. 17 and 18, includes connectors 486 in fluid communication with pulse generators (not depicted in FIGS. 16-18) as part of a pulse-jet cleaning system, with the pulse generators configured to direct a pulse of air into the filter bags as described herein.

Figure 19A:
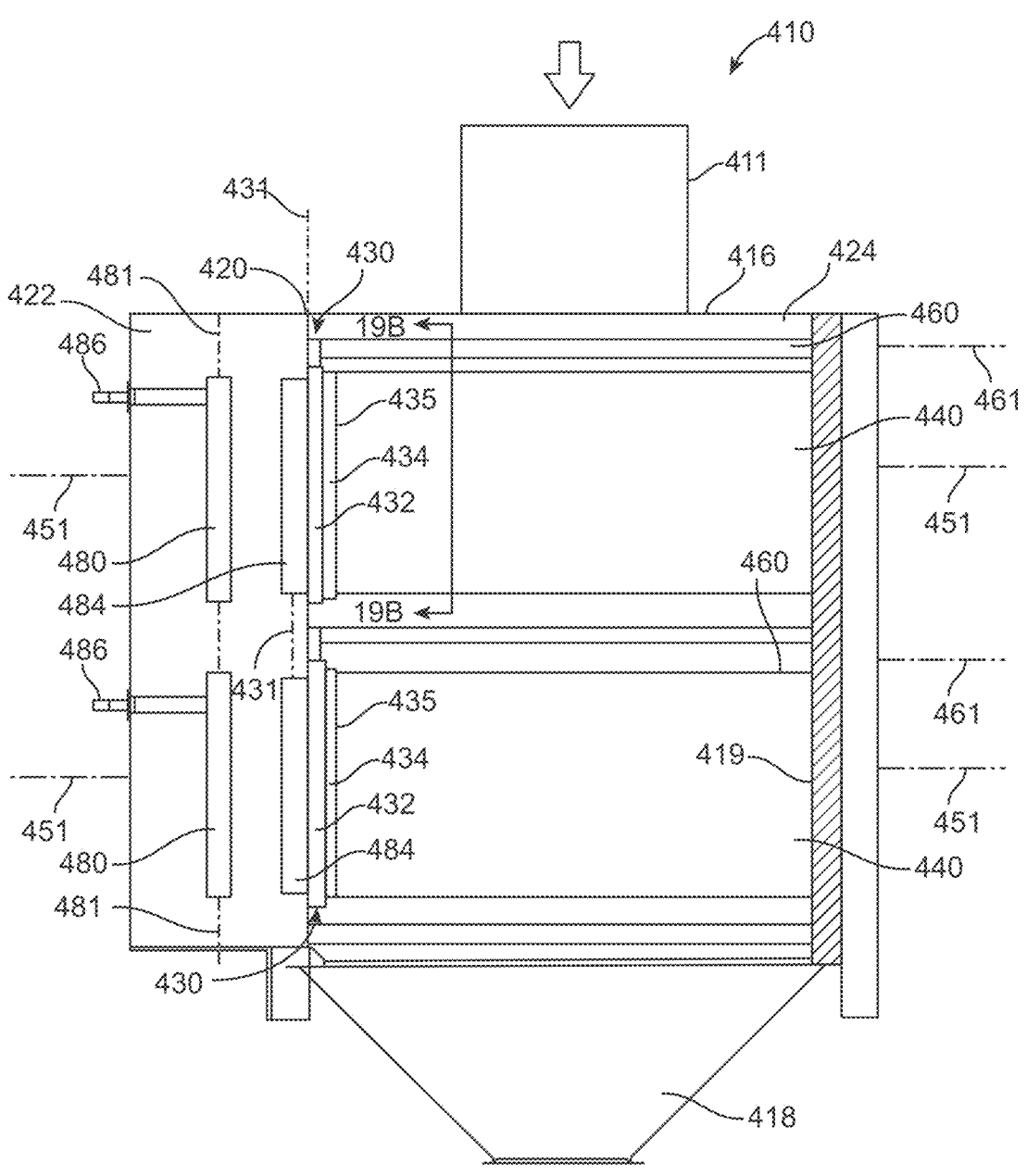
FIG. 19A is a cross-sectional view of the filter system of FIGS. 16-18 taken along line 19A-19A in FIG. 18.
Figure 19B:
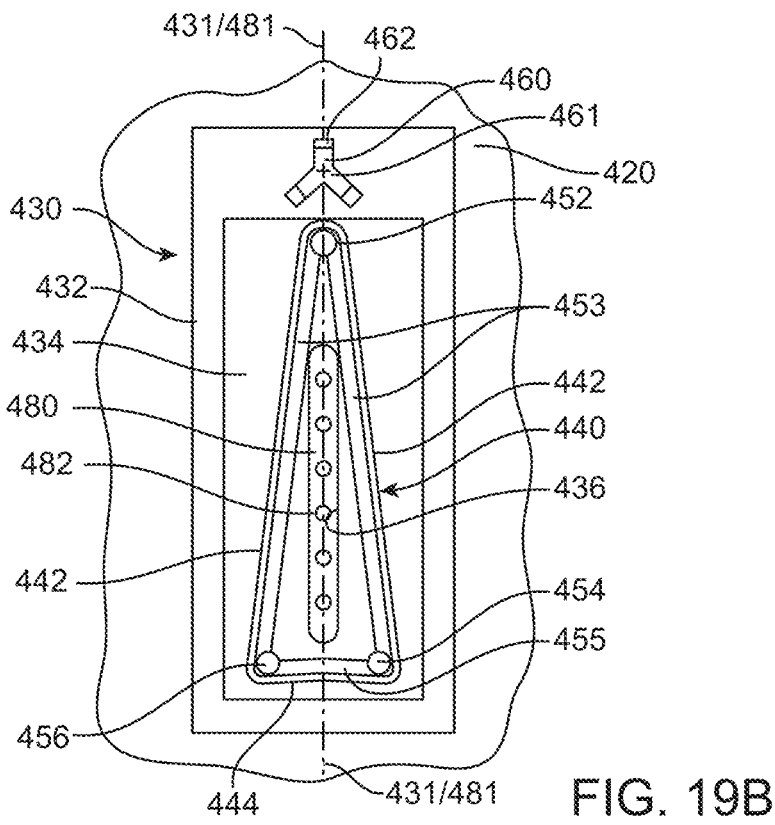
FIG. 19B is a cross-sectional view of the filter system of FIG. 18 taken along line 19B-19B in FIG. 18 when the system is out of service.
Figure 19C:
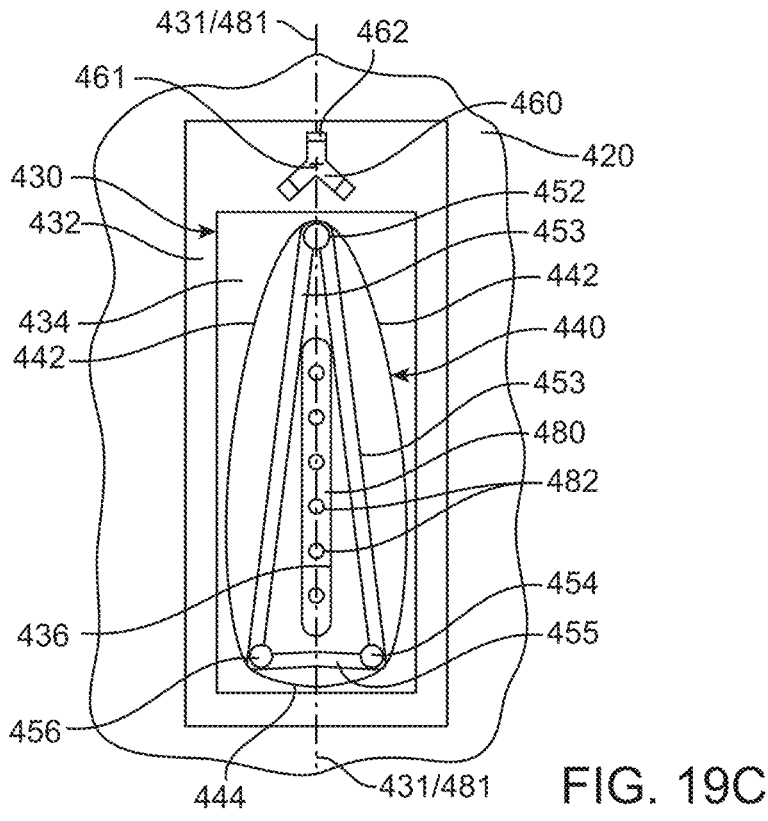
FIG. 19C is a cross-sectional view of the filter system of FIG. 18 taken along line 19B-19B in FIG. 18 during a pulse cleaning event.
Figure 19D:
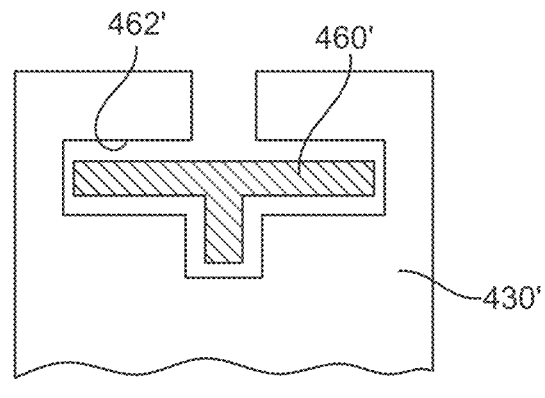
FIGS. 19D-19F depict some alternative embodiments of filter guides and corresponding guide apertures that may be provided in one or more embodiments of filter systems as described herein.
Figure 19E:
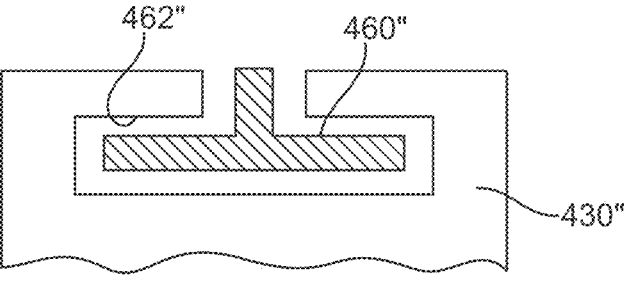
Figure 19F:
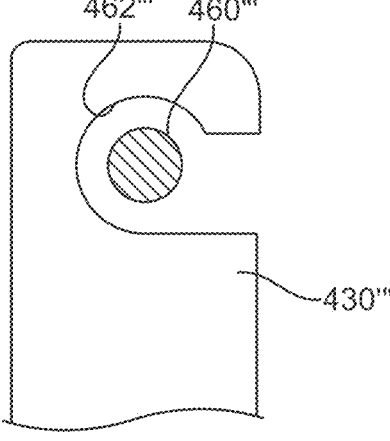
Figure 19G:
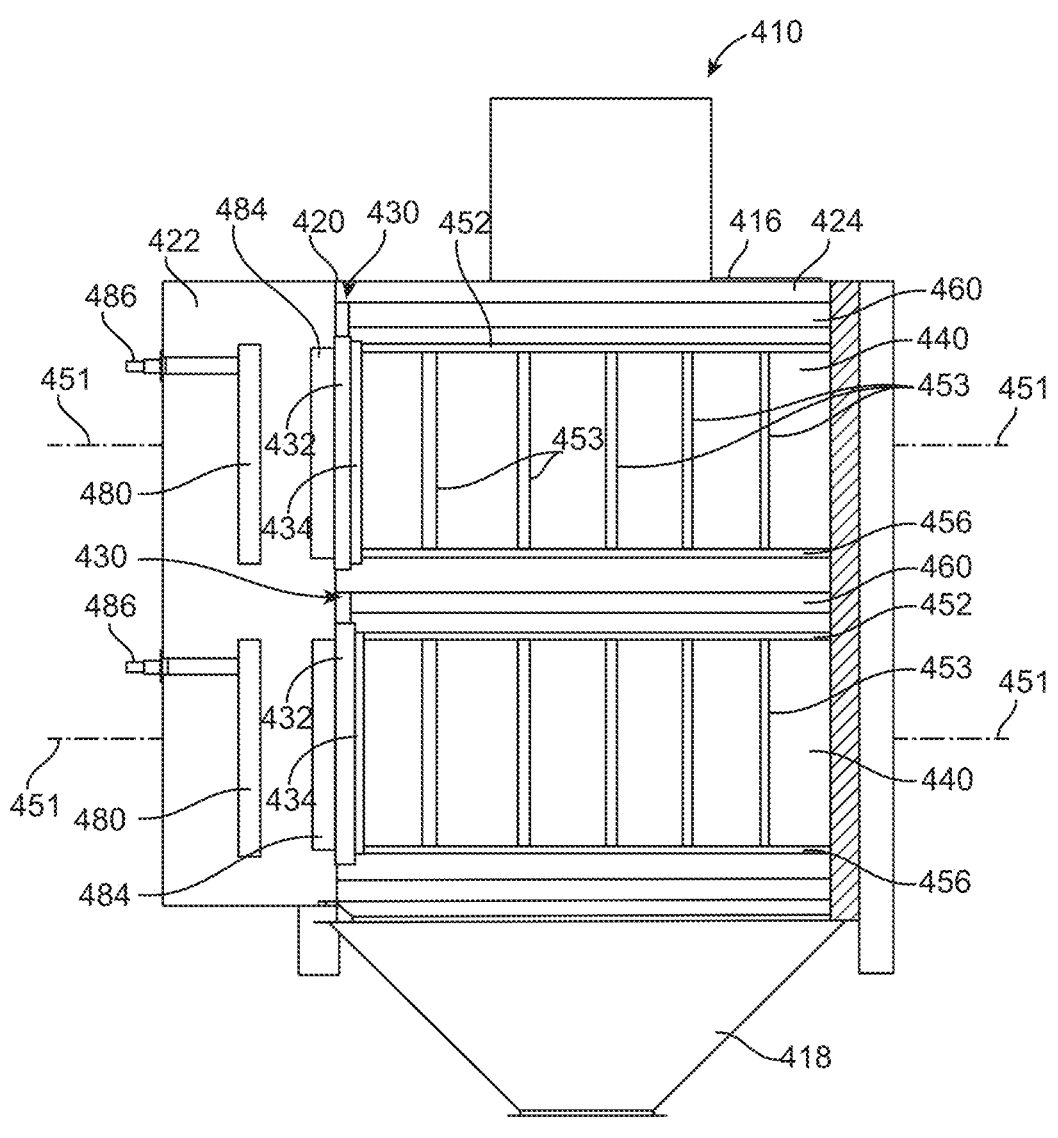
FIG. 19G is a cross-sectional view of the filter system of FIGS. 16-18 taken along line 19G-19G in FIG. 18.

With reference to FIGS. 19A and 19G, the depicted filter system 410 includes filter bag assemblies including filter bags 440 and flange assemblies 430 in a dirty air chamber 424 that is separated from a clean air chamber 422 by a tubesheet 420. FIG. 19A is a cross-sectional view of the filter system 410 taken along line 19A-19A in FIG. 18 and shows the interior of the filter system 410 (with the filter bags 440 located therein being intact such that the support structure within the filter bags 440 is obscured from view). FIG. 19G is a cross-sectional view of the filter system 410 taken along line 19G-19G in FIG. 18 (with the cross-sectional view depicting the interior volume of the filter bags 440 such that a portion of the support structure within the filter bags 440 is depicted). The filter bag assemblies are mounted on filter guides 460 located in the dirty air chamber 424. In the depicted illustrative embodiment, the filter guides 460 extend across the dirty air chamber 424 from the tubesheet 420 to the access panel 419 of the filter system.

The filter bags used in the filter systems described herein preferably include a fitting cuff and a sealing cuff and are configured to be folded such that a fitting pocket is formed proximate the bag opening with the sealing cuff positioned on the exterior of the folded portion of the filter bag as described herein. The filter bags depicted in FIGS. 19A-19C, 19G, 20, 21A, 23, 24C, and 29 are simplified and do not include the folded portions as described herein.

At the tubesheet end, each of the filter bag assemblies includes a flange assembly 430. The flange assembly 430 includes an interior face 435 facing the dirty air chamber 424 and a tubesheet face that seals against the dirty air chamber side of the tubesheet 420. Each of the flange assemblies 430 surrounds an aperture in the tubesheet 420 through which clean air can pass from the interior of a filter bag assembly into the clean air chamber and through which a pulse of air can pass into the interior of a filter bag during a pulse cleaning event.

Although the flange assemblies 430 on each of the filter bag assemblies are described in more detail herein, the flange assemblies 430 seen in FIG. 19A include a base 432 including the tubesheet face of the flange assembly 430 and a clamp 434 configured to attach to the base 432 on the interior face of the flange assembly 430. In such an embodiment, the clean air outlet extends through the base 432 and the clamp 434, with the bag opening of the filter bag 440 being retained between the clamp 434 and the base 432 on the interior face of the flange assembly 430.

The illustrative embodiment of filter system 410 as depicted in FIG. 19A also includes pulse generators 480 located in the clean air chamber 422. The pulse generators 480 are configured to deliver pulses of air into the interior volumes of the filter bags 440 to drive particulate matter that has accumulated on the filter bags 440 during use of the filter bags, with the dislodged particulate matter preferably falling into the hopper 418 located below the filter bags 440. In one or more embodiments, the pulse generators 480 may be described as having elongated shapes that extend along pulse generator axes 481 as seen in, e.g., FIG. 19A. Pressurized air (or any other suitable gas) is delivered to the pulse generators through connectors 486 that, in the depicted embodiment, extend outside of the clean air chamber 422 for connection to a pulse cleaning system including one or more sources of pressurized gas (e.g., air), valves and a control system. Illustrative embodiments of pulse cleaning systems may be found in, e.g., U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), U.S. Pat. No. 7,641,708 (Kosmider et al.), and U.S. Pat. No. 8,075,648 (Raether).

Also depicted in connection with the illustrative embodiment of filter system 410 are pulse collectors 484 which, as will be described herein, may be attached to the flange assemblies 430 of the filter bag assemblies. In other embodiments, the pulse collectors 484 may be attached to the tubesheet 420. Regardless of the structure to which they are attached, the pulse collectors 484 are configured to direct pulsed air emitted from the pulse generators 480 into the interior volumes of the filter bags 440 during the pulse cleaning process.

FIGS. 19B and 19C are cross-sectional views taken along line 19B-19B in FIG. 19A, with FIG. 19B being taken when the filter system 410 is either not in use or is being used to filter dirty air entering the dirty air chamber 424 through inlet 411. FIG. 19C depicts the filter bag 440 relative to the other structures of the filter bag assembly during a pulse cleaning event when pressurized air (or other gas) is delivered into the interior volume of the filter bag 440 as described herein.

FIG. 19B depicts a portion of the dirty air chamber side of the tubesheet 420 with flange assembly 430 located thereon. As discussed herein, the depicted illustrative embodiment of flange assembly 430 includes a base 432 and a clamp 434, with the bag opening of the filter bag 440 being retained between the clamp 434 and the base 432 such that air can enter the interior volume of filter bag 440 only by passing through the filter media used to construct filter bag 440 or by passing through the clean air outlet 436 of the flange assembly 430.

The filter bag assembly as seen in FIGS. 19B and 19C includes a cage used to hold the depicted filter bag 440 in a triangular shape (with the cage being seen in the cross-sectional view of FIG. 19G). In the depicted illustrative embodiment, the cage includes a first cage end attached to the flange assembly 430, with the cage extending away from the flange assembly 430 over a cage length along a cage axis 451 to a second cage end distal from the flange assembly 430. In the depicted illustrative embodiment, the second cage is located proximate the access panel 419 of the filter system 410.

In the depicted illustrative embodiment of the filter bag assembly, the cage includes a plurality of struts that extend away from the interior face of the flange assembly 430 towards the second cage end proximate the access panel 419 of the filter system 410. The plurality of struts define a triangular shape such that, in each cross-section taken in a plane transverse to the cage axis 451 over a majority of the length of the cage, the plurality of struts define a triangle having a top vertex and a pair of bottom vertices opposite the top vertex.

In the depicted illustrative embodiment, the cage includes a top strut 452 and a pair of bottom struts 454 and 456. The top strut 452 defines a top vertex of the triangles defined by the plurality of struts, while the pair of bottom struts 454 and 456 defined the bottom vertices of the triangles defined by the plurality of struts. The depicted illustrative embodiment of the cage also includes a series of braces 453 extending from the top strut 452 to each of the bottom struts 454 and 456 to provide additional support to the filter bag 440 at selected locations along the length of the cage.

When the cage is located in the filter bag 440, the filter media of the filter bag 440 may be described as defining a pair of side surfaces 442 and a bottom surface 444. Each of the side surfaces 442 includes a top edge proximate the top vertex (as defined by the top strut 452) of each triangle defined by the plurality of struts. Moreover, each side surface 442 also includes a bottom edge distal from the top edge of the side surface 442. With reference to FIG. 19B, the bottom edge of the right side surface 442 is defined by the right side bottom vertex (as defined by bottom strut 454) of each triangle defined by the plurality of struts, while the bottom edge of the left side surface 442 is defined by the left side bottom vertex (as defined by bottom strut 456) of each triangle defined by the plurality of struts.

Because the filter bags used in the filter bag assemblies of filter systems as described herein are made of generally flexible filter media, the top edges and bottom edges of the triangular-shaped filter bags may not be particularly distinct, i.e., the edges may not form a single line. It will, however, be understood that the edges may have a width around which the filter media extends when moving from the side surfaces 442 to the bottom surface 444 around the bottom struts 454 and 456 and/or when moving from one side surface 442 to the opposite side surface over the top strut 452. Regardless of that lack of distinctiveness, the edges will be understood as conforming generally to the shape of the struts used to define the different vertices of the triangles.

The triangular shapes defined by the plurality of struts in the illustrative embodiment of the cage as seen in FIGS. 19B and 19C are only one example of the triangular shapes that may be used in connection with filter bag assemblies and filter systems as described herein. In general, however, one or more embodiments of the filter bag assemblies described herein may be described as having a bottom surface 444 of filter media having a width measured between the bottom edges of the side surfaces 442 (as defined by the bottom struts 454 and 456) that is less than a height of either of the side surfaces 442 as measured between their top edges and bottom edges (where the top edges are defined by the top strut 452 and the bottom edges are defined by the bottom struts 454 and 456). In one or more embodiments, the width of the bottom surface 444 may be 50% or less, 40% or less, 30% or less, 20% or less, 15% or less, 12% or less, 10% or less, 8% or less, or 5% or less of the height of either side surface 42 of the pair of side surfaces. At a lower end, the width of the bottom surface may be 4% or more, 5% or more, 6% or more, 8% or more, 10% or more, 12% or more, 15% or more of the height of either side surface of the pair of side surfaces. The width and height as discussed herein are measured transverse to the cage axis 451, i.e., as seen in, e.g., FIG. 19B.

Other features depicted in the cross-sectional views of FIGS. 19B and 19C include filter guide 460 which, in the depicted illustrative embodiment, extends from the tubesheet 420 to the access panel 419 of the dirty air chamber 424. In the depicted illustrative embodiment, the filter guide 460 defines a guide axis 461 passing through the tubesheet 420 and the access panel 419. The depicted guide axis 461 is aligned with the cage axis 451 and, although, the two axes 451 and 461 may be parallel with each other, a perfectly parallel arrangement is not required.

Filter guide 460 includes an entry end 463 at which the guide aperture 462 on the flange assembly 430 can be threaded, guided, or otherwise directed onto the filter guide 460 so that the flange assembly 430 can be supported on the filter guide 460. In one or more embodiments, the entry end 463 of the filter guide 460 may be located closer to the access panel 419 of the filter system than the tubesheet 420 against which the flange assembly 430 is forced as described herein.

Although the filter guide 460 extends from the tube sheet 420 to the access panel 419 in some of the depicted illustrative embodiments described herein, in one or more alternative embodiments, the filter guide 460 may only extend partially across the dirty air chamber such that, e.g., the filter guide 460 may terminate at a location short of the access panel 419 or even short of the tube sheet 420. In one alternative embodiment, for example, the filter guide 460 may extend from the tubesheet 420 towards the access panel 419 but terminate short of the access panel 419.

The filter guide 460 is located within a guide aperture 462 formed in the flange assembly 430. The combination of the filter guide 460 and the guide aperture 462 formed in the flange assembly 30 provides support to the flange assembly 430 during insertion and removal of a filter bag assembly from the dirty air chamber 424 of the filter system 410. In particular, it may be preferred that the filter guide 460 and guide aperture 462 allow for translational or sliding movement of the flange assembly 430 through an access port in the access panel 419 to the tubesheet 420. Although the depicted filter guide 460 and guide aperture 462 in the flange assembly 430 have similar shapes, any suitable combination of shapes for both the filter guide and the guide aperture may be used.

Some alternative embodiments of filter guides and guide apertures are depicted in FIGS. 19D-19F. In FIG. 19D, the filter guide 460' has a T-shaped profile and the guide aperture 462' in flange assembly 430' has a complementary shape configured to accept the filter guide 460'. In FIG. 19E, the filter guide 460" has an inverted T-shaped profile and the guide aperture 462" in flange assembly 430" has a complementary shape configured to accept the filter guide 460". In FIG. 19F, the filter guide 460'" has a round profile and the guide aperture 462'" in flange assembly 430'" has a complementary shape configured to accept the filter guide 460'". Many other alternative shapes for filter guides and guide apertures could also be provided.

In addition to providing support to the flange assembly 430 in a vertical direction, the combination of filter guide 460 and guide aperture 462 may, in one or more embodiments, also serve to limit or prevent rotation of the flange assembly around the guide axis 461 so that proper alignment of the flange assembly 430 on the tubesheet 420 may be achieved. To limit or prevent such rotation, the filter guide 460 and guide aperture 462 on the flange assembly 430 may have a noncircular shapes, with the tri-lobed and T-shaped examples of the depicted illustrative embodiments providing examples of only some noncircular shapes that may limit or prevent rotation of the flange assembly 430 relative to the guide axis 461.

In one or more embodiments, the filter guide 460 may include a dust cover to prevent accumulation of particulate matter on the filter guide 460 that could be dislodged during removal of the filter bag assembly (e.g., as the flange assembly 430 moves from the tubesheet 420 towards the access panel 419).

Other features depicted in the cross-sectional views of FIGS. 19B and 19C include the clean air outlet 436 provided in the flange assembly 430 which allows both clean air to exit the interior volume of the filter bags 440 and also allows for pulses of air or other gases to enter the interior volume during a pulse cleaning process. In one or more embodiments, the clean air outlet may be described as having an elongated shape that extends from a top end (closest to the top strut 452) and a bottom end (closest to the bottom struts 454 and 456). The top end and the bottom end of the clean air outlet 436 may further be described as defining an outlet axis 431 that extends between the top and bottom ends of the clean air outlet 436. In one or more embodiments, a projection of the outlet axis 431 along the cage axis 451 passes between the pair of bottom vertices of the triangles defined by the plurality of struts (where those bottom vertices are defined by the bottom struts 454 and 456). Further, the projection of the outlet axis 431 passes through the top vertex (as defined by the top strut 452) of the triangles defined by the plurality of struts.

Although not depicted in FIGS. 19B and 19C, will be understood that tubesheet 420 includes a tubesheet aperture formed therethrough that is at least as large as the clean air outlet 436 provided in the flange assembly 430 such that the tubesheet aperture does not restrict airflow through the clean air outlet 436 into or out of the interior volume of the filter bag 440. Furthermore, the tubesheet aperture may also be described as having a size that is smaller than the flange assembly 430 such that the flange assembly 430 can close or seal the tubesheet aperture such that air passing between the clean air chamber 422 and dirty air chamber 424 must pass through the clean air outlet 436 when the filter system 410 is operational.

The cross-sectional views of FIGS. 19B and 19C also depicts the alignment between pulse generators 480 and the clean air outlet 436 of the flange assemblies 430 in the depicted illustrative embodiment of filter system 410. In particular, the pulse generators 480 may be aligned with the clean air outlet 436. Even more particularly, the pulse generator axis 481 may be aligned with the outlet axis 431 when viewed along the cage axis 451 as seen in FIGS. 19B and 19C.

The views of FIGS. 19B and 19C further depict the ports 482 of pulse generator 480. In particular, the ports 482 face the clean air outlet 436 and the aperture in the tubesheet 420. Air delivered through the ports 482 of the pulse generator 480 passes through those ports and into the clean air outlet 436 formed in flange assembly 430.

When the filter bags used in filter systems as described herein have generally triangular shapes, various features may be incorporated into the ports 482 of the pulse generators 480 to facilitate the pulse cleaning process. For example, in one or more embodiments, the ports 482 closer to the bottom end of the clean air outlet 436 (i.e., closer to the bottom 444 of the filter bag 440) may be larger in size than ports 482 located closer to the top end of the clean air outlet 436 (i.e., closer to the top edges of the sides 442 of the filter bag 440). Alternatively, or in addition, the spacing between ports 482 may vary along the pulse generator axis 481. For example, the spacing between the ports 482 located closer to the bottom end of the clean air outlet 436 may be smaller than the spacing between the ports 482 located closer to the top end of the clean air outlet 436. Such variations in size and/or spacing of the ports 482 may facilitate the pulse cleaning process by providing more air and or higher pressures within the filter bag 440 proximate the bottom surface 444.

A comparison of FIGS. 19B and 19C illustrates the beneficial effects of the triangular-shaped filter bags described herein with respect to particular loading and pulse cleaning. In particular, as seen in FIG. 19B the triangular shaped filter bag 440 includes a bottom surface 444 that faces downwardly away from the dirty air inlet 411 into dirty air chamber 424 (see, e.g., FIG. 19A). Particulate matter introduced into the dirty air chamber 424 above the triangular filter bag 440 does not, therefore, impinge directly on or, under the force of gravity alone, collect on the bottom surface 444 of the filter bag 440. This improves particulate loading performance of the filter bag 440 because only particulate matter entrained in dirty air that reaches the bottom surface 444 can be captured on the bottom surface 444.

Improvements in pulse cleaning performance are also provided by the triangular-shaped filter bag 440 because particulate matter that does collect on the bottom surface 444 of the filter bag 440 is directed downwardly away from the bottom surface 444 during pulse cleaning. With reference to FIG. 19C, the bottom surface 444 of the filter bag 440 is forced outwardly/downwardly during pulse cleaning. By virtue of the nature of pulse cleaning, that outward/downward movement of the bottom surface 444 is a result of rapid acceleration which imparts a force to any dislodged particulate matter released from the bottom surface 444, with the vector of that pulse cleaning force being generally aligned with the force of gravity to enhance movement of any dislodged particulate matter into a collection area such as, e.g., hopper 418 of filter system 410.

In addition to the beneficial effects of the bottom surface 444 of the triangular-shaped filter bags 440 of filter systems as described herein, the side surfaces 442 of the filter bags 440 are also rapidly accelerated outward during pulse cleaning as seen in the changed positions of the sides 442 of filter bag 440 between FIGS. 19B and 19C. As discussed herein, such movement of the sides 442 of the triangular-shaped filter bags 440 provides many of the same advantages in pulse cleaning performance associated with conventional envelope-shaped filter bags having vertical sides.

Figure 20:
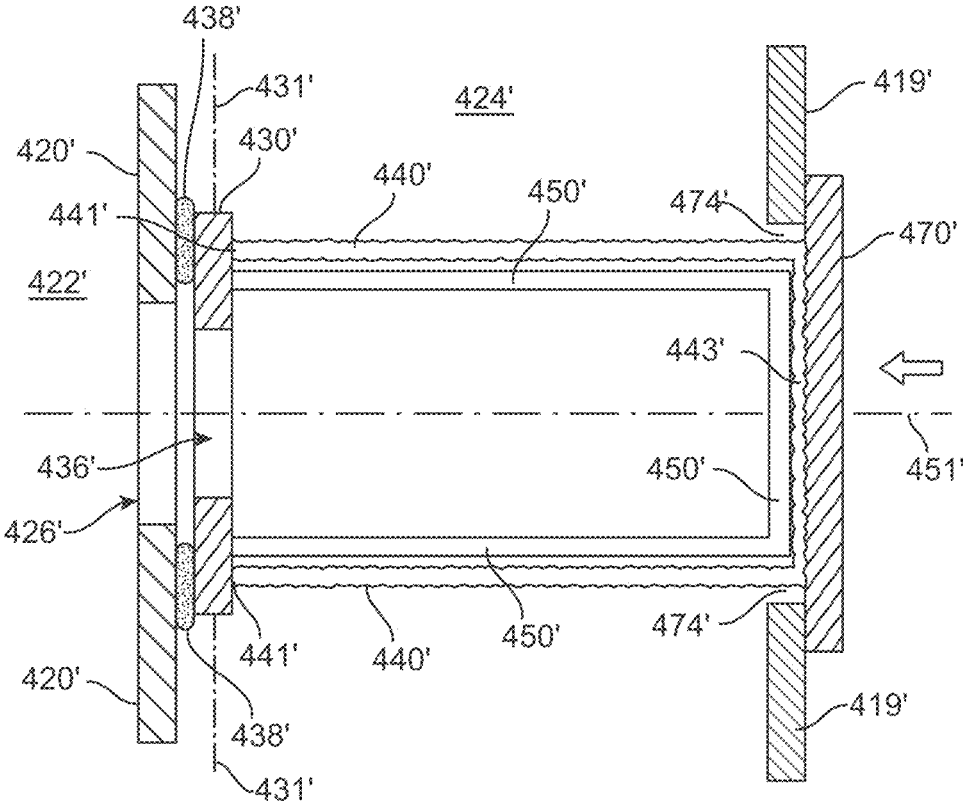
FIG. 20 is a schematic diagram of components of one illustrative embodiment of a filter system as described herein illustrating the seal formed using a filter bag assembly as described herein.

FIG. 20 is a simplified schematic diagram of components of the illustrative embodiment of filter system depicting one illustrative embodiment of a seal formed using a filter bag assembly in a filter system as described herein. In the depicted illustrative embodiment, the filter bag assembly includes a flange assembly 430' and a cage 450' attached to the flange assembly 430'.

A filter bag 440' is attached to the filter bag assembly, with bag opening 441' being sealed against flange assembly 430' and the cage 450' located within the interior volume defined by the filter bag 440'. For reference, clean air outlet 436' extends along an outlet axis 431' in a manner similar to the outlet axis 431 depicted in, e.g., FIGS. 19A-19C.

Cage 450' defines a cage axis 451' that extends through clean air outlet 436' defined in flange assembly 430'. Cage 450' may also be described as including a first cage end attached to the flange assembly 430' and a second cage end distal from the flange assembly 430' along the cage axis 451'. The second cage end of the cage 450' may also be described as being proximate the second end 443' of the filter bag 440'.

Tubesheet 420' includes aperture 426' formed through the tubesheet 420'. Clean air chamber 422' and dirty air chamber 424' are also indicated in FIG. 20, with the two chambers being separated by the tubesheet 420'. Flange assembly 430' is positioned over the aperture 426' in tubesheet 420' such that air passing into and out of the interior volume of the filter bag 440' from the clean air chamber 422' passes through the aperture 426' and the clean air outlet 436' in the flange assembly 430'.

FIG. 20 also depicts the access panel 419' located opposite tubesheet 420' across the dirty air chamber 424'. Access port 474' is provided in access panel 419' to allow for removal and replacement of the filter bag assembly (including flange assembly 430', filter bag 440', and cage 450' attached to flange assembly 430' and located within the interior volume of the filter bag 440'). Access port 474' is closed by cover 470' to seal the dirty air chamber 424' during operation of the filter system.

Also depicted in FIG. 20 is a seal 438' located between a tubesheet face of the flange assembly 430' and the tubesheet 420'. Seal 438' is located around aperture 426' in tubesheet 420' as well as being located around clean air outlet 436' in flange assembly 430'. Seal 438' ensures that air passing into the interior volume of the filter bag 440' must pass either through the filter media forming filter bag 440' (during, e.g., filtering) or the clean air outlet 436' and aperture 426' in tubesheet 420. In other words, the seal 438' between flange assembly 430' and tubesheet 420' prevents air (and prefer-ably any particulate matter) from passing between the tubesheet face of the flange assembly 430' and the tubesheet 420' during operation of a filter system as described herein.

In one or more embodiments, seal 438' may be formed by compression between the flange assembly 430' and the tubesheet 420'. In one or more embodiments, a seal actuator may be provided to apply a seal force on the cage 450' of the filter bag assembly. In such embodiments, the seal force is preferably directed along the cage axis 451 towards the tubesheet 420'. In one or more embodiments, the seal force may be described as being directed through the second end 443' of the filter bag 440' and further being transferred to the seal 438' through the filter bag 440', cage 450', and flange assembly 430'. In particular, the cover 470', which functions as the seal actuator in the depicted illustrative embodiment, acts on the second (closed) end 443' of the filter bag 440' which, in turn, acts on the second cage end of the cage 450', with the cage 450' transferring that force to the flange assembly 430' by virtue of its attachment to the flange assembly 430'.

Seal 438' may be constructed of any suitable material and/or structures. Although many seals may be formed by compression of one or more resilient and/or elastomeric materials (in, e.g., O-rings, gaskets, etc.), other seal con-structions may also be used to form the required seal between the flange assembly and the tubesheet in filter systems as described herein when the flange assembly is subjected to a compression force (e.g., knife edge seals, radial seals, axial seals, etc.).

Figure 21A:
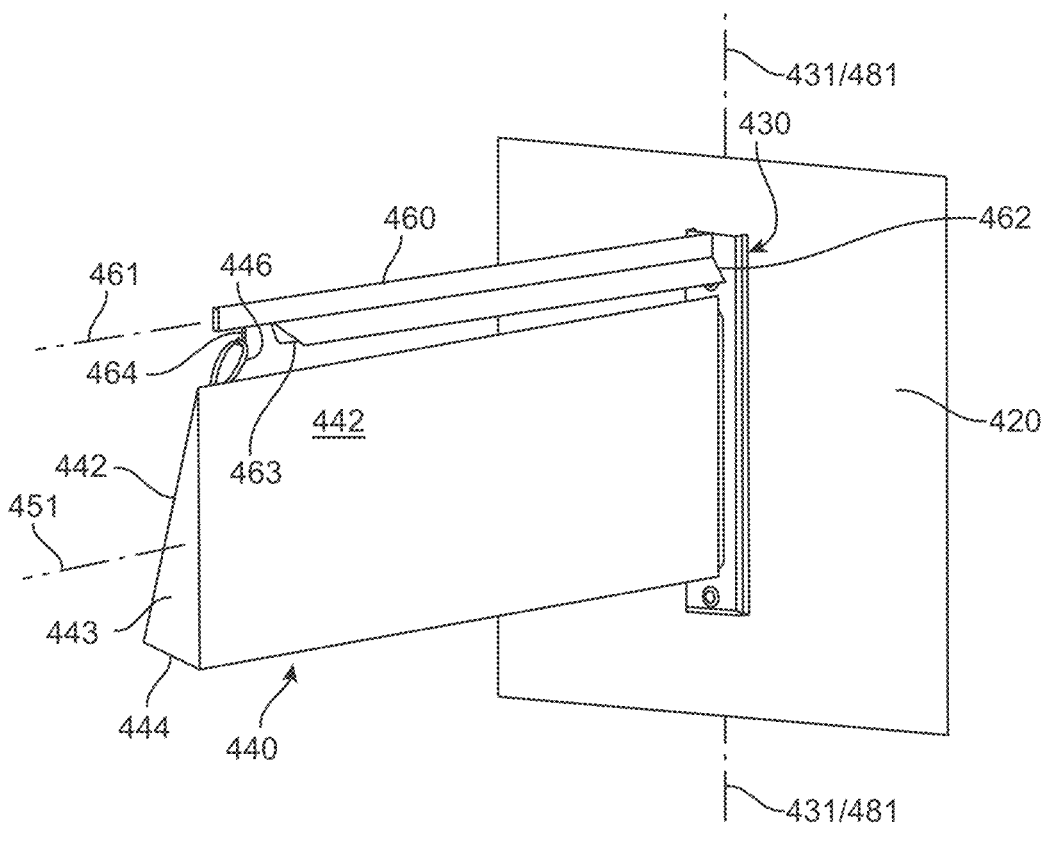
FIG. 21A is a perspective view of a portion of a tubesheet, with one illustrative embodiment of a filter bag assembly supported on one illustrative embodiment of a filter guide as described herein.

FIG. 21A is a perspective view of a portion of the tubesheet 420, with the illustrative embodiment of a filter bag assembly including a filter bag 440 supported on the illustrative embodiment of filter guide 460. As discussed herein, the filter bag assembly, including flange assembly 430 and filter bag 440 are supported on the filter guide 460, with the flange assembly 430 forming a seal with the tubesheet 420.

In one or more embodiments of the filter bags and filter systems described herein, a bag support may be provided proximate the second end of the filter bag, i.e., the closed end of the filter bag distal from the flange assembly, with the bag support configured to prevent or limit sagging of the filter bag assembly at the second end of the filter bag due to, e.g., the weight of the cage located in the filter bag. In one or more embodiments of the filter bags, filter bag assem-blies, and/or filter systems described herein, the bag support may be provided on filter bag itself, as a part of the filter system, and/or include components provided as a part of the filter bag and as a part of the filter system.

The filter bag assembly depicted in FIG. 21A includes one illustrative embodiment of a bag support in the form of a bag support connector 446 attached to the filter bag 440 proxi-mate the second (closed) end 443 of the filter bag 440 and a chamber connector 464 that is positioned in the dirty air chamber proximate the access panel 419 of the housing. In the depicted embodiment the chamber connector 464 is located on the filter guide 460 although such positioning is not required. The bag support connector 446 and the cham-ber connector 464 are configured to interlock with each other to support the second end of the filter bag 440 in the dirty air chamber (with the first end of the filter bag 440 being supported by the flange assembly 430 in cooperation with the filter guide 460 as described herein).

In the embodiment of a bag support as depicted in FIG. 21A, the bag support connector 446 is in the form of a loop while the chamber connector 464 is in the form of a hook, with the loop 446 connecting to the hook 464 to support the second end 443 of the filter bag 440. Many variations are, of course possible. For example, the bag support connector 446 on the filter bag 440 may be in the form of a hook while the chamber connector 464 is in the form of a loop or aperture configured to receive the hook.

Figure 21B:
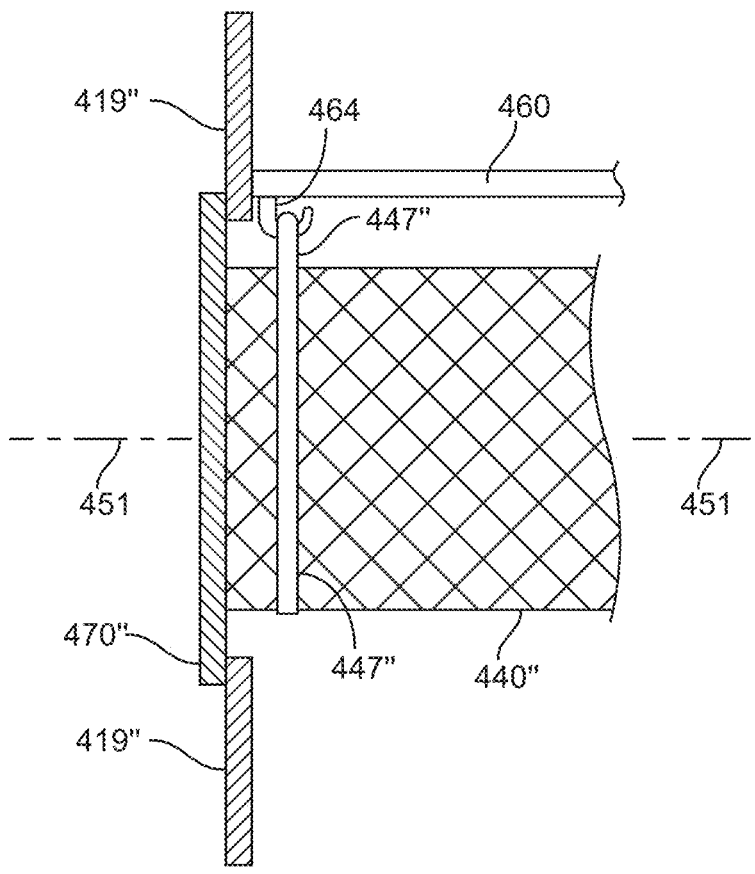
FIG. 21B depicts one alternative embodiment of a bag support that may be provided in one of more embodiments of filter systems and filter bags as described herein.

FIG. 21B depicts one alternative embodiment of a bag support that may be used to prevent or limit sagging of a filter bag assembly at the second end of the filter bag. In the depicted embodiment, the bag support includes the chamber connector 464 on filter guide 460 similar to that depicted in FIG. 21A which, in the depicted embodiment, is attached to access panel 419" (with cover 470" closing the access opening in the access panel 419" as described herein). The embodiment of a bag support depicted in FIG. 21B includes a sling 447" that may, for example wrap around the bag 440", with the sling 447" forming a loop that is configured to connect to the hook 464 on filter guide 460. In one or more embodiments, the sling 447" may be attached to the filter bag 440" using one or more of, e.g., sewing, adhesives, etc. such that the sling 447" is replaced with the filter bag 440". Alternatively, the sling 447" may be separate, e.g., unattached, to the filter bag 440" such that the sling 447" can be re-used with two or more different filter bags 440".

Figure 21C:
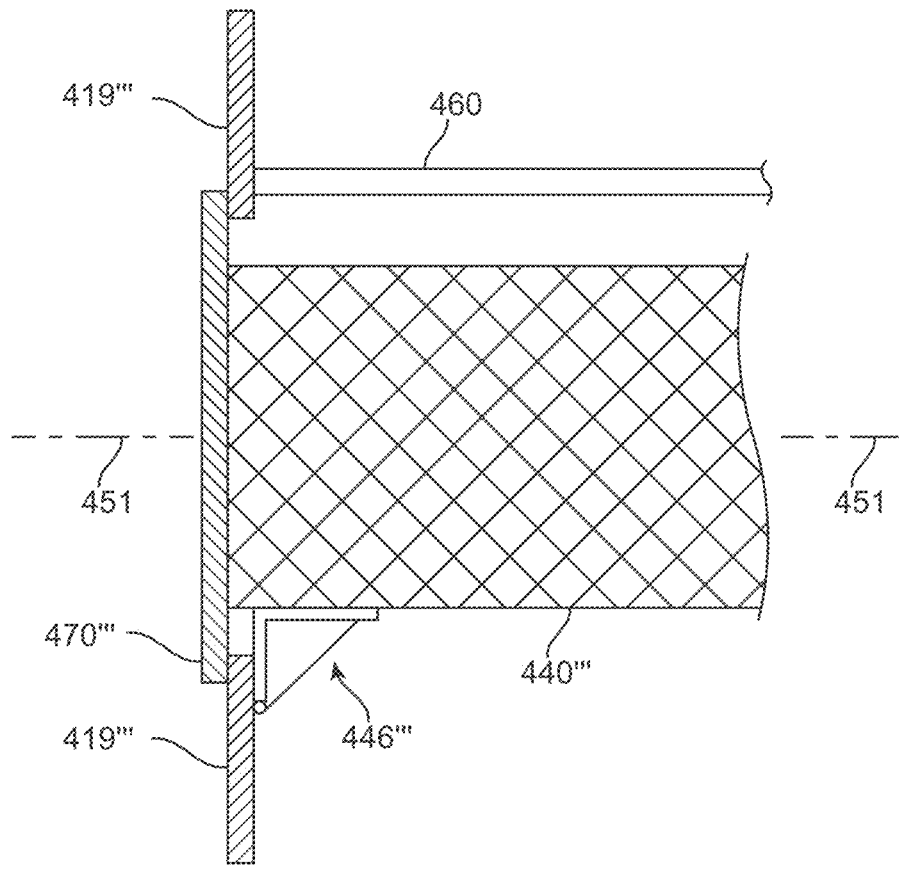
FIG. 21C depicts another alternative embodiment of a bag support that may be provided in one of more embodiments of filter systems and filter bags as described herein.

FIG. 21C depicts yet another alternative embodiment of a bag support that may be used to prevent or limit sagging of a filter bag assembly at the second (closed) end of a filter bag. In the depicted embodiment, the bag support 446''' is in the form of a surface provided proximate the bottom of the filter bag 440''' at the second end of the filter bag 440'''. The bag support 446''' may be attached to the access panel 419''' and may be accessed through the opening in the access panel 419''' that is closed by cover 470'''. In one or more embodi-ments, the bag support 446''' may be moved downward (away from the bag axis 451) to assist with replacement of the filter bag 440'''. Movement of the bag support 446''' may include one or both of translational and rotational movement of the bag support 446".

Figure 22A:
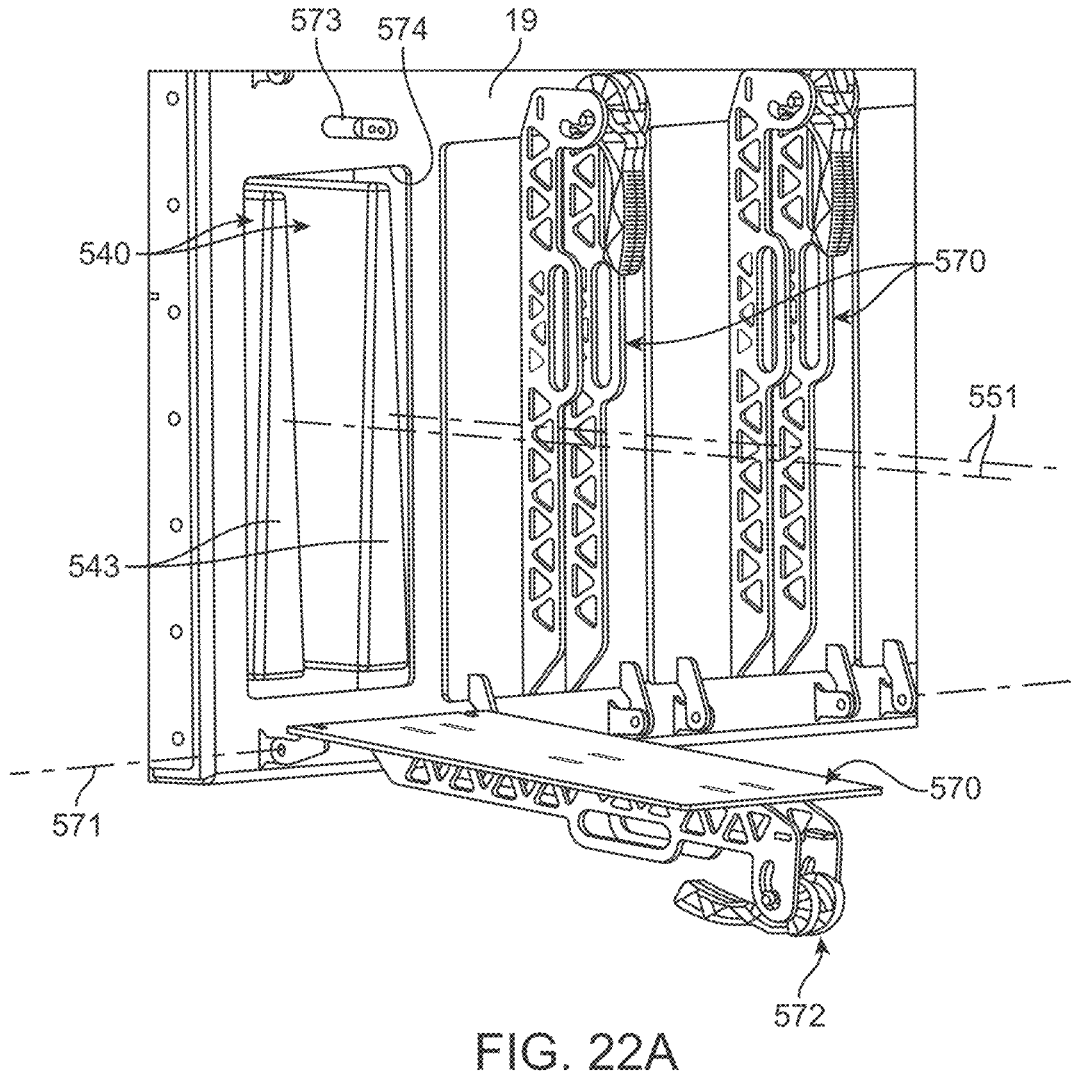
FIG. 22A is a perspective view of one illustrative embodiment of a portion of an access panel including one illustrative embodiment of covers used to close access ports through which filter bag assemblies of filter systems are passed during removal and replacement.

FIG. 22A is a perspective view of one illustrative embodi-ment of a portion of a access panel 419 including one illustrative embodiment of a cover 570 used to close a filter access port 574 formed in the access panel 19 through which filter bag assemblies including filter bags 540 can be removed from and inserted into the dirty air chamber of a filter system. The illustrative embodiment of cover 570 includes a latch 572 and catch 573 to secure the cover 570 in a closed position (see the covers 570 to the right of the open cover 570).The covers 570 may be connected to the access panel 19 for rotation about a hinge axis 571 such that the covers 570 can be moved from a closed position to an open position in which filter bag assemblies can be inserted into or removed from the dirty air chamber through access port 574.

Rotation of the cover 570 about hinge axis 571 moves the cover 570 to its closed position in which cover 570 covers filter access port 574. When in the closed position, the cover 570 may, in addition to closing filter access port 574, function as a seal actuator such that the cover 570 also acts on the second ends 543 of the filter bags 540 to force an attached flange assembly against a tubesheet to form a seal as described herein. The forces provided by the cover 571 acting as a seal actuator when closed may be described as acting along the cage axes 551.

Figure 22B:
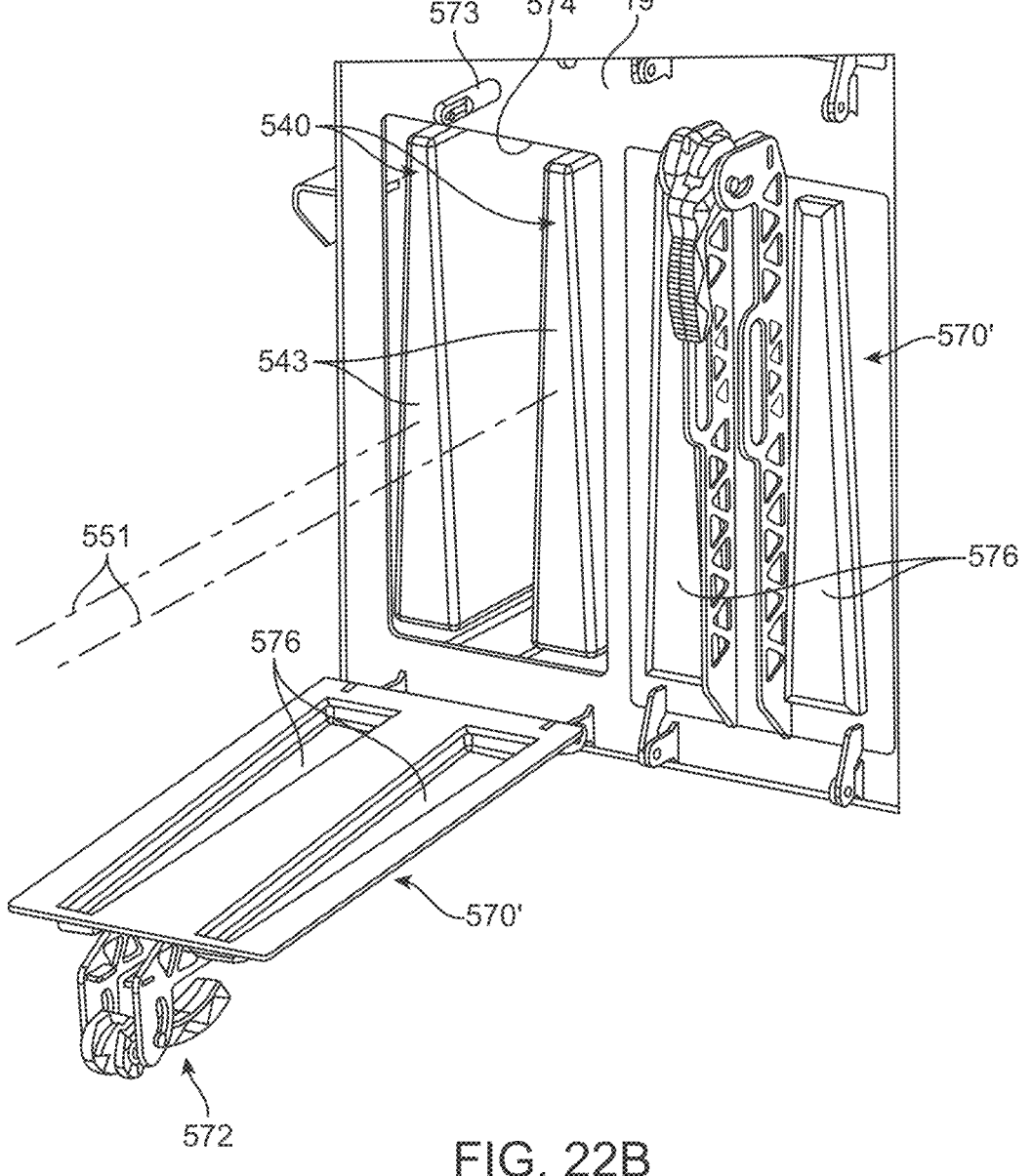
FIG. 22B is a perspective view of alternative illustrative embodiments of a portion of an access panel and covers used to close access ports, with the covers including embossments shaped to complement the filter bag assemblies.

FIG. 22B is a perspective view of the access panel 19 of FIG. 22A including an alternative illustrative embodiment of a cover 570' used to close a filter access port 574 formed in the access panel 19 through which filter bag assemblies including filter bags 540 can be removed from and inserted into the dirty air chamber of the filter system including access panel 19. This illustrative embodiment of cover 570' also includes a latch 572 and catch 573 to secure the cover 570' in a closed position (see the cover 570' to the right of the open cover 570'). The covers 570' may also be connected to the access panel 19 for rotation about a hinge axis 571 such that the covers 570' can be moved from a closed position to an open position in which filter bag assemblies can be inserted into or removed from the dirty air chamber through access port 574.

Rotation of the covers 570' about hinge axis 571 moves the covers 570' to their closed positions in which covers 570' close filter access port 574. When in the closed position, the covers 570' may, in addition to closing filter access port 574, function as seal actuators such that the covers 570' also act on the second ends 543 of the filter bags 540 to force an attached flange assembly against a tubesheet to form a seal as described herein. The forces provided by the covers 570' acting as seal actuators when closed may be described as acting along the cage axes 551.

An additional feature depicted in covers 570' are the embossments (cavities) 576 provided in covers 570'. The embossments 576 may, in one or more embodiments, have shapes that are complementary to the shape of the ends 543 of the filter bags 540. Such embossments may provide advantages such as, for example, additional stability to the filter bag assemblies proximate the access panel 19, more uniform force distribution over the second ends 543 of the filter bags 540 and, therefore, over the cages located within the filter bags 540 in filter bag assemblies as described herein, verification of proper installation of the filter bag assemblies (such that, for example, the bottom surfaces of triangular filter bags are properly oriented in a dirty air chamber), etc. In embodiments that include such embossments, a bag support configured to support the second end of the filter bag (as discussed above in connection with, e.g., FIGS. 21A-21C) may be helpful in ensuring that the second ends 543 of the filter bags 540 are properly positioned as the covers 570' are closed.

As discussed herein, the filter bags used in the filter bag assemblies of filter systems described herein are made of generally flexible filter media, the filter bags may not form particularly distinct triangles when viewed in cross-section. In general, however, the triangular-shaped filter bags and their associated cages can be described using the geometry of triangles with an understanding that the edges, sides, and vertices of such triangles will be generally approximated by the triangular cages and filter bags fitted thereon.

With that understanding, reference is made to FIGS. 23-26 in which various triangular-shaped bag constructions that may be used in one or more embodiments of filter bag assemblies and filter systems using the filter bag assemblies as described herein.

Figure 23:
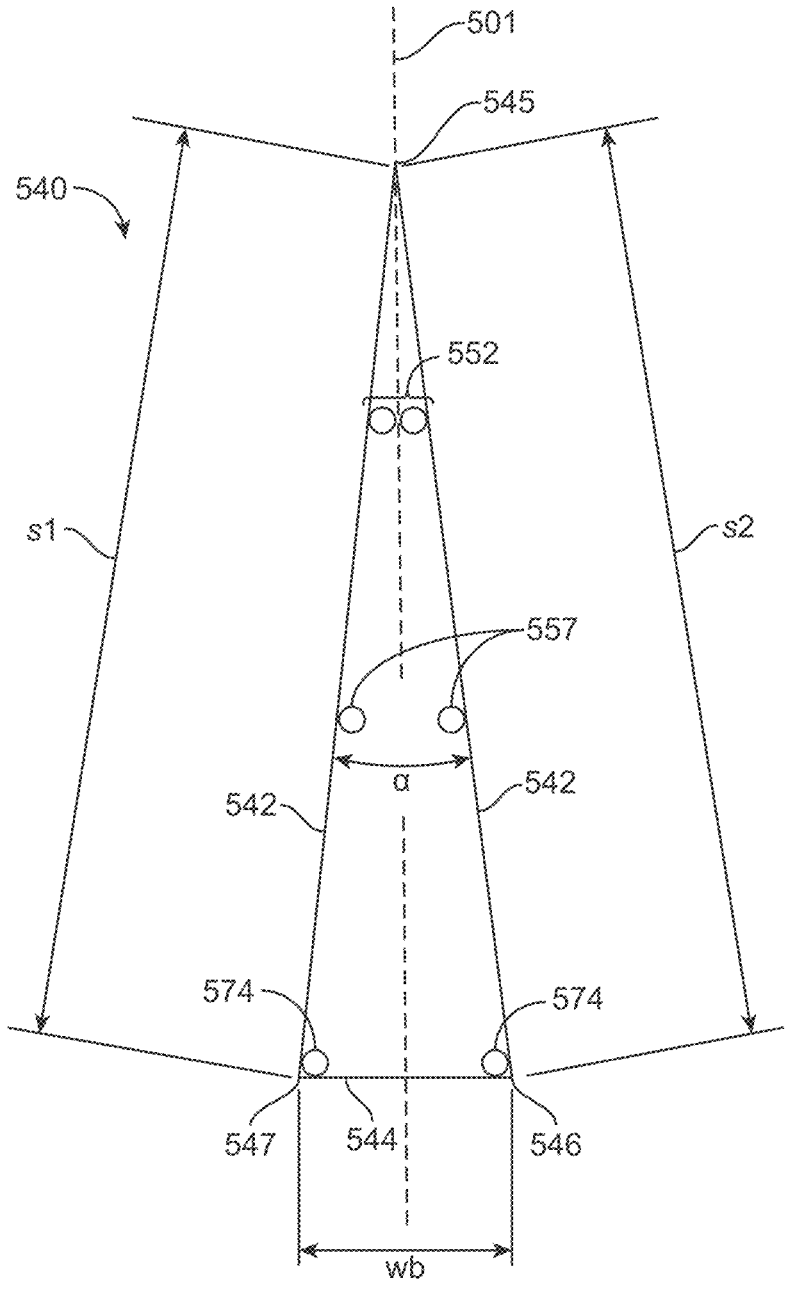
FIG. 23 is a diagram of one illustrative embodiment of a triangle formed by one illustrative embodiment of a filter bag used in a filter system as described herein.

The idealized triangular-shaped bag 540 depicted in FIG. 23 is, in many respects, similar to the triangular-shaped bag 440 discussed herein with respect to various embodiments of the filter bag assemblies and filter systems described above. The triangular-shaped bag 540 includes a top vertex 545 and a pair of bottom vertices 546 and 547. A pair of side surfaces 542 extend between the top vertex 545 and each of the bottom vertices 546 and 547. A bottom surface 544 extends between the bottom vertices 546 and 547.

To further illustrate the difference between an idealized triangular-shaped defined by one or more embodiments of filter bags as described herein and the actual shapes taken by filter bags located on cages that provide the triangular shapes, the struts of a cage as seen in FIGS. 4-7 are included in FIG. 23 along with cage axis 551 (which extends perpendicularly out of the paper on which FIG. 23 is located). In particular, top struts, bottom struts, and intermediate struts 574 are depicted inside filter bag 540 in FIG. 23. It should be noted that two top struts 574 are provided. Such a construction may provide filter bag 540 with a small flat surface along its top edge. Regardless of the slight deviation from a perfect triangle, it can be seen that the side surfaces 542 and bottom surface 544 of the filter bag 540 take on a generally triangular shape as described herein.

The bottom surface 544 may be described as having a width wb extending between the bottom vertices 546 and 547. The left side surface 542 may be described as having a height s1 measured between the top vertex 545 and bottom vertex 547. The right side surface 542 may be described as having a height s2 measured between the top vertex 545 and bottom vertex 546. As discussed herein the width of the bottom surface (wb) is preferably less than the height of either of the side surfaces (s1 or s2).

Although not required, the depicted triangular-shaped bag 540 forms a triangle that may be described as being an acute triangle and, optionally, an isosceles triangle (in which s1=s2). In the case of an isosceles triangle, the axis 501 depicted in FIG. 23 may be described as being an altitude of the triangle formed by the filter bag 540.

The triangular-shaped bag 540 may further be described with respect to the angle formed by the side surfaces 542. In particular, the angle α (alpha) formed by side surfaces 542 at vertex 545 may be selected such that the width (wb) of the bottom surface 544 has a selected relationship with the heights of the side surfaces 542. In one or more embodiments, the angle α (alpha) may be 45° or less, 30° or less, 20° or less, 15° or less, 12° or less, 10° or less, or 5° or less. At a lower end, the angle α (alpha) may be, in one or more embodiments, 2° or more, 3° or more, 4° or more, or 5° or more.

Figures 24, 25:
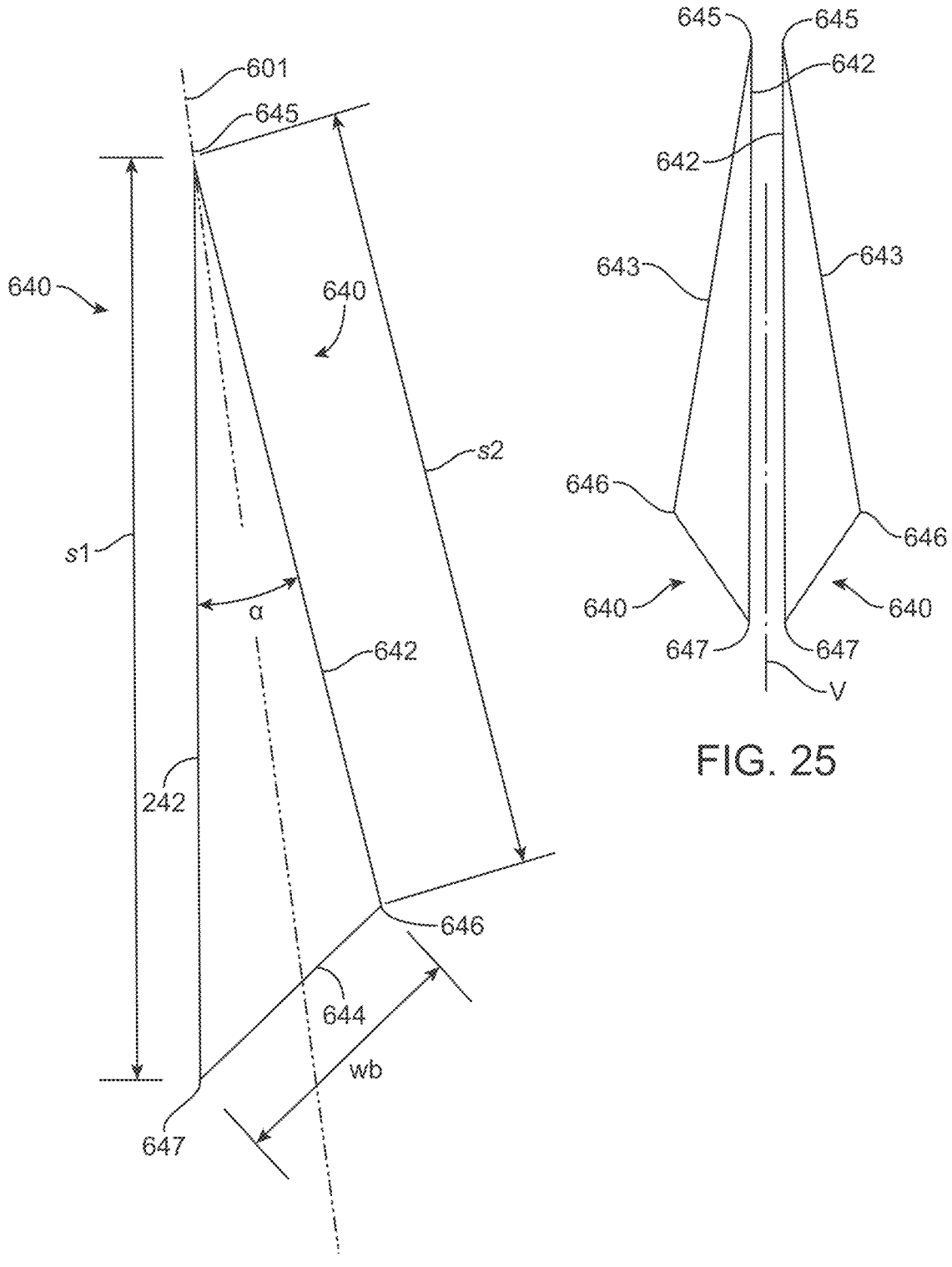
FIG. 24 is a diagram of another illustrative embodiment of a triangle formed by another illustrative embodiment of a filter bag used in a filter system as described herein.
FIG. 25 is a diagram depicting one illustrative example of a possible arrangement of a pair of filter bags as depicted in FIG. 24.

FIG. 24 depicts one alternative triangular-shaped filter bag that may be used in one or more embodiments of a filter bag assembly and/or filter system as described herein. The triangular-shaped bag 640 includes a top vertex 645 and a pair of bottom vertices 646 and 647. A pair of side surfaces 642 extend between the top vertex 645 and each of the bottom vertices 646 and 647. A bottom surface 644 extends between the bottom vertices 646 and 647. When mounted on a cage in a filter bag assembly as described herein, the cage axis would extend perpendicularly out of the paper on which FIG. 24 is located.

The bottom surface 644 may be described as having a width wb extending between the bottom vertices 646 and 647. The left side surface 642 may be described as having a height s1 measured between the top vertex 645 and bottom vertex 647. The right side surface 642 may be described as having a height s2 measured between the top vertex 645 and bottom vertex 646. As discussed herein the width of the bottom surface (wb) is preferably less than the height of either of the side surfaces (s1 or s2).

The triangular-shaped bag 640 may optionally be described with respect to the angle formed between the side surfaces 642 at vertex 645. In particular, the angle α (alpha) formed by side surfaces 642 at vertex 645 may be selected such that the width (wb) of the bottom surface 644 has a selected relationship with the heights of the side surfaces 642. In one or more embodiments, the angle α (alpha) may be 45° or less, 30° or less, 20° or less, 15° or less, 12° or less, 10° or less, or 5° or less. At a lower end, the angle α (alpha)

may be, in one or more embodiments, 2° or more, 3° or more, 4° or more, or 5° or more.

The depicted triangular-shaped bag 640 forms a triangle that may be described as being an obtuse triangle. The axis 601 depicted in FIG. 24 may be described as bisecting the angle α (alpha) and, as a result, the axis 601 also bisects the bottom surface 644. In one or more embodiments of triangular-shaped filter bags as described herein, the axis passing through the top vertex and bisecting the angle formed at that vertex may preferably be oriented generally vertically within the dirty air chamber of a filter system. With respect to the embodiment of triangular-shaped filter bag 640, axis 601 may be oriented vertically or, alternatively, the axis 601 may canted or angled with respect to a vertical axis Although the bottom surface 644 of the triangular-shaped filter bag 640 may not be oriented transverse to the vertical axis, particulate matter dislodged from the bottom surface 644 during pulse cleaning would have a vertical force component that, when added to the force applied by gravity, would preferentially move the dislodged particulate matter downward as described in connection with other illustrative embodiments of filter bags described herein.

FIG. 25 depicts a pair of triangular-shaped filter bags 640. The triangular-shaped filter bag 640 on the right side of FIG. 25 has essentially the same shape as the filter bag 640 depicted in FIG. 24. The triangular-shaped filter bag 640 on the left side of FIG. 25 is a mirror image of the filter bag 640 on the right side of FIG. 25. Both the left and right side triangular-shaped filter bags 640 include vertically oriented surfaces 642 facing each other and aligned with a vertical axis V, while the outer side surfaces 643 of the triangular-shaped filter bags 640 face away from each other. One potential advantage of such an arrangement is that the triangular-shaped filter bags 640 may be spaced closer together (in a direction transverse to the vertical axis), thus increasing the surface area of filter media available within a given dirty air chamber volume while retaining the particulate loading and pulse cleaning advantages that may be associated with triangular-shaped filter bags as described herein.

Figure 26:
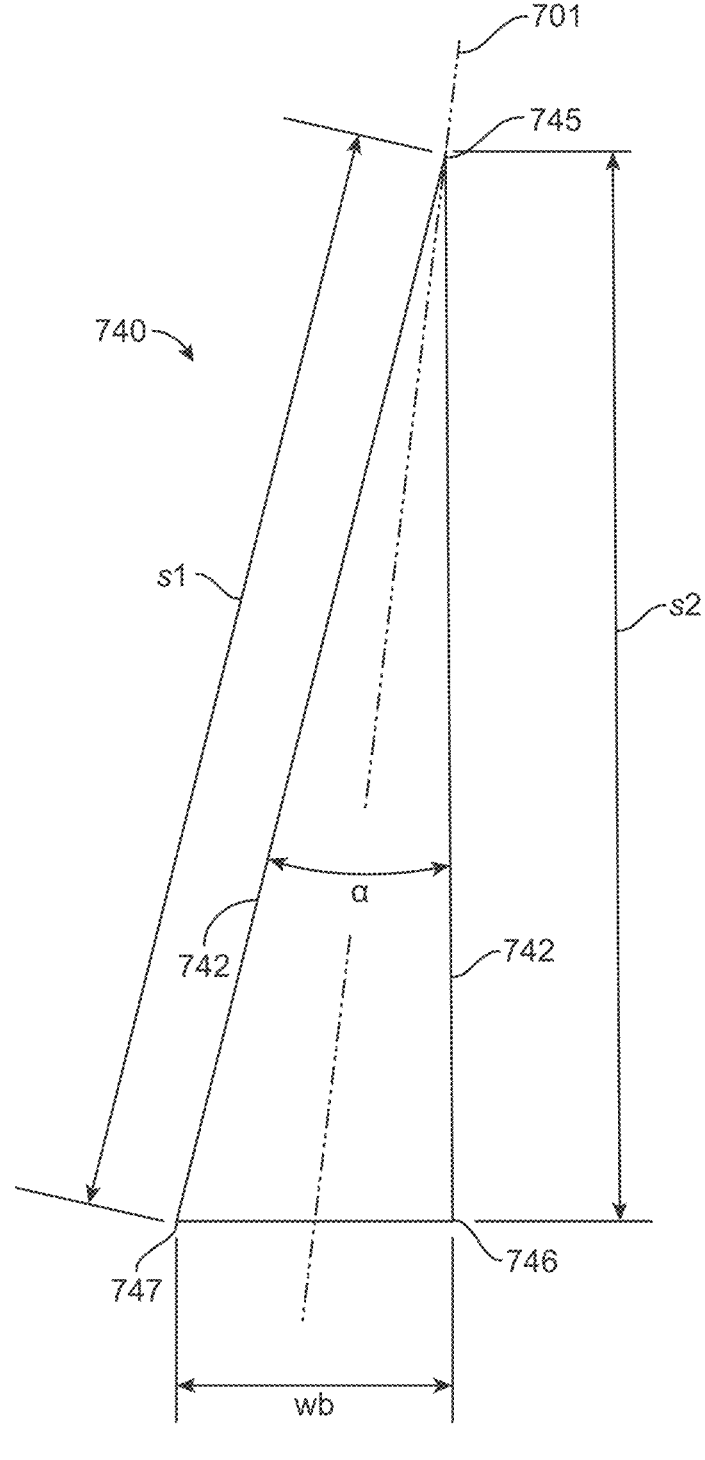
FIG. 26 is a diagram of another illustrative embodiment of a triangle formed by another illustrative embodiment of a filter bag used in an air filter system as described herein.

FIG. 26 depicts another alternative triangular-shaped filter bag that may be used in one or more embodiments of a filter bag assembly and/or filter system as described herein. The triangular-shaped bag 740 includes a top vertex 745 and a pair of bottom vertices 746 and 747. A pair of side surfaces 742 extend between the top vertex 745 and each of the bottom vertices 746 and 747. A bottom surface 744 extends between the bottom vertices 746 and 747. When mounted on a cage in a filter bag assembly as described herein, the cage axis would extend perpendicularly out of the paper on which FIG. 26 is located.

The bottom surface 744 may be described as having a width wb extending between the bottom vertices 746 and 747. The left side surface 742 may be described as having a height s1 measured between the top vertex 745 and bottom vertex 747. The right side surface 742 may be described as having a height s2 measured between the top vertex 745 and bottom vertex 746. As discussed herein the width of the bottom surface (wb) is preferably less than the height of either of the side surfaces (s1 or s2).

The triangular-shaped bag 740 may optionally be described with respect to the angle formed between the side surfaces 742 at vertex 745. In particular, the angle α (alpha) formed by side surfaces 742 at vertex 745 may be selected such that the width (wb) of the bottom surface 744 has a selected relationship with the heights of the side surfaces 742. In one or more embodiments, the angle α (alpha) may be 45° or less, 30° or less, 20° or less, 15° or less, 12° or less, 10° or less, or 5° or less. At a lower end, the angle α (alpha) may be, in one or more embodiments, 2° or more, 3° or more, 4° or more, or 5° or more.

The depicted triangular-shaped bag 740 forms a triangle that may be described as being a right triangle. The axis 701 depicted in FIG. 26 may be described as bisecting the bottom surface 744. In one or more embodiments of triangular-shaped filter bags as described herein, the axis passing through the top vertex and bisecting the bottom surface may be oriented generally vertically within the dirty air chamber of a filter system. With respect to the embodiment of triangular-shaped filter bag 740, axis 701 may be oriented vertically or, alternatively, the right side surface 742 (forming a right angle with the bottom surface 744) may be oriented vertically such that the bottom surface 744 is oriented generally horizontally to a vertical axis. As used herein, the phrase "generally horizontal" (and variations thereof) means that the component or components (e.g., a filter bag and/or filter bag assembly with cage) is/are arranged such that the component or components form an angle of 45 degrees or less, 30 degrees or less, 20 degrees or less, or 15 degrees or less off of a horizontal line (where gravitational force vectors define the vertical axis). For example, the cage axis or filter bag axis may define such an angle with a horizontal line if the filter bag and/or cage is canted with respect to perfectly horizontal line.

Even if the bottom surface 744 of the triangular-shaped filter bag 740 is not oriented transverse to the vertical axis (where, for example, the axis 701 is oriented vertically), particulate matter dislodged from the bottom surface 744 during pulse cleaning would have a vertical force component that, when added to the force applied by gravity, would preferentially move the dislodged particulate matter downward as described in connection with other illustrative embodiments of filter bags described herein.

Figure 27:
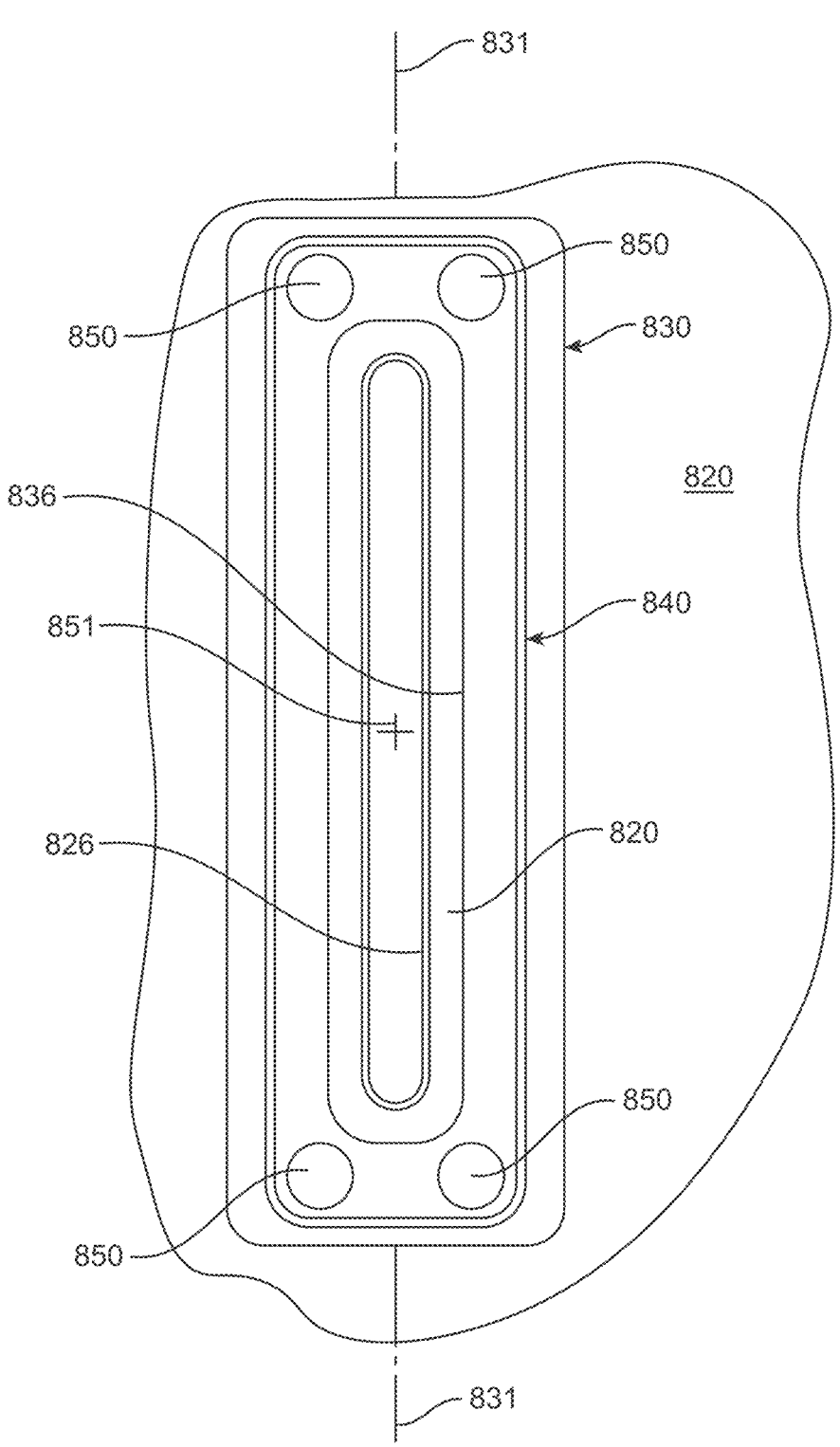
FIG. 27 is a cross-sectional view of another illustrative embodiment of a filter bag assembly including an envelope-shaped filter bag supported by a cage on a flange assembly as described herein.

FIG. 27 is a cross-sectional view of another illustrative embodiment of a filter bag assembly including an envelope-shaped filter bag 840 supported by a cage 850 on a flange assembly 830 as described herein. Although some illustrative embodiments of filter systems and filter bag assemblies described herein may advantageously use filter bags and cages that result in triangularly shaped filter bags, many of the advantages and benefits associated with filter bag assemblies that are compressed within a dirty air chamber as described herein are also available in connection with filter bags on filter bag assemblies having any selected shape.

In particular, FIG. 27 depicts one embodiment of a more conventional envelope—shaped filter bag assembly in which the opposite major sides of the filter bag 840 are generally parallel to each other in use (e.g., have an angle α (alpha) that is essentially 0° (with reference to FIGS. 23-26)). The filter bag 840 is mounted on a cage constructed of struts 850 that define the envelope shape of the filter bag 840 mounted thereon.

The struts 850 are attached to a flange assembly 830 that includes a clean air outlet 836 as described in connection with other embodiments of flange assemblies of filter bag assemblies as described herein. The clean air outlet 836 is, in the depicted illustrative embodiment elongated along an outlet axis 831 as described in connection with other illustrative embodiments herein.

The struts 850 of the cage attached to the flange assembly 830 also extend away from that flange assembly 830 along a cage axis 851 to a distal end where they support a second end of the filter bag 840 as described in connection with other illustrative embodiments herein. Also depicted in FIG.

27 are a portion of the tubesheet 820 against which flange assembly 830 is forced to provide a seal, along with an aperture 826 in the tubesheet 820 through which air passes into or out of the clean air chamber located on the opposite side of the tubesheet 820.

Figure 28:
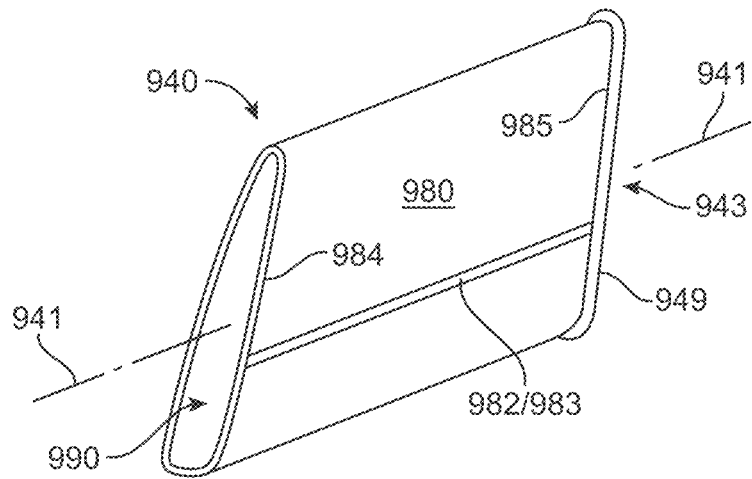
FIG. 28 is a perspective view of one illustrative embodiment of a triangular filter bag that may be used in one or more embodiments of the filter bag assemblies air filter systems described herein.
Figure 29:
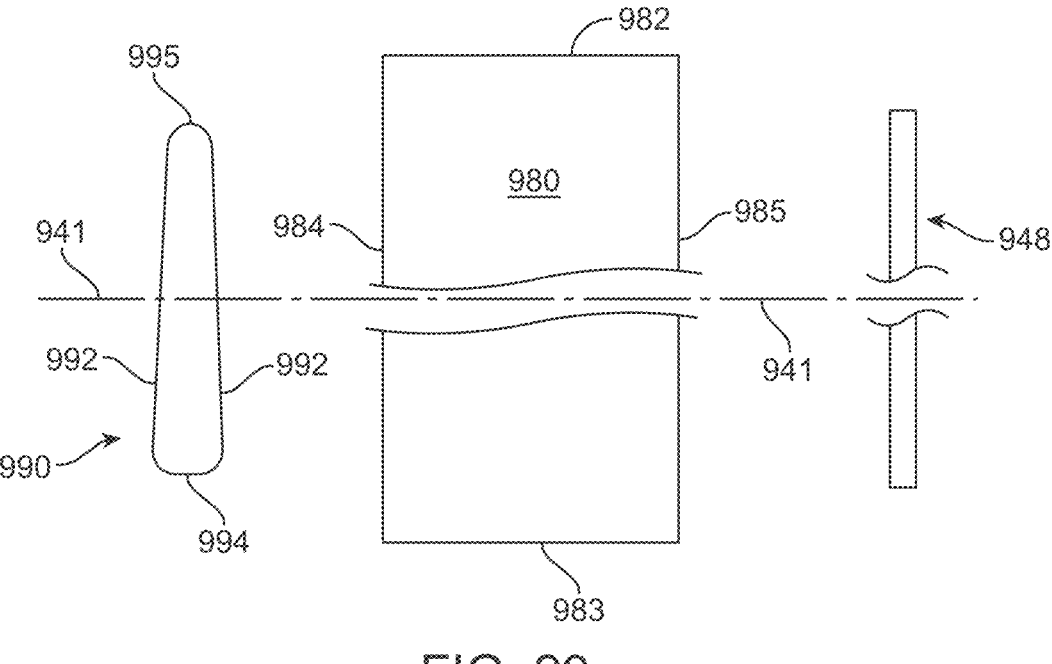
FIG. 29 depicts components that may be used to construct the illustrative embodiment of the triangular filter bag depicted in FIG. 28.
Figure 30:
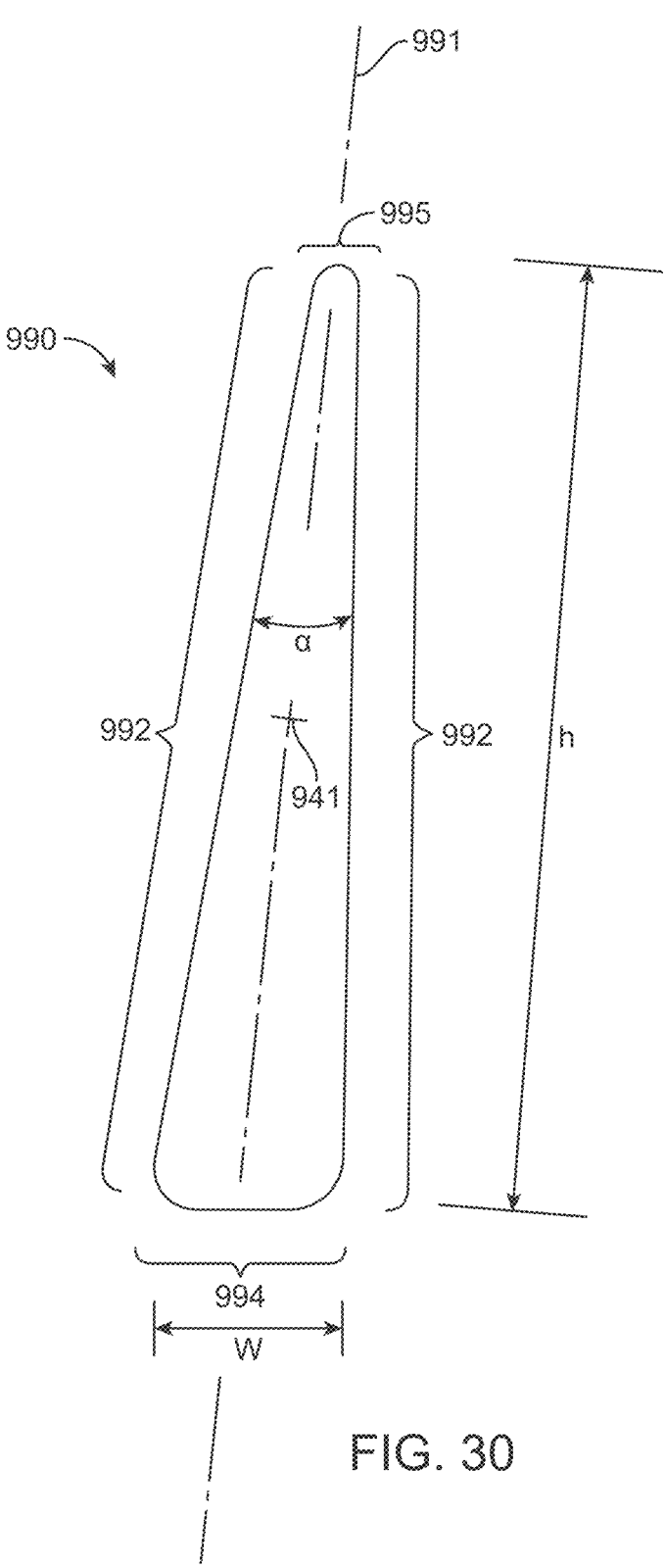
FIG. 30 is a schematic diagram illustrating relationships between the features of the illustrative embodiment of the triangular end cap depicted in FIGS. 28-29.

FIGS. 28-30 depict one illustrative embodiment of a triangular filter bag that may be used in one or more embodiments of filter bag assemblies and filter systems as described herein. The triangular filter bag 940 includes an opening 943, a closed end provided by a substantially triangular end cap 990, and a body 980 extending from the opening 943 to the closed end along a bag axis 941 that extends between the opening 943 to the closed end of the filter bag 940.

The body 980 of the triangular filter bag 940 is formed of filter media suitable for removing particulate matter from air in the application for which it is intended. In one or more embodiments, the body 980 may consist essentially of filter media with no other components provided. With reference to FIG. 29, the body 980 may include seam edges 982 and 983 that are attached to each other to form a longitudinal seam 982/983 as seen in, e.g., FIG. 28. When the seam edges 982/983 are attached to each other, the body may be described as taking a tubular shape that defines an interior volume between the opening 943 and the closed and defined by the triangular end cap 990. In that tubular shape, the filter media of the body 980 also defines a closed end edge 984 located at the closed end of the filter bag 940 and an opening edge 985 located at the opening 943 of the filter bag 940.

In one or more embodiments, the junction between the longitudinal seam 982/983 with the triangular end cap 990 may be located along one of the side edges 992 of the triangular end cap 990 between the bottom edge 994 and the apex 995 of the triangular end cap. In one or more alternative embodiments, a junction between a longitudinal seam and a triangular end cap of a filter bag as described herein may be located along the bottom edge 994 or the apex 995. Further, although body 980 includes only one longitudinal seam 982/983, one or more alternative embodiments of triangular filter bags as described herein may include two or more seams.

The triangular end cap of one or more embodiments of triangular filter bags as described herein may, with reference to the illustrative embodiment of triangular end cap 990, include two side edges 992 that extend between a bottom edge 994 and an apex 995. Described alternately, the side edges 992 of the triangular end cap 990 may be described as meeting at the apex 995 at a location distal from the bottom edge 994.

To provide a filter bag capable of removing particulate matter from air, the filter media of the body 980 at the closed end edge 984 is sealed to the side edges 992, bottom edge 994 and apex 995 of the triangular end cap 990 such that particulate matter is substantially prevented from passing through those junctions.

The triangular end cap 990 may, in one or more embodiments, define the generally triangular-shaped of the filter bag 940 along its length and will more definitely define the triangular-shape of the filter bag 940 proximate the triangular end cap 990. With reference to FIG. 30, the shape of the triangular end cap 990 can be described with reference to the included angle formed between the side edges 992 of the triangular end cap 990. In particular, the bottom edge 994, apex 995, and side edges 992 of the triangular end cap 990 may, in one or more embodiments, be described as defining an included angle α (alpha) between the side edges 992 at the apex 995 of 20° or less, 15° or less, 12° or less, 10° or less, or 5° or less. At a lower end, the angle α (alpha) may be, in one or more embodiments, 2° or more, 3° or more, 4° or more, or 5° or more.

The triangular end caps that may be used in one or more embodiments of triangular filter bags as described herein may alternatively be described with respect to the dimensions of the features of the triangular end cap. For example, the triangular end cap 990, when projected onto a flat surface along the bag axis 941 may, in one or more embodiments, define a height (h) between the apex 995 and the bottom edge 994. The projection of triangular end cap 990 may also define a width (w) across the bottom edge 994 between the side edges 992. In one or more embodiments of triangular filter bags as described herein, the height (h) is greater than the width (w). More particularly, in one or more embodiments, the height (h) defined between the bottom edge and the apex of a triangular end cap may be 4 or more, 6 or more, 8 or more, 10 or more, 12 or more, or 15 times or more the width (w) defined along the bottom edge between the sides of the triangular end. In one or more embodiments, the height (h) defined between the bottom edge and the apex of a triangular end cap may be, at an upper end, 20 or less, 15 or less, 12 or less, 10 or less, 8 or less, or 6 or less times the width (w) defined along the bottom edge between the sides of the triangular end. In one embodiment, the height (h) defined between the bottom edge and the apex of a triangular end cap may be 7 to 8 times the width (w) defined along the bottom edge between the sides of the triangular end. It should be noted that the height (h) is preferably measured along an end cap axis 991 that extends between the bottom edge 994 and the apex 995 and may, in one or more embodiments, be described as bisecting both the bottom edge 994 and the apex 995 and/or defining an axis of symmetry of the triangular end 990. In one or more embodiments of filter bags including triangular end caps as described herein, the triangular end cap may be constructed of filter media, e.g., the same filter media used for the body 980 of the filter bag. In one or more alternative embodiments, the triangular end caps may be constructed of materials that are impermeable to air (unlike the filter media used for the body 980). In one or more embodiments, the triangular end caps may be substantially rigid, self-supporting articles, while in other embodiments the triangle are end caps may be constructed of flexible materials that are not capable of self-support.

In one or more embodiments of filter bags including triangular end caps as described herein, the closed end edge 984 of the body 980 may be sealed to the side edges 992 of the triangular end cap 990 using any suitable technique or combination of techniques sufficient to provide structural integrity to that junction as well as limit/prevent passage of particulate matter through that junction. In one or more embodiments, the closed end edge may be sealed to the side edges using one or more of a sewn seam, a stitched seam, an adhesive seam, a chemically welded seam, and a thermally welded seam.

In one or more embodiments of filter bags including triangular end caps as described herein, the closed end edge 984 of the body 980 may be sealed to the bottom edge 994 of the triangular end cap 990 using any suitable technique or combination of techniques sufficient to provide structural integrity to that junction as well as limit/prevent passage of particulate matter through that junction. In one or more embodiments, the closed end edge may be sealed to the side edges using one or more of a sewn seam, a stitched seam, an adhesive seam, a chemically welded seam, and a thermally welded seam.

In one or more embodiments of filter bags including triangular end caps as described herein, the closed end edge 984 of the body 980 may be sealed to the apex 995 of the triangular end cap 990 using any suitable technique or combination of techniques sufficient to provide structural integrity to that junction as well as limit/prevent passage of particulate matter through that junction. In one or more embodiments, the closed end edge may be sealed to the side edges using one or more of a sewn seam, a stitched seam, an adhesive seam, a chemically welded seam, and a thermally welded seam.

With reference to FIGS. 28 and 29, filter bag 940 also includes a sealing cuff 649 attached to the filter media of the body 980 proximate the open edge 985 of the body 980. The cuff 949 may, in one or more embodiments, be used to seal the bag opening 943 in a flange assembly of a filter bag assembly as described herein.

Illustrative Aspects

Following are illustrative aspects of the filter bags, filter bag support assemblies, filter bag assemblies, air filter systems, and methods described herein.

In independent aspect A1, a filter bag as described herein comprises: a body comprising a bag opening and a closed end, the body extending from the bag opening to the closed end along a bag axis extending between the bag opening to the closed end, wherein the body comprises filter media forming a tubular shape between the bag opening and the closed end; a sealing cuff attached to the filter media forming the tubular shape of the body, the sealing cuff attached to an interior surface of the filter media proximate the bag opening, the sealing cuff extending around an entire perimeter of the bag opening; and a fitting cuff positioned on the filter media forming the tubular shape, the fitting cuff located between the sealing cuff and the closed end, the fitting cuff positioned on an exterior surface of the filter media; wherein the filter media forming the body between the sealing cuff and the fitting cuff is configured to be folded such that a fitting pocket is formed in the filter media between the sealing cuff and the fitting cuff, wherein the fitting cuff is located in the fitting pocket and the sealing cuff is located outside of the fitting pocket, and wherein, when moving along the bag axis away from the closed end, the bag opening is positioned between the fitting cuff and the closed end of the body after the fitting pocket is formed.

In aspect A2 according to aspect A1, the sealing cuff defines an internal perimeter smaller than an internal perimeter of the bag opening defined by the filter media before a fitting pocket is formed by folding the filter media.

In aspect A3 according to any one of aspects A1 to A2, the sealing cuff comprises a discrete component attached to the interior surface of the filter media.

In aspect A4 according to any one of aspects A1 to A3, the fitting cuff comprises a discrete component positioned on the exterior surface of the filter media.

In aspect A5 according to any one of aspects A1 to A4, the fitting cuff extends around an entire perimeter of the exterior surface of the tubular body.

In aspect A6 according to any one of aspects A1 to A5, the fitting cuff defines an internal perimeter equal to an external perimeter of the body as defined by the filter media on which the fitting cuff is positioned.

In aspect A7 according to any one of aspects A1 to A6, the fitting cuff is attached to the filter media.

In aspect A8 according to any one of aspects A1 to A7, after the fitting pocket is formed, the sealing cuff is located between the fitting cuff and the closed end when moving along the bag axis away from the closed end.

In aspect A9 according to any one of aspects A1 to A8, the sealing cuff comprises an axial seal length measured along the bag axis and the fitting cuff comprises a fitting cuff length measured along the bag axis, wherein the axial seal length is equal to or greater than the fitting cuff length.

In aspect A10 according to any one of aspects A1 to A9, the sealing cuff comprises an axial seal length measured along the bag axis and wherein the fitting cuff comprises a fitting cuff length measured along the bag axis, wherein the axial seal length is greater than the fitting cuff length.

In aspect A11 according to any one of aspects A1 to A10, the fitting cuff comprises a fitting cuff thickness measured in a direction transverse to the bag axis and the sealing cuff comprises a sealing cuff thickness measured in a direction transverse to the bag axis, and wherein the sealing cuff thickness is equal to or greater than the fitting cuff thickness. In aspect A12 according to aspect A11, the sealing cuff thickness is greater than the fitting cuff thickness.

In aspect A13 according to any one of aspects A1 to A12, when moving along the bag axis away from the closed end of the bag, the sealing cuff comprises a proximal end and a distal end, wherein the proximal end of the sealing cuff is located between the closed end of the body and the distal end of the sealing cuff; wherein, when moving along the bag axis away from the closed end of the bag, the fitting cuff comprises a proximal end and a distal end, wherein the proximal end of the fitting cuff is located between the closed end of the body and the distal end of the fitting cuff; and wherein, after the fitting pocket is formed, the distal end of the sealing cuff is located closer to the closed end of the body than the proximal end of the fitting cuff.

In aspect A14 according to any one of aspects A1 to A13, when moving along the bag axis away from the closed end of the bag, the sealing cuff comprises a proximal end and a distal end, wherein the proximal end of the sealing cuff is located between the closed end of the body and the distal end of the sealing cuff; wherein, when moving along the bag axis away from the closed end of the bag, the fitting cuff comprises a proximal end and a distal end, wherein the proximal end of the fitting cuff is located between the closed end of the body and the distal end of the fitting cuff, and wherein the fitting cuff comprises a fitting cuff length measured along the bag axis; and wherein, before fitting pocket is formed, the proximal end of the sealing cuff is separated from the distal end of the sealing cuff by a pocket length that is greater than two times the fitting cuff length. In aspect A15 according to aspect A14, the fitting cuff comprises a fitting cuff thickness measured in a direction transverse to the bag axis between, and wherein the pocket length that is greater than a sum of the fitting cuff thickness and two times the fitting cuff length.

In aspect A16 according to any one of aspects A1 to A15, the fitting cuff forms a fitting cuff pocket in the fitting pocket after the fitting pocket is formed.

In aspect A17 according to any one of aspects A1 to A16, the filter bag comprises a bag support connector attached to the body proximate the closed end of the body, the bag support located outside of an interior volume of the body. In aspect A18 according to aspect A17, the bag support connector comprises an aperture configured to receive a hook.

In independent aspect B1, a filter bag support assembly as described herein comprises: a flange assembly comprising a base and a clamp, the flange assembly comprising a clean air outlet extending through the base and the clamp; a cage comprising a first cage end attached to the base of the flange assembly, the cage extending over a cage length to a second cage end distal from the base, the cage defining a cage axis extending between the first cage end and the second cage end; wherein the base comprises a base plate facing the clamp and a base aperture containing the clean air outlet of the flange assembly in the base, wherein base comprises a channel surrounding the base aperture, the channel extending away from the clamp; and wherein the clamp comprises a clamp plate comprising a clamp aperture containing the clean air outlet of the flange assembly in the clamp, the clamp further comprising a guide fin located along a perimeter of the clamp aperture, wherein the guide fin extends into the channel surrounding the base aperture when the clamp is attached to the base and the cage is located within the clamp aperture.

In aspect B2 according to aspect B1, the guide fin is a first guide fin of a plurality of guide fins positioned about the perimeter of the clamp aperture, wherein adjacent pairs of guide fins of the plurality of guide fins are spaced apart from each other about the perimeter of the clamp aperture.

In aspect B3 according to aspect B2, the plurality of guide fins occupy 30% or more, 40% or more, 50% or more, 60% or more, 70% or more, 80% or more, or 90% or more of the perimeter of the clamp aperture.

In aspect B4 according to any one of aspects B1 to B3, the plurality of guide fins occupy less than all of the perimeter of the clamp aperture.

In aspect B5 according to any one of aspects B1 to B4, the clean air outlet is elongated such that the clean air outlet defines a maximum height along a major axis and a maximum width less than the maximum height along a minor axis transverse to the major axis, wherein, optionally, wherein the maximum height greater than the maximum width by a factor of 2 or more, 3 or more, or 4 or more.

In aspect B6 according to any one of aspects B1 to B5, the filter bag support assembly comprising a guide aperture in the flange assembly, the guide aperture located outside of the cage and the clean air outlet, wherein the guide aperture is configured to receive a guide rail when the clamp is attached to the base and wherein the flange assembly is configured for advancement along the guide rail received in the guide aperture when the clamp is attached to the base.

In aspect B7 according to aspect B6, wherein, when the clean air outlet is elongated such that the clean air outlet defines a maximum height along a major axis and a maximum width less than the maximum height along a minor axis transverse to the major axis, the guide aperture is located along the major axis.

In aspect B8 according to any one of aspects B6 to B7, wherein the guide aperture is formed in only one of the base and the clamp of the flange assembly.

In aspect B9 according to any one of aspects B6 to B8, wherein the guide aperture is formed in the clamp plate of the clamp of the flange assembly.

In aspect B10 according to any one of aspects B1 to B9, wherein the assembly further comprises a transition flange located between the base plate and the clamp plate, the transition flange comprising a flange aperture aligned with the base aperture and the clamp aperture, wherein the clean air outlet is located within the flange aperture, and wherein a portion of the transition flange is located between the channel surrounding the base aperture and the clamp plate; and, optionally, wherein the flange aperture comprises a guide fin notch on a perimeter of the flange aperture, wherein the guide fin notch is located between the base plate and the channel when moving along the cage axis, and wherein the guide fin is positioned in the guide fin notch. In independent aspect C1, a filter bag assembly as described herein comprises: a flange assembly comprising a base and a clamp, the flange assembly comprising a clean air outlet extending through the base and the clamp; a cage comprising a first cage end attached to the base, the cage extending over a cage length to a second cage end distal from the base; a filter bag comprising a bag opening attached to the flange assembly and a closed end opposite the bag opening, the filter bag comprising a tubular body surrounding the cage such that the cage is contained within the filter bag, wherein the tubular body is formed of filter media, wherein the filter bag further comprises: a sealing cuff attached to the filter media forming the tubular body, the sealing cuff attached to the filter media proximate the bag opening, the sealing cuff extending around an entire perimeter of the bag opening; and a fitting cuff attached to the filter media forming the tubular shape, the fitting cuff located between the sealing cuff and the closed end; wherein the filter media forming the body between the sealing cuff and the fitting cuff is folded to form a fitting pocket between the sealing cuff and the fitting cuff, wherein the fitting cuff is located in the fitting pocket and the sealing cuff is located outside of the fitting pocket; wherein the base of the flange assembly comprises a base plate and a base aperture defining the clean air outlet of the flange assembly in the base; wherein the clamp of the flange assembly comprises a clamp plate comprising a clamp aperture containing the clean air outlet of the flange assembly in the clamp, the clamp further comprising a guide fin located along a perimeter of the clamp aperture; wherein the fitting cuff is located between the guide fin on the clamp and the base plate; and wherein the sealing cuff is positioned between the base plate and the clamp plate when the clamp is attached to the base and the fitting cuff is located between the guide fin and base plate, wherein the sealing cuff forms a seal between the base and the clamp around the clean air outlet formed by the base aperture and the clamp aperture such that air passing into or out of the filter bag must pass through the clean air outlet or the filter media forming the filter bag.

In aspect C2 according to aspect C1, the sealing cuff is compressed between the base plate and the clamp.

In aspect C3 according to any one of aspects C1 to C2, the base comprises a channel surrounding the base aperture, the channel surrounded by the base plate and extending away from the clamp, and wherein the fitting cuff of the filter bag is located in the channel.

In aspect C4 according to aspect C3, the guide fin compresses the fitting cuff in the channel when the sealing cuff forms a seal between the base and the clamp around the clean air outlet.

In aspect C5 according to any one of aspects C1 to C4, the fitting cuff forms a fitting cuff pocket in the fitting pocket, and wherein a leading edge of the guide fin is located in the fitting cuff pocket.

In aspect C6 according to any one of aspects C3 to C5, the sealing cuff surrounds the channel between the base plate and the clamp plate.

In aspect C7 according to any one of aspects C1 to C6, the filter bag comprises a bag support connector attached to the filter bag proximate the closed end, the bag support located outside of an interior volume of the filter bag.

In aspect C8 according to aspect C7, the bag support connector comprises an aperture configured to receive a hook.

In aspect C9 according to any one of aspects C1 to C8, the guide fin is a first guide fin of a plurality of guide fins positioned about the perimeter of the clamp aperture, wherein adjacent pairs of guide fins of the plurality of guide fins are spaced apart from each other about the perimeter of the clamp aperture and, optionally, wherein the plurality of guide fins occupy 30% or more, 40% or more, 50% or more, 60% or more, 70% or more, 80% or more, or 90% or more of the perimeter of the clamp aperture.

In aspect C10 according to any one of aspects C1 to C9, the filter bag support assembly comprises a guide aperture in the flange assembly, the guide aperture located outside of the cage and the clean air outlet, wherein the guide aperture is configured to receive a guide rail when the clamp is attached to the base and wherein the flange assembly is configured for advancement along the guide rail received in the guide aperture when the clamp is attached to the base.

In aspect C11 according to aspect C10, wherein, when the clean air outlet is elongated such that the clean air outlet defines a maximum height along a major axis and a maximum width less than the maximum height along a minor axis transverse to the major axis, the guide aperture is located along the major axis.

In aspect C12 according to any one of aspects C9 to C11, the guide aperture is formed in only one of the base and the clamp of the flange assembly.

In aspect C13 according to any one of aspects C9 to C12, the guide aperture is formed in the clamp plate of the clamp of the flange assembly.

In independent aspect D1, a filter bag assembly as described herein comprises: a flange assembly comprising a base, a clamp, and a transition flange located between the base and the clamp, the flange assembly comprising a clean air outlet extending through the base, the clamp, and the transition flange; a cage comprising a first cage end attached to the base, the cage extending over a cage length to a second cage end distal from the base; a filter bag comprising a bag opening attached to the flange assembly and a closed end opposite the bag opening, the filter bag comprising a tubular body surrounding the cage such that the cage is contained within the filter bag, wherein the tubular body is formed of filter media, wherein the filter bag further comprises a sealing cuff attached to the filter media forming the tubular body, the sealing cuff attached to the filter media proximate the bag opening, the sealing cuff extending around an entire perimeter of the bag opening; wherein the base of the flange assembly comprises a base plate and a base aperture defining the clean air outlet of the flange assembly in the base; wherein the clamp of the flange assembly comprises a clamp plate comprising a clamp aperture containing the clean air outlet of the flange assembly in the clamp, the clamp further comprising a guide fin located along a perimeter of the clamp aperture; wherein the transition flange comprises a flange aperture aligned with the base aperture and the clamp aperture, wherein the clean air outlet is located within the flange aperture, and wherein a portion of the transition flange is located between the sealing cuff and the clamp plate; and wherein the sealing cuff is positioned between the base and the clamp when the clamp is attached to the base, wherein the sealing cuff forms a seal between the base, the transition flange, and the clamp around the clean air outlet formed by the base aperture and the clamp aperture such that air passing into or out of the filter bag must pass through the clean air outlet or the filter media forming the filter bag.

In aspect D2 according to aspect D1, the sealing cuff is compressed between the base plate and the clamp.

In aspect D3 according to any one of aspects D1 to D2, wherein base comprises a channel surrounding the base aperture, the channel surrounded by the base plate and extending away from the clamp, and wherein the sealing cuff of the filter bag is located in the channel.

In aspect D4 according to aspect D3, the flange aperture of the transition flange comprises a guide fin notch on a perimeter of the flange aperture, wherein the guide fin notch is located between the sealing cuff and the clamp plate when moving along the cage axis, and wherein the guide fin is positioned in the guide fin notch.

In aspect D5 according to any one of aspects D1 to D4, the filter bag comprises a bag support connector attached to the filter bag proximate the closed end, the bag support located outside of an interior volume of the filter bag.

In aspect D6 according to aspect D5, the bag support connector comprises an aperture configured to receive a hook.

In aspect D7 according to any one of aspects D1 to D6, the guide fin is a first guide fin of a plurality of guide fins positioned about the perimeter of the clamp aperture, wherein adjacent pairs of guide fins of the plurality of guide fins are spaced apart from each other about the perimeter of the clamp aperture and, optionally, wherein the plurality of guide fins occupy 30% or more, 40% or more, 50% or more, 60% or more, 70% or more, 80% or more, or 90% or more of the perimeter of the clamp aperture.

In aspect D8 according to any one of aspects D1 to D7, the filter bag support assembly comprises a guide aperture in the flange assembly, the guide aperture located outside of the cage and the clean air outlet, wherein the guide aperture is configured to receive a guide rail when the clamp is attached to the base and wherein the flange assembly is configured for advancement along the guide rail received in the guide aperture when the clamp is attached to the base.

In aspect D9 according to aspect D8, when the clean air outlet is elongated such that the clean air outlet defines a maximum height along a major axis and a maximum width less than the maximum height along a minor axis transverse to the major axis, the guide aperture is located along the major axis.

In aspect D10 according to any one of aspects D8 to D9, the guide aperture is formed in only one of the base and the clamp of the flange assembly.

In aspect D11 according to any one of aspects D8 to D9, the guide aperture is formed in the clamp plate of the clamp of the flange assembly.

In independent aspect E1, an air filter system as described herein comprises: a housing comprising a tubesheet separating an interior volume of the housing into a clean air chamber and a dirty air chamber, a dirty air inlet configured to deliver dirty air into the dirty air chamber, and a clean air outlet configured to remove clean air from the clean air chamber; and a filter bag according to any one of aspects A1 to A18, wherein the filter bag is located in the dirty air chamber, and wherein the filter bag is folded such that the filter bag comprises a fitting pocket.

In independent aspect F1, an air filter system as described herein comprises: a housing comprising a tubesheet separating an interior volume of the housing into a clean air chamber and a dirty air chamber, a dirty air inlet configured to deliver dirty air into the dirty air chamber, and a clean air outlet configured to remove clean air from the clean air chamber; and a filter bag assembly according to any one of aspects C1 to C13, wherein the filter bag assembly is located in the dirty air chamber.

In independent aspect G1, an air filter system as described herein comprises: a housing comprising a tubesheet separating an interior volume of the housing into a clean air chamber and a dirty air chamber, a dirty air inlet configured to deliver dirty air into the dirty air chamber, and a clean air outlet configured to remove clean air from the clean air chamber; and a filter bag assembly according to any one of aspects D1 to D11, wherein the filter bag assembly is located in the dirty air chamber.

In independent aspect H1, a method removing particulate matter from dirty air using an air filter system according to any one of aspects E1, F1 or G1 as described herein comprises delivering the dirty air to the dirty air chamber through the dirty air inlet and removing clean air from clean air chamber through the clean air outlet.

In independent aspect I1, a method of installing a filter bag on a filter bag support assembly to provide a filter bag assembly as recited in any one of aspects C1 to C13 comprises: folding a bag opening such that a fitting cuff is located in a fitting pocket; positioning a clamp of a flange assembly of the filter bag support assembly over the filter bag, wherein the clamp comprises a guide fin located in the fitting pocket and a tubular body of the filter bag extends through a clamp aperture in the clamp; advancing the filter bag and the clamp over a cage attached to a base; and attaching the clamp to the base, wherein a sealing cuff on the filter bag forms a seal around the clamp aperture and a base aperture in the base such that air passing into or out of the filter bag must pass through the base aperture or the filter media forming the filter bag.

In independent aspect J1, a method of installing a filter bag on a filter bag support assembly to provide a filter bag assembly as recited in any one of aspects D1 to D11 comprises: positioning a clamp of a flange assembly of the filter bag support assembly over the filter bag, wherein a tubular body of the filter bag extends through a clamp aperture in the clamp; advancing the filter bag and the clamp over a cage attached to a base; positioning a transition flange between the clamp and the base, wherein the transition flange comprises a flange aperture and wherein the clamp comprises a guide fin located in the flange aperture; and attaching the clamp to the base, wherein a sealing cuff on the filter bag forms a seal around a base aperture in the base such that air passing into or out of the filter bag must pass through the base aperture or the filter media forming the filter bag.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the foldable filter bags, filter bag support assemblies, filter bag assemblies, and filter systems, as well as methods of using and assembling the same, are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A filter bag comprising:
   a body comprising a bag opening and a closed end, the body extending from the bag opening to the closed end along a bag axis extending between the bag opening to the closed end, wherein the body comprises filter media forming a tubular shape between the bag opening and the closed end in an unfolded configuration;
   a sealing cuff attached to the filter media forming the tubular shape of the body, the sealing cuff attached to an interior surface of the filter media proximate the bag opening in an unfolded configuration, the sealing cuff extending around an entire perimeter of the bag opening, wherein the interior surface of the filter media faces towards an interior volume of the filter bag in an unfolded configuration; and
   a fitting cuff positioned on the filter media forming the tubular shape, the fitting cuff located between the sealing cuff and the closed end in an unfolded configuration, the fitting cuff positioned on an exterior surface of the filter media, wherein the exterior surface of the filter media faces away from the interior volume of the filter bag in an unfolded configuration;
   wherein a portion of the filter media forming the body between the sealing cuff and the fitting cuff is folded to define a fitting pocket in the filter media between the sealing cuff and the fitting cuff, wherein an interior surface of the fitting pocket is defined by the exterior surface of the filter media, and wherein the fitting cuff is located in the fitting pocket and the sealing cuff is located outside of the fitting pocket, and wherein, when moving along the bag axis away from the closed end, the bag opening is positioned between the fitting cuff and the closed end of the body after the fitting pocket is formed;
   wherein, when moving along the bag axis away from the closed end body in an unfolded configuration, the sealing cuff comprises a proximal end and a distal end, wherein the proximal end of the sealing cuff is located between the closed end of the body and the distal end of the sealing cuff;
   wherein, when moving along the bag axis away from the closed end of the body in an unfolded configuration fitting cuff comprises a proximal end and a distal end, wherein the proximal end of the fitting cuff is located between the closed end of the body and the distal end of the fitting cuff, and wherein the fitting cuff comprises a fitting cuff length measured along the bag axis;
   wherein, before the fitting pocket is formed, the proximal end of the sealing cuff is separated from the distal end of the fitting cuff by a pocket length that is greater than two times the fitting cuff length.

2. A filter bag according to claim 1, wherein the sealing cuff defines an internal perimeter smaller than an internal perimeter of the bag opening defined by the filter media before the fitting pocket is formed by folding the filter media.

3. A filter bag according to claim 1, wherein the sealing cuff comprises a discrete component attached to the interior surface of the filter media.

4. A filter bag according to claim 1, wherein the fitting cuff comprises a discrete component positioned on the exterior surface of the filter media.

5. A filter bag according to claim 1, wherein the fitting cuff extends around an entire perimeter of the exterior surface of the filter media.

6. A filter bag according to claim 1, wherein the fitting cuff defines an internal perimeter equal to an external perimeter of the body as defined by the filter media on which the fitting cuff is positioned.

7. A filter bag according to claim 1, wherein, after the fitting pocket is formed, the sealing cuff is located between the fitting cuff and the closed end when moving along the bag axis away from the closed end.

8. A filter bag according to claim 1, wherein the sealing cuff comprises an axial seal length measured along the bag axis and the fitting cuff comprises a fitting cuff length measured along the bag axis, wherein the axial seal length is equal to or greater than the fitting cuff length.

9. A filter bag according to claim 1, wherein the fitting cuff comprises a fitting cuff thickness measured in a direction transverse to the bag axis and the sealing cuff comprises a sealing cuff thickness measured in a direction transverse to the bag axis, and wherein the sealing cuff thickness is equal to or greater than the fitting cuff thickness.

10. A filter bag according to claim 1, wherein, after the fitting pocket is formed, the distal end of the sealing cuff is located closer to the closed end of the body than the proximal end of the fitting cuff.

11. A filter bag according to claim 1, wherein the fitting cuff forms a fitting cuff pocket in the fitting pocket after the fitting pocket is formed.

12. A filter bag according to claim 1, wherein the filter bag comprises a bag support connector attached to the body proximate the closed end of the body, the bag support connector located outside of an interior volume of the body.

13. A filter bag according to claim 1, wherein the filter bag is mounted in a filter bag assembly, the filter bag assembly comprising:

a flange assembly comprising a base and a clamp, the flange assembly comprising a clean air outlet extending through the base and the clamp; and a cage comprising a first cage end attached to the base, the cage extending over a cage length to a second cage end distal from the base;

wherein the base of the flange assembly comprises a base plate and a base aperture defining the clean air outlet of the flange assembly in the base;

wherein the clamp of the flange assembly comprises a clamp plate comprising a clamp aperture containing the clean air outlet of the flange assembly in the clamp, the clamp further comprising a guide fin located along a perimeter of the clamp aperture;

wherein the fitting cuff is located between the guide fin on the clamp and the base plate;

and wherein the sealing cuff is positioned between the base plate and the clamp plate when the clamp is attached to the base and the fitting cuff is located between the guide fin and base plate, wherein the sealing cuff forms a seal between the base and the clamp around the clean air outlet formed by the base aperture and the clamp aperture such that air passing into or out of the filter bag must pass through the clean air outlet or the filter media forming the filter bag.

14. A filter bag according to claim 13, wherein the sealing cuff is compressed between the base plate and the clamp.

15. A filter bag according to claim 13, wherein the base comprises a channel surrounding the base aperture, the channel surrounded by the base plate and extending away from the clamp, and wherein the fitting cuff of the filter bag is located in the channel.

16. A filter bag according to claim 13, wherein the fitting cuff forms a fitting cuff pocket in the fitting pocket, and wherein a leading edge of the guide fin is located in the fitting cuff pocket.

17. A filter bag according to claim 13, wherein the filter bag comprises a bag support connector attached to the filter bag proximate the closed end, the bag support connector located outside of an interior volume of the filter bag.

18. A filter bag according to claim 13, wherein the filter bag assembly comprises a guide aperture in the flange assembly, the guide aperture located outside of the cage and the clean air outlet, wherein the guide aperture is configured to receive a guide rail when the clamp is attached to the base and wherein the flange assembly is configured for advancement along the guide rail received in the guide aperture when the clamp is attached to the base.

* * * * *